United States Patent
Painter et al.

(10) Patent No.: US 7,106,917 B2
(45) Date of Patent: Sep. 12, 2006

(54) RESONANT OPTICAL MODULATORS

(75) Inventors: Oskar J. Painter, Pasadena, CA (US); Peter C. Sercel, Pasadena, CA (US); Kerry J. Vahala, San Gabriel, CA (US); David W. Vernooy, Sierra Madre, CA (US); Guido Hunziker, Altadena, CA (US)

(73) Assignee: Xponent Photonics Inc, Monrovia, CA (US)

(*) Notice: Subject to any disclaimer, the term of this patent is extended or adjusted under 35 U.S.C. 154(b) by 763 days.

(21) Appl. No.: 10/037,146

(22) Filed: Dec. 21, 2001

(65) Prior Publication Data

US 2002/0081055 A1 Jun. 27, 2002

Related U.S. Application Data

(60) Provisional application No. 60/257,248, filed on Dec. 21, 2000, and provisional application No. 60/257,218, filed on Dec. 21, 2000.

(51) Int. Cl.
*G02F 1/35* (2006.01)

(52) U.S. Cl. .................. 385/2; 385/1; 385/27; 385/34

(58) Field of Classification Search .............. 385/2, 385/27, 34, 1
See application file for complete search history.

(56) References Cited

U.S. PATENT DOCUMENTS

| | | |
|---|---|---|
| 3,589,794 A | 6/1971 | Marcatili |
| 4,142,775 A | 3/1979 | Ramaswamy et al. |
| 4,515,431 A | 5/1985 | Shaw et al. |
| 4,592,043 A | 5/1986 | Williams |
| 4,695,121 A | 9/1987 | Mahapatra et al. |
| 4,720,160 A | 1/1988 | Hicks |

(Continued)

FOREIGN PATENT DOCUMENTS

FR 2739195 3/1997

OTHER PUBLICATIONS

F. Agahi, B. Pezeshki, J. A. Kash, and D. W. Kisker, "Asymmetric Fabry–Perot modulator with a waveguide geometry", Electron. Lett. vol. 32(3) 210 (1996).

Carl Arft, Diego R. Yankelovich, Andre Knoesen, Erji Mao, and James S. Harris Jr., "In–line fiber evanescent field electroptic Modulators", Journal of Nonlinear Optical Physics and Materials vol. 9(1) 79 (2000).

Ming Cai, Oskar Painter, and Kerry J. Vahala, "Observation of critical coupling in a fiber taper to a silica–microsphere whispering–gallery mode system", Physical Review Letters, vol. 85(1) 74 (2000).

(Continued)

*Primary Examiner*—John D. Lee
*Assistant Examiner*—Eric Wong
(74) *Attorney, Agent, or Firm*—David S. Alavi; Scott R. Miller; Christie Parker & Hale LLP

(57) ABSTRACT

A resonant optical modulator comprises a transmission fiber-optic waveguide, a circumferential-mode optical resonator transverse-coupled thereto, a modulator optical component transverse-coupled to the circumferential-mode resonator, and a modulator control component. A control signal applied to the modulator optical component through the modulator control component alters the round-trip optical loss of the circumferential-mode resonator, thereby altering the transmission of a resonant optical signal through the transmission fiber-optic waveguide. The modulator optical element may comprise an open waveguide or a closed waveguide (i.e., resonator). The resonator round-trip optical loss may be altered by altering the optical absorption/scattering of the modulator optical component, by altering the amount of optical power transfer between the resonator and the modulator optical component, or by altering an optical resonance frequency of a resonant modulator optical component.

83 Claims, 22 Drawing Sheets

U.S. PATENT DOCUMENTS

| | | |
|---|---|---|
| 4,723,827 A | 2/1988 | Shaw et al. |
| 4,768,849 A | 9/1988 | Hicks |
| 5,015,058 A | 5/1991 | Thorncraft et al. |
| 5,039,192 A | 8/1991 | Basu |
| 5,138,676 A | 8/1992 | Stowe et al. |
| 5,281,247 A | 1/1994 | Haruiko et al. |
| 5,296,912 A | 3/1994 | Strandjord et al. |
| 5,343,490 A | 8/1994 | McCall |
| 5,446,579 A | 8/1995 | Lomashevitch |
| 5,471,551 A | 11/1995 | Kragl et al. |
| 5,475,704 A | 12/1995 | Lomashevich |
| 5,479,548 A | 12/1995 | Cote et al. |
| 5,506,712 A | 4/1996 | Sasayama et al. |
| 5,546,414 A | 8/1996 | Pfeiffer |
| 5,666,447 A | 9/1997 | Chuang et al. |
| 5,703,989 A | 12/1997 | Khan et al. |
| 5,708,670 A | 1/1998 | Pfeiffer |
| 5,751,873 A | 5/1998 | Elias et al. |
| 5,822,482 A | 10/1998 | Atkeisson et al. |
| 5,875,272 A | 2/1999 | Kewitsch et al. |
| 5,926,496 A | 7/1999 | Ho et al. |
| 6,009,115 A | 12/1999 | Ho |
| 6,031,945 A | 2/2000 | You et al. |
| 6,052,495 A * | 4/2000 | Little et al. .................... 385/2 |
| 6,078,605 A | 6/2000 | Little et al. |
| 6,101,300 A | 8/2000 | Fan et al. |
| 6,108,465 A | 8/2000 | Iida et al. |
| 6,212,318 B1 | 4/2001 | Cryan |
| 6,222,964 B1 | 4/2001 | Sadot et al. |
| 6,243,517 B1 | 6/2001 | Deacon |
| 6,293,688 B1 | 9/2001 | Deacon |
| 6,321,011 B1 | 11/2001 | Deacon |
| 6,324,204 B1 | 11/2001 | Deacon |
| 6,341,189 B1 | 1/2002 | Deacon |
| 6,356,694 B1 | 3/2002 | Weber |
| 6,373,872 B1 | 4/2002 | Deacon |
| 6,393,185 B1 | 5/2002 | Deacon |
| 6,393,186 B1 | 5/2002 | Deacon |
| 6,400,856 B1 | 6/2002 | Chin |
| 6,507,684 B1 | 6/2003 | Tapalian et al. |
| 6,580,851 B1 | 6/2003 | Vahala et al. |
| 6,633,696 B1 | 10/2003 | Vahala et al. |
| 2001/0004411 A1 | 6/2001 | Yariv |
| 2001/0033587 A1 | 10/2001 | Painter et al. |
| 2002/0037132 A1 | 3/2002 | Sercel et al. |
| 2002/0041730 A1 | 4/2002 | Sercel et al. |
| 2002/0044739 A1 | 4/2002 | Vahala et al. |
| 2002/0122615 A1 | 9/2002 | Painter et al. |

OTHER PUBLICATIONS

N. Dubreuil, J. C. Knight, D. K. Leventhal, V. Sandoghdar, J. Hare, and V. Lefevre, "Eroded monomode optical fiber for whispering–gallery mode excitation in fused–silica microspheres", Optics Lett. 20 813 (1995).

S.V. Frolov, A. Fuji, D. Chinn, Z. V. Vardeny, K. Yoshino, and R. V. Gregory, "Cylindrical microlasers and light emitting devices from conducting polymers", Applied Physics Letters, vol. 72(22) 2811 (1998).

J. C. Knight, G. Cheung, F. Jacques, and T. A. Birks, "Phased–matched excitation of whispering gallery–mode resonances by a fiber taper", Optics Letters vol. 22, 1129 (1997).

M. Kuwata–Gonokami, R. H. Jordon, A. Dodabalapur, H. E. Katz, M. L. Schilling, R. E. Slusher, and S. Ozawa, "Polymer microdisk and microrong lasers", Optics Letters vol. 20(20) 2093 (1995).

B.A. Little, S.T. Chu H. A. Haus, J. Forsei, and J.–P. Laine, "Microring channel dropping filters", J. Lightwave Technology vol. 15 998 (1997).

R. D. Pechstedt, P. St. J. Russell, "Narrow–band in–line fiber filter using surface–guided Bloch modes supported by dielectric multilayer stacks", J. Lightwave Tech. vol. 14(6) 1541 (1996).

B. Pezeshki, J. A. Kash, D. W. Kisker, and F. Tong, "Multiple wavelength light source using an asymmetric waveguide coupler", Appl. Phys. Lett. vol. 65(2) 138 (1994).

B. Pezeshiki, J. A. Kash, D. W. Walker, and F. Tong, "Wavelength sensitive tapered coupler with anti–resonant waveguides", IEEE Phot. Tech. Lett. vol. 6(10) 1225 (1994).

B. Pezeshki, F. F. Tong, J. A. Kash, and D. W. Kisker, "Vertical cavity devices as wavelength selective waveguides", J. Lightwave Tech. vol. 12(10) 1791 (1994).

B. Pezeshki, J. A. Kash, and F. Agahi, "Waveguide version of an asymmetric Fabry–Perot modulator", Appl. Phys. Lett. vol. 67(12) 1662 (1995).

H. P. Xin and C. W. Tu, "GaInNAs/GaAs multiple quantum wells grown by gas–source molecular beam epitaxy", Appl. Phys Lett. vol. 72(19) 2422 (1998).

Pochi Yeh, Amnon Yariv, and Chi–Shain Hong, "Electromagnetic propagation in periodic stratified media. I. General theory ", J. Optical Soc. Am., vol. 67(4) 423 (1977).

M. K. Chin and S. T. Ho, "Design and modeling of waveguide–coupled single–mode microring resonators", J. Lightwave Tech. 16 1433 (1998).

Z.–F, Xiao, G.–Y. Wu, D. Zhang, Z.–H. Li, Y.–L. Hao, and Y.–Y. Wang, "Silicon/glass wafer–to–wafer bonding with Ti/Ni intermediate bonding", Sensors and Actuators A –Physical 71 123 (1998).

Blom. F.C.: Van Dijik, D.R.: Hoekstra, H.J.W.M.; Driessen, A.: and Popma, T.J.A. Experimental study of integrated–optics microcavity resonators: Toward an all–optical switching device. Appl Phys Lett vol. 71 No. 6 pp. 747–749 (1997).

Little, B.E.; Haus, H.A.; Fores, J.S.; Kimerling, L.C.; Ippen, E.P.; and Ripin, D.J. Wavelenght switching and routing using absorption and resonance. IEEE Phot Tech Lett vol. 10 No. 6 pp. 816–818 (1998).

Ming Cai, Guido Hunziker, and Kerry Vahala, "Fiber–optics add–drop device based on a silica microsphere whispering gallery mode system", IEEE Photonics Technology Letters vol. 11 686 (1999).

S. V. Frolov, Z. V. Vardeny, and K. Yoshiro, "Plastic microring lasers on fibers and wires", Applied Physics Letters vol. 72(15) 1802 (1998).

Giora Griffel, "Synthesis of optical filters using ring resonator arrays", IEEE Photonics Technolgy Letts. vol. 12 810 (2000).

Y. Kawabe. Ch. Spiegelberg, A. Schulzgen, M. F. Nabor, B. Kippelen. E. A. Mash, P. M. Allemand. M. Kuwata–Gonokami, K. Takeda, and N. Peyghambarin, "Whispering–gallery–mode microring laser using a conjugated polymer", Applied Physics Letters vol. 72(2) 141 (1998).

Y. Luo, D. C. Hall, L. Kou, L. Steingart, J. H. Jackson, O. Blum, and H. Hou, "Oxidized AlxGa1–xAs heterstructuctures planar waveguides", Appl. Phys. Lett. vol. 75(20) 3078 (1999).

R. D. Pechstedt, P. St. J. Russell, T. A. Birks, and F. D. Lloyd–Lucas, "Selectives coupling of fiber modes with use of surface–guided Bloch modes supported by dielctric multilayer stacks", J. Opt. Soc. Am. A vol. 12(12) 2655 (1995).

* cited by examiner

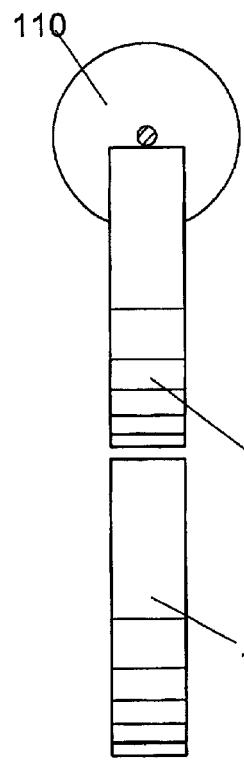
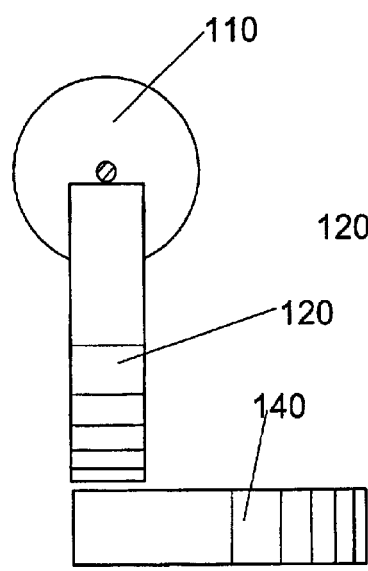
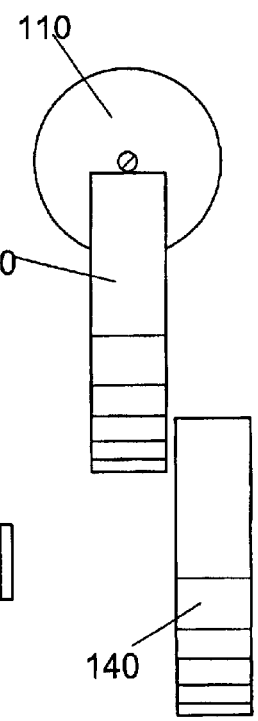
FIG. 5A
FIG. 5B
FIG. 5D
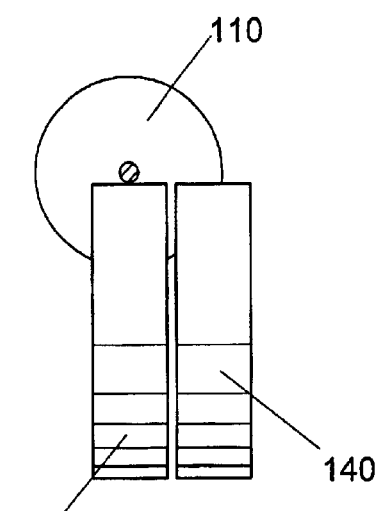
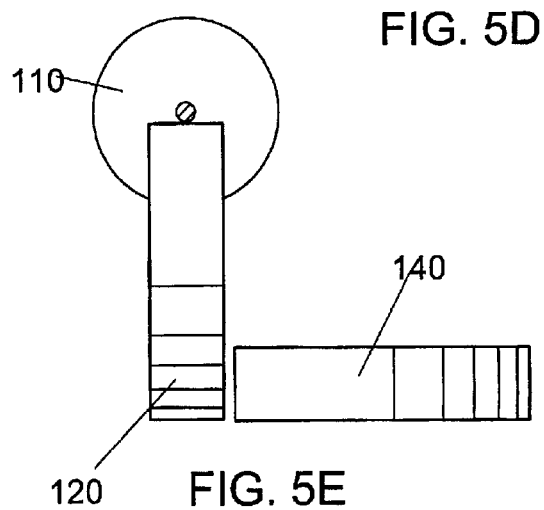
FIG. 5C
FIG. 5E

RESONANT OPTICAL MODULATORS

RELATED APPLICATIONS

This application claims priority based on prior-filed co-pending U.S. provisional App. No. 60/257,248 entitled "Modulators for resonant optical power control devices and methods of fabrication and use thereof", filed Dec. 21, 2000 in the name of Oskar J. Painter, Peter C. Sercel, Kerry J. Vahala, and Guido Hunziker, said provisional application being hereby incorporated by reference as if fully set forth herein. This application claims priority based on prior-filed co-pending U.S. provisional App. No. 60/257,218 entitled "Waveguides and resonators for integrated optical devices and methods of fabrication and use thereof", filed Dec. 21, 2000 in the name of Oskar J. Painter, said application being hereby incorporated by reference as if fully set forth herein.

GOVERNMENT RIGHTS

The U.S. Government may have limited rights in this application pursuant to Office of Naval Research Contract No. N00014-00-1-0072 via California Institute of Technology Subcontract No. 1008921. The U.S. Government may have limited rights in this application pursuant to DARPA Contract No. N00014-00-3-0023.

FIELD OF THE INVENTION

The field of the present invention relates to optical fiber communications. In particular, novel optical components, and methods of fabrication and use thereof, are described herein for modulating, switching, routing, and otherwise controlling optical signals in a wavelength specific manner.

BACKGROUND

This application is related to subject matter disclosed in:

A1) U.S. provisional Application No. 60/111,484 entitled "An all-fiber-optic modulator" filed Dec. 7, 1998 in the names of Kerry J. Vahala and Amnon Yariv, said provisional application being hereby incorporated by reference in its entirety as if fully set forth herein;

A2) U.S. Application No. 09/454,719, now U.S. Pat. No. 6,633,696 entitled "Resonant optical wave power control devices and methods" filed Dec. 7, 1999 in the names of Kerry J. Vahala and Amnon Yariv, said application being hereby incorporated by reference in its entirety as if fully set forth herein;

A3) U.S. provisional Application No.60/108,358 entitled "Dual tapered fiber-microsphere coupler" filed Nov. 13, 1998 in the names of Kerry J. Vahala and Ming Cai, said provisional application being hereby incorporated by reference in its entirety as if fully set forth herein;

A4) U.S. Application No.09/440,311, now U.S. Pat. No. 6,580,851 entitled "Resonator fiber bi-directional coupler" filed Nov. 12, 1999 in the names of Kerry J. Vahala, Ming Cai, and Guido Hunziker, said application being hereby incorporated by reference in its entirety as if fully set forth herein;

A5) U.S. provisional Application No.60/183,499 entitled "Resonant optical power control devices and methods of fabrication thereof" filed Feb. 17, 2000 in the names of Peter C. Sercel and Kerry J. Vahala, said provisional application being hereby incorporated by reference in its entirety as if fully set forth herein;

A6) U.S. provisional Application No.60/226,147 entitled "Fiber-optic waveguides for evanescent optical coupling and methods of fabrication and use thereof", filed Aug. 18, 2000 in the names of Peter C. Sercel, Guido Hunziker, and Robert B. Lee, said provisional application being hereby incorporated by reference in its entirety as if fully set forth herein;

A7) U.S. provisional Application No. 60/170,074 entitled "Optical routing/switching based on control of waveguide-ring resonator coupling", filed Dec. 9, 1999 in the name of Amnon Yariv, said provisional application being hereby incorporated by reference in its entirety as if fully set forth herein;

A8) U.S. Pat. No. 6,052,495 entitled "Resonator modulators and wavelength routing switches" issued Apr. 18, 2000 in the names of Brent E. Little, James S. Foresi, and Hermann A. Haus, said patent being hereby incorporated by reference in its entirety as if fully set forth herein;

A9) U.S. Pat. No. 6,101,300 entitled "High efficiency channel drop filter with absorption induced on/off switching and modulation" issued Aug. 8, 2000 in the names of Shanhui Fan, Pierre R. Villeneuve, John D. Joannopoulos, Brent E. Little, and Hermann A. Haus, said patent being hereby incorporated by reference in its entirety as if fully set forth herein;

Ab 10) U.S. Pat. No. 5,926,496 entitled "Semiconductor micro-resonator device" issued Jul. 20, 1999 in the names of Seng-Tiong Ho and Deanna Rafizadeh, said patent being hereby incorporated by reference in its entirety as if fully set forth herein;

A11) U.S. Pat. No. 6,009,115 entitled "Semiconductor micro-resonator device" issued Dec. 28, 1999 in the name of Seng-Tiong Ho, said patent being hereby incorporated by reference in its entirety as if fully set forth herein;

A12) U.S. provisional Application No.60/257,218 entitled"Wave guides and resonators for integrated optical devices and methods of fabrication and use thereof", filed Dec. 21, 2000 in the name of Oskar J. Painter, said provisional application being hereby incorporated by reference in its entirety as if fully set forth herein;

A13) U.S. provisional Application No.60/257,248 entitled "Modulators for resonant optical power control devices and methods of fabrication and use thereof", filed Dec. 21, 2000 in the names of Oskar J. Painter, Kerry J. Vahala, Peter C. Sercel, and Guido Hunziker, said provisional application being hereby incorporated by reference in its entirety as if fully set forth herein;

A14) U.S. provisional Application No.60/301,519 entitled "Waveguide-fiber Mach-Zender interferometer and methods of fabrication and use thereof", filed Jun. 27, 2001 in the names of Oskar J. Painter, David W. Vernooy, and Kerry J. Vahala, said provisional application being hereby incorporated by reference in its entirety as if fully set forth herein;

A15) U.S. non-provisional Application No.09/788,303 entitled "Cylindrical processing of optical media", filed Feb. 16, 2001 in the names of Peter C. Sercel, Kerry J. Vahala, David W. Vernooy, and Guido Hunziker, said non-provisional application being hereby incorporated by reference in its entirety as if fully set forth herein;

A16) U.S. non-provisional Application No.09/788,331 entitled "Fiber-ring optical resonators", filed Feb. 16, 2001 in the names of Peter C. Sercel, Kerry J. Vahala, David W. Vernooy, Guido Hunziker, and Robert B. Lee, said non-provisional application being hereby incorporated by reference in its entirety as if fully set forth herein;

A17) U.S. non-provisional Application No.09/788,300 entitled "Resonant optical filters", filed Feb. 16, 2001 in the names of Kerry J. Vahala, Peter C. Sercel, David W. Vernooy, Oskar J. Painter, and Guido Hunziker, said non-provisional application being hereby incorporated by reference in its entirety as if fully set forth herein;

A18) U.S. non-provisional Application No.09/788,301 entitled "Resonant optical power control device assemblies", filed Feb. 16, 2001 in the names of Peter C. Sercel, Kerry J. Vahala, David W. Vernooy, Guido Hunziker, Robert B. Lee, and Oskar J. Painter, said non-provisional application being hereby incorporated by reference in its entirety as if fully set forth herein;

A19) U.S. provisional Application No. 60/333,236 entitled "Alignment apparatus and methods for transverse optical coupling", Docket No. CQC16P, filed Nov. 23, 2001 in the names of Charles I. Grosjean, Guido Hunziker, Paul M. Bridger, and Oskar J. Painter, said provisional application being hereby incorporated by reference in its entirety as if fully set forth herein;

A20) U.S. non-provisional Application No. 10/037,966, filed Dec. 21, 2001 entitled "Multi-layer dispersion-engineered waveguides and resonators", Docket No. CQC14NP, filed concurrently with the present application in the names of Oskar J. Painter, David W. Vernooy, and Kerry J. Vahala, said non-provisional application being hereby incorporated by reference in its entirety as if fully set forth herein.

This application is also related to subject matter disclosed in the following publications, each of said publications being hereby incorporated by reference in its entirety as if fully set forth herein:

P1) Ming Cai, Guido Hunziker, and Kerry Vahala, "Fiber-optic add-drop device based on a silica microsphere whispering gallery mode system", IEEE Photonics Technology Letters Vol. 11 686 (1999);

P2) J. C. Knight, G. Cheung, F. Jacques, and T. A. Birks, "Phased-matched excitation of whispering gallery-mode resonances by a fiber taper", Optics Letters Vol. 22 1129 (1997);

P3) R. D. Pechstedt, P. St. J. Russell, T. A. Birks, and F. D. Lloyd-Lucas, "Selective coupling of fiber modes with use of surface-guided Bloch modes supported by dielctric multilayer stacks", J. Opt. Soc. Am. A Vol. 12(12) 2655 (1995);

P4) R. D. Pechstedt, P. St. J. Russell, "Narrow-band in-line fiber filter using surface-guided Bloch modes supported by dielectric multilayer stacks", J. Lightwave Tech. Vol. 14(6) 1541 (1996);

P5) Hiroshi Wada, Takeshi Kamijoh, and Yoh Ogawa, "Direct bonding of InP to different materials for optical devices", Proceedings of the third international symposium on semiconductor wafer bonding: Physics and applications, Electrochemical Society Proceedings, Princeton N.J., Vol. 95-7, 579-591 (1995);

P6) R. H. Horng, D. S. Wuu, S. C. Wei, M. F. Huang, K. H. Chang, P. H. Liu, and K. C. Lin, "AlGaInP/AuBe/glass light emitting diodes fabricated by wafer-bonding technology", Appl. Phys. Letts. Vol. 75(2) 154 (1999);

P7) Y. Shi, C. Zheng, H. Zhang, J. H. Bechtel, L. R. Dalton, B. B. Robinson, W. Steier, "Low (sub-1-volt) halfwave voltage polymeric electro-optic modulators achieved by controlling chromophore shape", Science Vol. 288, 119 (2000);

P8) E. L. Wooten, K. M. Kissa, and A. Yi-Yan, "A review of lithium niobate modulators for fiber-optic communications systems", IEEE J. Selected Topics in Quantum Electronics, Vol. 6(1), 69 (2000);

P9) D. L. Huffaker, H. Deng, Q. Deng, and D. G. Deppe, "Ring and stripe oxide-confined vertical-cavity surface-emitting lasers", Appl. Phys. Lett., Vol. 69(23), 3477 (1996);

P10) Serpenguzel, S. Arnold, and G. Griffel, "Excitation of resonances of microspheres on an optical fiber", Opt. Lett. Vol. 20, 654 (1995);

P11) F. Treussart, N. Dubreil, J. C. Knight, V. Sandoghar, J. Hare, V. Lefevre-Seguin, J. M. Raimond, and S. Haroche, "Microlasers based on silica microspheres", Ann. Telecommun. Vol. 52, 557 (1997);

P12) M. L. Gorodetsky, A. A. Savchenkov, V. S. Ilchenko, "Ultimate Q of optical microsphere resonators", Optics Letters, Vol. 21, 453 (1996);

P13) Carl Arft, Diego R. Yankelovich, Andre Knoesen, Erji Mao, and James S. Harris Jr., "In-line fiber evanescent field electrooptic modulators", Journal of Non-linear Optical Physics and Materials Vol. 9(1) 79 (2000);

P14) Pochi Yeh, Amnon Yariv, and Chi-Shain Hong, "Electromagnetic propagation in periodic stratified media. I. General theory", J. Optical Soc. Am., Vol. 67(4) 423 (1977);

P15) Ming Cai, Oskar Painter, and Kerry J. Vahala, "Observation of critical coupling in a fiber taper to a silica-microsphere whispering-gallery mode system", Physical Review Letters, Vol. 85(1) 74 (2000);

P16) M. Kondow, T. Kitatani, S. Nakatsuka, M. C. Larson, K. Nakahara, Y. Yazawa, M. Okai, and K. Uomi, "GaInNAs: A novel material for long-wavelength semiconductor lasers", IEEE Journal of Selected Topics in Quantum Electronics, Vol 3(3), 719 (1997);

P17) H. Saito, T. Makimoto, and N. Kobayashi, "MOVPE growth of strained InGaAsN/GaAs quantum wells", J. Crystal Growth, Vol. 195 416 (1998);

P18) W. G. Bi and C. W. Tu, "Bowing parameter of the band-gap energy of $GaN_xAs_{1-y}$". Appl. Phys. Lett. Vol. 70(12) 1608 (1997);

P19) H. P. Xin and C. W. Tu, "GaInNAs/GaAs multiple quantum wells grown by gas-source molecular beam epitaxy", Appl. Phys Lett. Vol. 72(19) 2442 (1998);

P20) B. Koley, F. G. Johnson, O. King, S. S. Saini, and M. Dagenais, "A method of highly efficient hydrolization oxidation of III–V semiconductor lattice matched to indium phosphide", Appl. Phys. Lett. Vol. 75(9) 1264 (1999);

P21) Z. J. Wang, S. -J. Chua, F. Zhou, W. Wang, and R. H. Wu, "Buried heterostructures InGaAsP/InP strain-compensated multiple quantum well laser with a native-oxidized InAlAs current blocking layer", Appl. Phys. Lett. Vol 73(26) 3803 (1998);

P22) N. Ohnoki, F. Koyama, and K. Iga, "Superlattice AlAs/AlInAs-oxide current aperture for long wavelength InP-based vertical-cavity surface-emitting laser structure", Appl. Phys. Lett. Vol. 73(22) 3262 (1998);

P23) N. Ohnoki, F. Koyama, and K. Iga, "Super-lattice AlAs/AlInAs for lateral-oxide current confinement in InP-based lasers", J. Crystal Growth Vol. 195 603 (1998);

P24) K. D. Choquette, K. M. Geib, C. I. H. Ashby, R. D. Twesten, 0. Blum, H. Q. Hou, D. M. Follstaedt, B. E. Hammons, D. Mathes, and R. Hull, "Advances in selective wet oxidation of AlGaAs alloys", IEEE Journal of Selected Topics in Quantum Electronics Vol. 3(3) 916(1997);

P25) M. H. MacDougal, P. D. Dapkus, "Wavelength shift of selectively oxidized $Al_xO_y$—AlGaAs—GaAs distributed Bragg reflectors", IEEE Photonics Tech. Lett. Vol. 9(7) 884 (1997);

P26) C. I. H. Ashby, M. M. Bridges, A. A. Alleman, B. E. Hammons, "Origin of the time dependence of wet oxidation of AlGaAs", Appl. Phys. Lett. Vol. 75(1) 73 (1999);

P27) P. Chavarkar, L. Zhao, S. Keller, A. Fisher, C. Zheng, J. S. Speck, and U. K. Mishra, "Strain relaxation of $In_xGa_{1-x}As$ during lateral oxidation of underlying AlAs layers", Appl. Phys. Lett. Vol. 75(15) 2253 (1999);

P28) R. L. Naone and L. A. Coldren, "Surface energy model for the thickness dependence of the lateral oxidation of AlAs", J. Appl. Phys. Vol. 82(5) 2277 (1997);

P29) M. H. MacDougalP. D. Dapkus, A. E. Bond, C. -K. Lin, and J. Geske, "Design and fabrication of VCSEL's with $Al_xO_y$-GaAs DBR's", IEEE Journal of Selected Topics in Quantum Electronics Vol. 3(3) 905 (1997);

P30) E. I. Chen, N. Holonyak, Jr., and M. J. Ries, "Planar disorder- and native-oxide-defined photopumped AlAs—Gas superlattice minidisk lasers", J. Appl. Phys. Vol. 79(11) 8204 (1996); and P31) Y. Luo, D. C. Hall, L. Kou, L. Steingart, J. H. Jackson, O. Blum, and H. Hou, "Oxidized $Al_xGa_{1-x}As$ heterostructures planar waveguides", Appl. Phys. Lett. Vol. 75(20) 3078 (1999).

Optical fiber and propagation of high-data-rate optical pulse trains therethrough has become the technology of choice for high speed telecommunications. Wavelength division multiplexing (WDM) techniques are now commonly used to independently transmit a plurality of signals over a single optical fiber, independent data streams being carried by optical fields propagating through the optical fiber at a slightly differing optical carrier wavelengths (i.e., signal channels). WDM techniques include dense wavelength division multiplexing (DWDM) schemes, wherein the frequency spacing between adjacent signal channels may range from a few hundred GHz down to a few GHz. A propagating mode of a particular wavelength must be modulated, independently of other propagating wavelengths, in order to carry a signal. A signal carried by a particular wavelength channel must be independently accessible for routing from a particular source to a particular destination. These requirements have previously required complex and difficult-to-manufacture modulating and switching devices requiring extensive active alignment procedures during fabrication/assembly, and as a result are quite expensive. Such devices may require conversion of the optical signals to electronic signals and/or vice versa, which is quite power consuming and inefficient. In various of the patent applications cited above a new approach has been disclosed for controlling optical power transmitted through an optical fiber that relies on the use of resonant circumferential-mode optical resonators, or other optical resonators, for direct optical coupling to a propagating mode of an optical fiber resonant with the optical resonator, thereby enabling wavelength-specific modulation, switching, and routing of optical signals propagating through the optical fiber. A thorough discussion of the features and advantages of such optical power control devices and techniques, as well as methods of fabrication, may be found in these applications, already incorporated by reference herein.

One important element of these latter devices is optical coupling between a fiber-optic waveguide and a circumferential-mode optical resonator. The circumferential-mode optical resonator provides wavelength specificity, since only optical signals substantially resonant with the circumferential-mode optical resonator will be significantly affected by the device. A fiber-optic waveguide for transmitting the optical signal through the control device is typically provided with an transverse-coupling segment, where an evanescent portion of the optical signal extends beyond the waveguide and overlaps a portion of a circumferential optical mode of the circumferential-mode optical resonator, thereby optically coupling the circumferential-mode optical resonator and the fiber-optic waveguide. The transverse-coupling segment may take one of several forms, including an optical fiber taper, D-shaped optical fiber, an optical fiber with a saddle-shaped concavity in the cladding layer, and/or other functionally equivalent configurations. These are discussed in detail in various patent applications cited herein.

The circumferential-mode optical resonator structure may comprise a glass micro-sphere or micro-disk, a fiber-ring resonator, a semiconductor ring/waveguide, or other functionally equivalent structure, described in detail in various earlier-cited applications. A high-Q circumferential-mode optical resonator supports relatively narrow-linewidth resonant circumferential optical modes (i.e., having a linewidth consistent with typical linewidths of a WDM system, TDM system, or other optical data transmission system), which in an optical power control device may optically couple to optical signals of the fiber-optic waveguide of substantially resonant optical wavelength. The circumferential-mode optical resonator therefore provides the wavelength selectivity of the optical power control device. Non-resonant propagating optical signals pass by the circumferential-mode optical resonator relatively undisturbed, and are transmitted through the device. By controllably adjusting the loss per round trip experienced by the circumferential optical mode circulating about the circumferential-mode optical resonator, the optical power control device may function in either of two modes:

1) Switching the circumferential-mode optical resonator between an over-coupled condition (where the loss per round trip in the circumferential-mode optical resonator is small compared to the optical coupling between the fiber-optic waveguide and circumferential-mode optical resonator, and the transmission through the fiber-optic waveguide past the resonator is large) and the condition of critical coupling (at which the optical coupling of the fiber-optic waveguide and circumferential-mode optical resonator is substantially equal to the round trip loss of the circumferential-mode optical resonator, and substantially all of the optical power is dissipated by/from the circumferential-mode optical resonator resulting in near zero optical transmission through the fiber-optic waveguide past the circumferential-mode optical resonator); or 2) Switching states between the condition of critical coupling (near zero transmission through the fiber-optic waveguide) and a condition of under-coupling (where the loss per round trip in the circumferential-mode optical resonator is large compared to the optical coupling between the fiber-optic waveguide and circumferential-mode optical resonator, and the transmission through the fiber-optic waveguide past the circumferential-mode optical resonator is non-zero).

For each of these modes of operation, there are essentially two classes of mechanism by which one can introduce round trip loss to a circulating optical wave (i.e., resonant circumferential optical mode) in the circumferential-mode resonator. Either optical power of the circulating wave can be absorbed within the resonator, or it can be gated out of the circumferential-mode optical resonator into a second optical component, such as a second waveguide or second resonator. The gating may preferably be achieved by control of the optical coupling between the circumferential-mode optical resonator and the second optical component and functions rather like a trapdoor. These two general possibilities are both disclosed in several earlier-cited applications. The current disclosure describes such devices in greater detail, particularly optical loss components, elements, and/or transducers provided as a separate component to control optical loss from a circumferential-mode resonator by either of these means (as distinguished from designs in which the loss control component is an integral part of the circumferential-mode optical resonator structure).

SUMMARY

Certain aspects of the present invention may overcome one or more aforementioned drawbacks of the previous art and/or advance the state-of-the-art of resonant optical filters, and in addition may meet one or more of the following objects:

To provide a resonant optical power control device, and methods for fabricating and using the same, wherein a modulator optical component transverse-coupled to a circumferential-mode optical resonator provides a controlled level of circumferential-mode resonator round-trip optical loss, enabling controlled modulation of a level of transmission of a optical signal power through a transmission fiber-optic waveguide (transverse-coupled to the circumferential-mode optical resonator) when the optical signal is substantially resonant with the circumferential optical mode;

To provide a resonant optical power control device, and methods for fabricating and using the same, wherein the modulator optical component comprises an open optical waveguide (i.e., a modulator optical waveguide);

To provide a resonant optical power control device, and methods for fabricating and using the same, wherein the modulator optical component comprises a closed optical waveguide (i.e., a modulator optical resonator);

To provide a resonant optical power control device, and methods for fabricating and using the same, wherein the circumferential-mode resonator round-trip optical loss may be controlled by controlling optical loss of the modulator optical component;

To provide a resonant optical power control device, and methods for fabricating and using the same, wherein the circumferential-mode resonator round-trip optical loss may be controlled by controlling a modal-index of the modulator optical component;

To provide a resonant optical power control device, and methods for fabricating and using the same, wherein the circumferential-mode resonator round-trip optical loss may be controlled by controlling optical power transfer from the optical resonator to the modulator optical component;

To provide a resonant optical power control device, and methods for fabricating and using the same, wherein the circumferential-mode resonator round-trip optical loss may be controlled by controlling a resonant optical frequency of the modulator optical resonator;

To provide a resonant optical power control device, and methods for fabricating and using the same, wherein the circumferential-mode resonator round-trip optical loss may be controlled by controlling a resonant optical frequency of the circumferential-mode optical resonator;

To provide a resonant optical power control device, and methods for fabricating and using the same, wherein the modulator optical component includes an electro-active material and a modulator control component for applying an electronic control signal thereto;

To provide a resonant optical power control device, and methods for fabricating and using the same, wherein the modulator optical component includes a non-linear-optical material and a modulator control component for applying an optical control signal thereto;

To provide a resonant optical power control device, and methods for fabricating and using the same, wherein the modulator optical component includes a laterally-confined multi-layer dispersion-engineered waveguide structure;

To provide a resonant optical power control device, and methods for fabricating and using the same, wherein the transmission fiber-optic waveguide, the circumferential-mode optical resonator, and the modulator optical component, may be accurately, reliably, and stably positioned and secured within the device; and To provide a resonant optical power control device, and methods for fabricating and using the same, wherein the transmission fiber-optic waveguide, the circumferential-mode optical resonator, and the modulator optical component are positioned by and secured to an alignment device.

One or more of the foregoing objects may be achieved in the present invention by an optical power control device comprising: a) a transmission optical waveguide; b) a resonant optical component including at least one circumferential-mode optical resonator; c) a modulator optical component; and d) a modulator control component. The transmission fiber-optic waveguide supports a propagating optical mode (wherein flows the optical signal power to be controlled by the device) and is provided with an transverse-coupling segment. The circumferential-mode optical resonator is positioned relative to the transmission fiber-optic waveguide so as to be transverse-coupled to the transmission optical waveguide. The modulator optical component is positioned so as to be transverse-coupled to the circumferential-mode optical resonator. The modulator control component is operatively coupled to the modulator optical component for modulating, in response to an applied control signal, i) a level of optical signal power transfer by transverse-coupling between the circumferential-mode optical resonator and the modulator optical component, ii) a level of optical loss of the modulator optical component, and iii) a resonant frequency of the modulator optical component, thereby enabling controlled modulation of a coupling condition between the transmission optical waveguide and the circumferential optical resonator, in turn enabling controlled modulation of a level of transmission of the optical signal through the transmission optical waveguide between a higher operational optical transmission level and a lower operational optical transmission level when the optical signal is substantially resonant with the resonant optical component.

The modulator optical component may comprise an open optical waveguide or a closed optical waveguide (i.e., a modulator optical resonator). The modulator optical component may include an electro-active material and/or a non-linear-optical material, so that application of an electronic and/or optical control signal enables control of transmission of the optical signal through the transmission optical waveguide by controlling a coupling condition between the transmission optical waveguide and the resonant optical component.

The transmission optical waveguide, the circumferential-mode optical resonator, and the modulator optical component may be accurately, reliably, and stably positioned and secured within the optical power control device using an alignment device. An alignment device may include first and second alignment substrates, the transmission optical waveguide being positioned and secured within an alignment groove on the first alignment substrate, the modulator optical component being secured to the second alignment substrate, the circumferential-mode resonator being positioned and secured on the first or the second substrate, the assembled alignment device suitably positioning the modulator optical component, circumferential-mode resonator, and transmission optical waveguide relative to each other.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIG. 1 shows a resonant optical filter according to the present invention.

FIGS. 5A, 5B, 5C, 5D, and 5E are schematic diagrams of resonant optical filters according to the present invention.

Figure 4A:
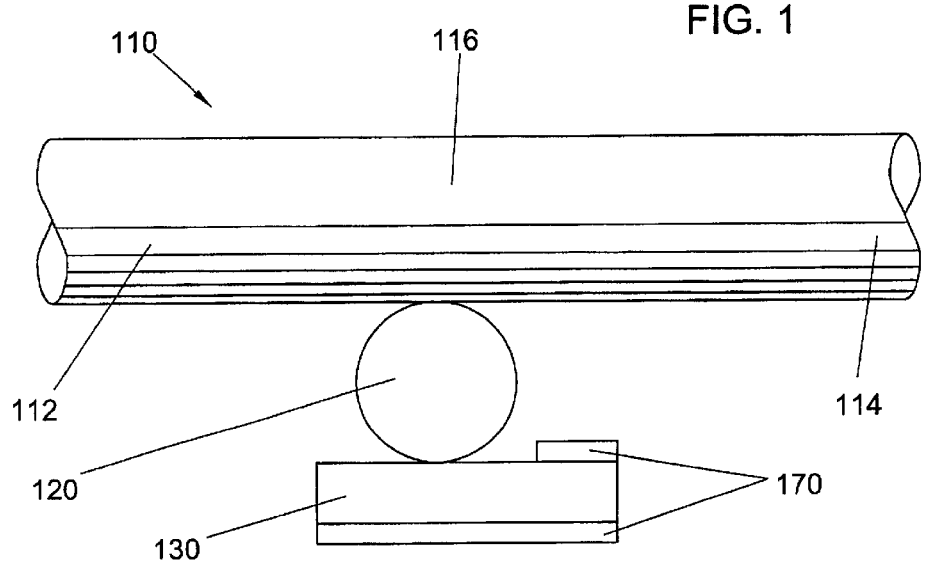
FIGS. 4A and 4B show side and end views, respectively, of a resonant optical filter according to the present invention.

It should be noted that the relative proportions of various structures shown in the Figures may be distorted to more clearly illustrate the present invention. In particular, the size differential and resonator thickness of fiber-rings may be greatly exaggerated relative to the underlying optical fiber diameter in various Figures for clarity. Various metal, semiconductor, and/or other thin films, layers, and/or coatings may also be shown having disproportionate and/or exaggerated thicknesses for clarity. Relative dimensions of various waveguides, resonators, optical fibers/tapers, and so forth may also be distorted, both relative to each other as well as transverse/longitudinal proportions. The text and incorporated references should be relied on for the appropriate dimensions of structures shown herein.

It should be noted that most of the Figures may each may depict one of several distinct embodiments of a resonant optical filter according to the present invention. Each set of embodiments corresponding to a particular Figure are similar in spatial arrangement, but differ in functional details that are not represented in the Figures. In particular, loss-modulated, index-modulated, resonance-modulated, interference-modulated embodiments may appear substantially similar in the Figures. The particular functional aspects of the different embodiments are described in different text sections that may each refer to one or more common Figures.

DETAILED DESCRIPTION OF PREFERRED AND ALTERNATIVE EMBODIMENTS

For purposes of the present written description and/or claims, "circumferential-mode optical resonator"

(equivalently, CMOR, CM optical resonator, CM resonator, CMR) shall denote a resonator structure capable of supporting a substantially resonant circumferential optical mode (equivalently, RCOM), the circumferential optical mode having an evanescent portion extending beyond the circumferential-mode optical resonator and typically being substantially confined near the surface of the resonator (near being defined here as within several microns for visible, near-, or mid-infrared circumferential optical modes). Such a resonator may also often be referred to as a whispering-gallery-mode optical resonator. Such resonator structures may include, but are not limited to, spheres, near-spheres, oblate and/or prolate spheroids, ellipsoids, ovals, ovoids, racetracks, polygons, polyhedra, cylinders, disks, rings, micro-spheres, micro-disks, micro-rings, fiber-rings, disks and/or rings on substrates, ring or other closed waveguides, and/or functional equivalents thereof. In particular, the various circumferential-mode optical resonator structures as disclosed in earlier-cited applications A5 and A15–A18 (denoted collectively as "fiber-rings", fiber-ring resonator, or FRR's) are particularly noted for inclusion as circumferential-mode optical resonators for purposes of this disclosure. However, other resonator structures may be equivalently employed without departing from inventive concepts disclose and/or claimed herein. Any resonator having an evanescent portion of a resonant optical mode or that may otherwise be transverse-coupled to another optical element (see definition hereinbelow) may be employed as the resonant optical component of the present invention (i.e., the component that confers wavelength specificity on the optical power control device). Optical resonator structures disclosed in earlier-cited applications A12 and A20 (denoted collectively as "MLR rings") are particularly noted for inclusion as optical resonators suitable for use in the present invention. Although the term "circumferential-mode optical resonator" is used throughout the remainder of the present disclosure, it should be understood that any optical resonator that may be transverse-coupled to a transmission waveguide and/or to an optical modulator as disclosed herein shall be considered functionally equivalent to a circumferential-mode optical resonator. It should also be noted that the terms "resonant optical component", "optical resonator", "circumferential-mode optical resonator", and so forth may encompass both single optical resonators as well as coupled systems of multiple optical resonators, unless a single- or multiple-resonator device is specifically designated in the text.

For purposes of the present written description and/or claims, a "transmission fiber-optic waveguide" (equivalently, transmission fiber-optic, transmission optical fiber, TFOWG) is particularly noted for inclusion as a transmission optical waveguide, and shall denote an optical fiber (polarization-maintaining or otherwise) provided with a transverse-coupling segment where an evanescent portion of an optical signal may extend beyond the fiber-optic waveguide and overlap a portion of some other optical mode, thereby enabling transverse-coupling between the transmission optical waveguide and another optical component. Such a transmission fiber-optic waveguide may comprise an fiber-optic taper, a D-shaped optical fiber, an optical fiber with a saddle-shaped concavity in the cladding layer, an optical fiber with a side-polished flattened portion, and/or functional equivalents. Such transmission optical waveguides are described in further detail in earlier-cited applications A1–A6 and A15–A18. Such transmission fiber-optic waveguides typically serve to facilitate insertion of resonant optical filters according to the present invention into an optical signal transmission system.

For purposes of the written description and/or claims, "transverse-coupling" (also referred to as transverse optical coupling, evanescent coupling, evanescent optical coupling, directional coupling, directional optical coupling) shall generally denote those situations in which two optical components, each capable of supporting a propagating and/or resonant optical mode and at least one having an evanescent portion of its optical mode extending beyond the respective optical component, are optically coupled by at least partial transverse spatial overlap of the evanescent portion of one optical mode with at least a portion of the other optical mode. The amount, strength, level, or degree of optical power transfer from one optical component to the other through such transverse optical coupling depends on the spatial extent of the overlap (both transverse and longitudinal), the spectral properties of the respective optical modes, and the relative spatial phase matching of the respective optical modes (also referred to as modal index matching). To transfer optical power most efficiently, the respective modal indices of the optical modes (equivalently, the respective modal propagation constants), each in its respective optical component, must be substantially equal. Mismatch between these modal indices decreases the amount of optical power transferred by transverse coupling between the optical components, since the coupled modes get further out of phase with each other as each propagates within its respective optical component and the direction of the optical power transfer eventually reverses itself. The propagation distance over which the modes interact (i.e., the effective interaction length) and the degree of modal-index matching (or mismatching) together influence the overall flow of optical power between the coupled modes. Optical power transfer between the coupled modes oscillates with a characteristic amplitude and spatial period as the modes propagate, each in its respective optical component.

Neglecting the effects of optical loss in the optical components, an ideal system consisting of two coupled modes can be characterized by the following coupled system of equations:

$$\frac{\partial E_1}{\partial z} = i\beta_1 E_1 + i\kappa E_2$$

$$\frac{\partial E_2}{\partial z} = i\beta_2 E_2 + i\kappa^* E_1$$

where the following definitions apply:
  $E_{1,2}$ amplitudes of the coupled fields;
  $\beta_{1,2}$ propagation constants of the coupled fields;
  $\kappa$ coupling amplitude resulting from spatial overlap of the fields;
  $z$ propagation distance coordinate.

For the purpose of illustration, it is assumed that the coupling amplitude $\kappa$ is constant over an interaction distance L. Then, an incident field of amplitude $E_1$ that is spatially confined to the first optical component before interaction will couple to the other wave guide with a resultant field amplitude $E_2(L)$ at $z=L$ (where we define $z=0$ as the start of the coupling region) given by the following expression, $$\frac{|E_2(L)|^2}{|E_1(0)|^2} = \frac{|\kappa|^2}{q^2}\sin^2(q\,L)$$

$$q^2 = |\kappa|^2 + \frac{1}{4}\Delta\beta^2.$$

Consider the modal-index mismatch term ($\Delta\beta=\beta_2-\beta_1$) and the interaction length in this expression. As is well known, a condition of modal-index mismatch between the two spatial modes causes an oscillatory power transfer to occur between the waveguides as the interaction length is varied. The spatial period of this oscillation, a so-called "beat length", can be defined as the distance over which power cycles back and forth between the guides. Greater amounts of modal-index mismatch will reduce the beat length. Also note that the absolute magnitude of power transfer will diminish with increasing modal-index mismatch. Finally, it is apparent that increased amounts of interaction length and/or increased modal-index mismatch will introduce an increased spectral selectivity to the optical power transfer.

By controlling the modal-index mismatch and/or transverse spatial overlap between optical modes, these characteristics may be exploited for controlling optical power transfer between optical components. For example, by altering the modal-index mismatch, a device may be switched from a first condition, in which a certain fraction of optical power is transferred from a first optical mode in a first optical component to a second optical mode in a second optical component (modal-index mismatch set so that the effective interaction length is about half of the characteristic spatial period described above), to a second condition in which little or no optical power is transferred (modal-index mismatch set so that the effective interaction length is about equal to the characteristic spatial period). Further discussion of optical coupling may be found in *Fundamentals of Photonics* by B. E. A. Saleh and M. C. Teich (Wiley, New York, 1991), hereby incorporated by reference in its entirety as if fully set forth herein. Particular attention is called to Chapters 7 and 18.

For purposes of the written description and/or claims, "index" may denote the bulk refractive index of a particular material (also referred to herein as a "material index") or may denote the propagation constant of a particular optical mode in a particular optical component (referred to herein as a "modal index"). As referred to herein, the term "low-index" shall denote any materials and/or optical structures having an index less than about 2.5, while "high-index" shall denote any materials and/or structures having an index greater than about 2.5. Within these bounds, "low-index" may preferably refer to silicas, glasses, oxides, polymers, and any other optical materials having indices typically between about 1.3 and about 1.8, and may include optical fiber, optical waveguides, and any other optical components incorporating such materials. Similarly, "high-index" may preferably refer to materials such as semiconductors or any other material having indices of about 3 or greater. The terms "high-index" and "low-index" are to be distinguished from the terms "lower-index" and "higher-index", also employed herein. "Low-index" and "high-index" refer to an absolute numerical value of the index (greater than or less than about 2.5), while "lower-index" and "higher-index" are relative terms indicating which of two materials has the larger index, regardless of the absolute numerical values of the indices.

For purposes of the written description and/or claims, the term "multi-layer reflector stack" or "MLR stack" or "MLR" shall denote a multi-layer structure wherein the layer index varies with each successive layer of the stack, yielding an optical structure having wavelength-dependent optical properties. An common example of such a structure is a distributed Bragg reflector (DBR), which may typically comprise alternating quarter-wave-thickness layers of a higher-index material and a lower-index material. The term "multi-layer reflector stack" shall denote any periodic, partially periodic, multi-periodic, quasi-periodic, graded-index, and/or similar multi-layer varying-index structure.

For purposes of the written description and/or claims, the term "electro-active" shall denote any material that may exhibit electro-optic and/or electro-absorptive properties. The term "non-linear-optical" shall denote any material that may exhibit non-linear optical properties, including both resonant and non-resonant non-linear-optical properties.

It should be noted that optical waveguides and resonators as described herein, optical modulators, interferometers, couplers, routers, add-drop filters, switches, and other devices incorporating such waveguides and/or resonators, their fabrication, and their use according to the present invention are intended primarily for handling optical modes having wavelengths between about 0.8 µm and about 1.0 µm (the wavelength range typically utilized for so-called short-haul fiber-optic telecommunications) and optical modes having wavelengths between about 1.2 µm and about 1.7 µm (the wavelength range typically utilized for so-called long-haul fiber-optic telecommunications). However, these devices, methods of fabrication, and methods of use may be adapted for use at any desired wavelength while remaining within the scope of inventive concepts disclosed and/or claimed herein.

A typical resonant optical modulator according to the present invention is shown schematically in FIG. 1. In subsequent Figures, specific embodiments for transmission optical waveguide 110, circumferential-mode resonator 120, and/or alignment structures therefor may be shown. These are illustrative and exemplary, and should not be construed as limiting the scope of the present invention as shown, described, and/or claimed except when specifically recited in a particular claim. Transmission waveguide 110 is typically an optical fiber taper, although a side etched optical fiber (as in earlier-cited application A6) is also shown, and any other transmission waveguide having a suitable transverse-coupling segment may be equivalently employed. Circumferential-mode resonator 120 is typically shown as fiber-ring resonator (as in earlier-cited applications A5 and A15–A18), although any other optical resonator suitable for transverse-coupling to a transmission waveguide and a modulator optical component may be equivalently employed. An optical signal enters an input end 112 of transmission fiber-optic waveguide 110, and exits an output end 114 of transmission waveguide 110. Transmission waveguide 110 is provided with a transverse-coupling segment 116, that may include a fiber-optic-taper segment of a fiber-optic waveguide (as described, for example, in earlier-cited applications A1 through A5), a saddle- or pit-shaped transverse-coupling portion of a cladding layer surface of a fiber-optic waveguide (as described in earlier-cited application A6), or other functionally equivalent structure. A circumferential-mode optical resonator 120 supports a substantially resonant circumferential optical mode. The circumferential-mode optical resonator 120 is positioned relative to the transverse-coupling segment of the transmission waveguide 110 so as to be transverse-coupled thereto. The circumferential-mode optical resonator 120 provides the wavelength selectivity of modulator. Unless the optical signal is substantially resonant with the circumferential-mode resonator 120, optical signal power transfer into and/or dissipation of optical signal power from the circumferential-mode resonator 120 is/are negligible, and the optical signal is transmitted through the transmission waveguide 110 substantially unaffected by the presence of resonator 120 or the operational state of control device.

In contrast, when the optical signal is substantially resonant with the circumferential-mode resonator 120, optical signal power transfer into and circulation within resonator 120 may be quite substantial. For a relatively high-Q circumferential-mode optical resonator (on the order of $10^6$ may be achieved; $10^4$–$10^5$ typically employed in devices according to the present invention), the level of circulating optical signal power in the circumferential optical mode may reach a level many times higher than the incident optical signal power. Slight changes in the optical loss per round trip for this circulating radiation dramatically affects the level of transmission of the optical signal through the transmission waveguide 110. By controllably adjusting this optical loss per round trip, the resonant optical modulator may function in either of two modes:

1) Switching the circumferential-mode optical resonator between an over-coupled condition (where the loss per round trip in the circumferential-mode optical resonator is small compared to the optical coupling between the fiber-optic waveguide and circumferential-mode optical resonator, and the transmission through the fiber-optic waveguide past the resonator is large) and the condition of critical coupling (at which the optical coupling of the fiber-optic waveguide and circumferential-mode optical resonator is substantially equal to the round trip loss of the circumferential-mode optical resonator, and substantially all of the optical power is dissipated by/from the circumferential-mode optical resonator resulting in near zero optical transmission through the fiber-optic waveguide past the circumferential-mode optical resonator); or 2) Switching states between the condition of critical coupling (near zero transmission through the fiber-optic waveguide) and a condition of under-coupling (where the loss per round trip in the circumferential-mode optical resonator is large compared to the optical coupling between the fiber-optic waveguide and circumferential-mode optical resonator, and the transmission through the fiber-optic waveguide past the circumferential-mode optical resonator is non-zero).

For purposes of the present written description and/or claims, it shall be assumed (unless specifically stated otherwise) that the optical signal to be modulated is substantially resonant with the resonant optical component that includes at least one circumferential-mode optical resonator.

Figure 25:
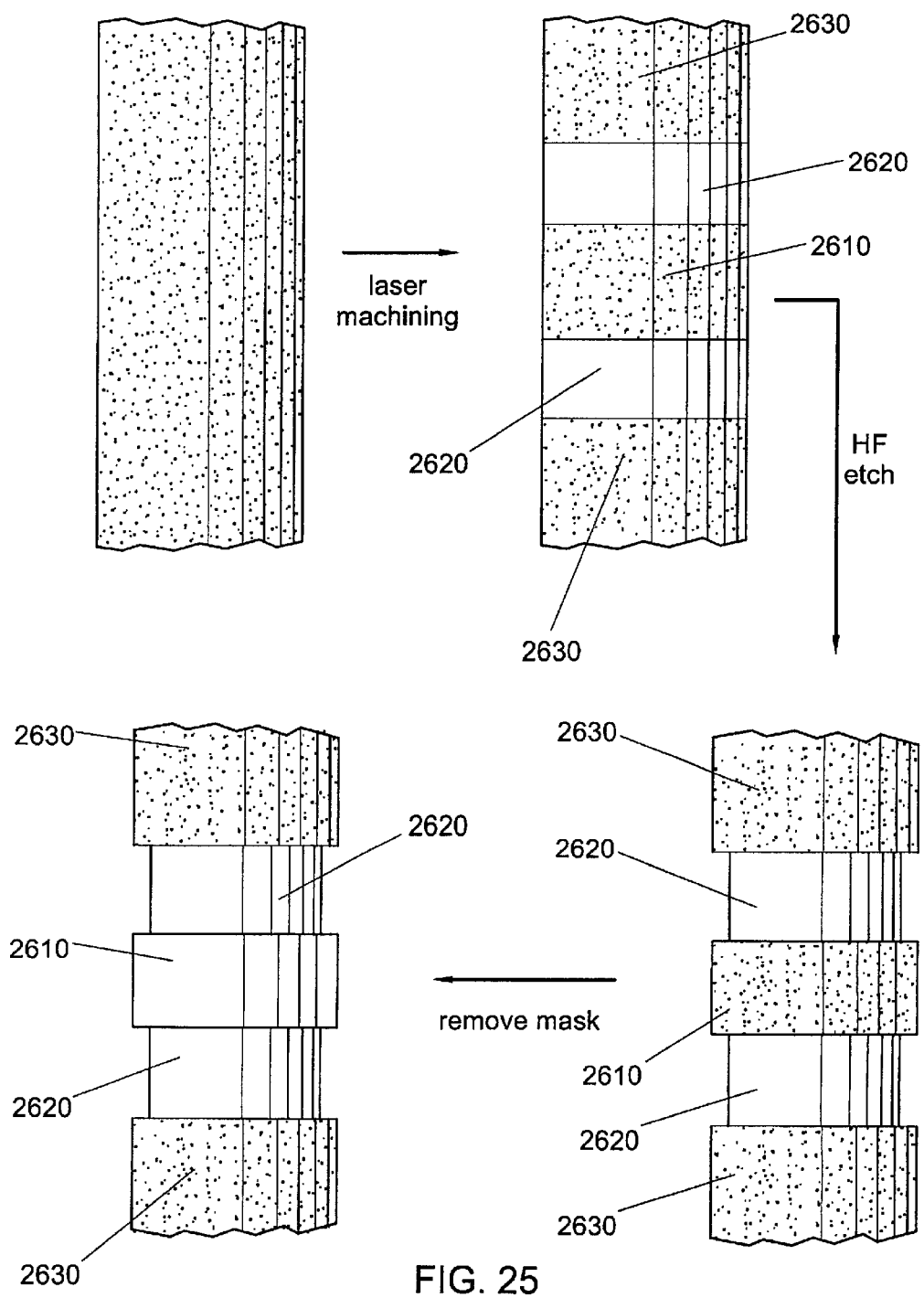
FIG. 25 illustrates a method for fabricating a circumferential-mode resonator on an optical fiber according to the present invention. All views are side views, and stippled shading indicates the presence of an outer coating remaining on the optical fiber.

A preferred circumferential-mode optical resonator is a ring resonator fabricated on an optical fiber as disclosed in earlier-cited applications A5 and A15–A18, referred to a fiber-ring resonator (FRR). As shown in FIG. 25, a fiber-ring resonator may typically include a transverse resonator fiber segment 2610 having a circumferential optical pathlength sufficiently longer than longitudinally adjacent portions 2620 of surrounding fiber segments 2630 so as to support one or more resonant circumferential optical modes confined near the resonator fiber segment. The optical pathlength differential may be most readily provided by providing a radius differential between the resonator fiber segment 2610 and the longitudinally adjacent portions 2620 of the surrounding fiber segments 2630 (the resonator fiber segment having the larger radius). For use in a resonant optical modulator according to the present invention, a fiber-ring resonator may have a diameter ranging between about 10 μm and a few millimeters, preferably between about 20 μm and about 200 μm, and most preferably between about 100 μm and about 150 μm. The fiber-ring resonator may have a radius differential (resonator segment radius greater than the adjacent portions of the surrounding segments of the resonator fiber) ranging between about 0.1 μm and about 20 μm, preferably between about 0.5 μm and about 1.5 82 m. The width of the resonator segment may range between about 1 μm and about 10 μm, preferably between about 2 μm and about 4 μm. These size differentials and resonator widths are generally sufficient to substantially confine a circumferential mode with minimum number of nodes along the fiber axis or in the radial direction and confined at least partially within the resonator segment, while not confining higher-order modes as well (if at all).

It has been observed, however, that a circumferential-mode resonator having a diameter of about 125 μm, a size differential of 1–2 μm, and a resonator segment thickness of about 5 μm may support a circumferential mode with minimum number of nodes along the fiber axis or in the radial direction, but also higher-spatial-order circumferential-mode modes having planar nodal surfaces perpendicular to the axis of the resonator segment. These higher-spatial-order modes are frequency shifted with respect to the lowest-order mode, thereby degrading the frequency selectivity (i.e., decreased frequency spacing between modes) of the circumferential-mode resonator. This problem may be mitigated in several ways. In a first method, it has been observed that a smaller size differential between the resonator segment and the adjacent portions (between about 0.5 μm and about 1.5 μm) confines the circumferential optical modes more weakly than a larger size differential. This effect becomes substantially more pronounced for higher-spatial-order modes, which extend further beyond the resonator segment than lower-order modes. Sufficient reduction of the size differential results in substantial suppression of all higher-order modes. In a second method, the thickness of the resonator segment may be reduced from about 5 μm to about 1 μm in order to remove higher order spatial modes.

Figure 26:
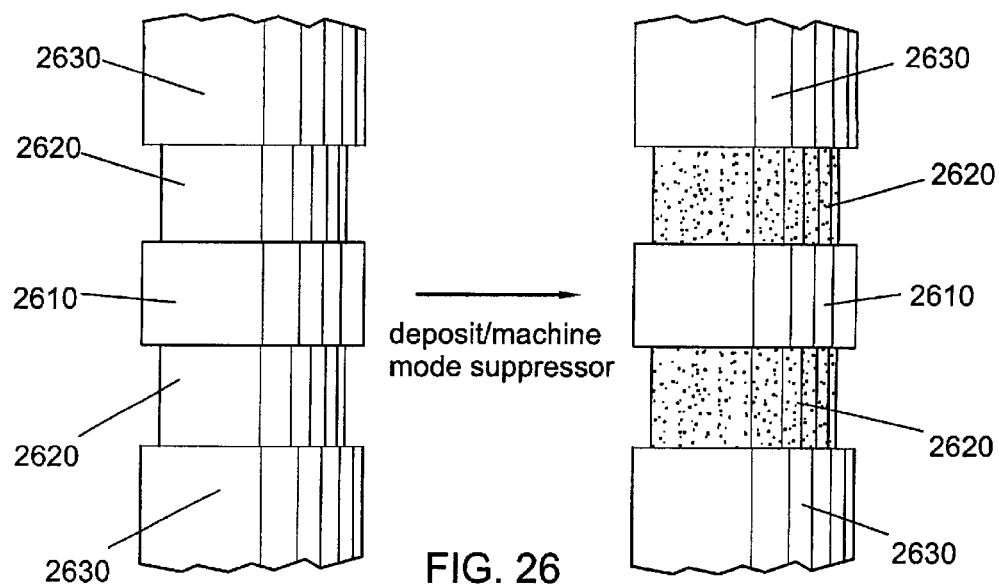
FIG. 26 illustrates a method for fabricating a circumferential-mode resonator on an optical fiber according to the present invention. All views are side views, and stippled shading indicates the presence of an outer coating deposited on the optical fiber.

Alternatively, the fiber-ring resonator may be provided with mode suppressor structures for suppressing de-localized (i.e., higher-order) optical modes supported by the fiber-ring resonator and/or resonator fiber. Such mode suppressors may be adapted for selectively providing optical loss for undesirable, de-localized optical modes, while leaving the desired circumferential optical mode substantially undisturbed. Such mode suppressors may take the form of a fiber coating left in place on the fiber after fabrication of the fiber-ring resonator (FIG. 25), or a coating deposited on the resonator fiber as a separate fabrication step (FIG. 26). Such a coating may absorb or scatter light at the relevant wavelength, and may be provided on surrounding segments of the resonator fiber. A preferred coating is a hermetic carbon coating used as an etch mask for fabricating the fiber-ring resonator. In the mask removal step, the hermetic carbon coating may be removed from only the resonator fiber segment 2610, but left on surrounding fiber segments 2630 to provide de-localized mode suppression (FIG. 25). Alternatively, scattering and/or absorbing material may be deposited to form a de-localized mode suppressor (FIG. 26). Such mode-suppressor structures may extend around the entire circumference of the resonator fiber, or around only a portion thereof.

An alternative method for dealing with de-localized optical modes is the use of optical fiber having an absorbing and/or scattering core. Such a core serves to suppress delocalized optical modes while leaving desired circumferential optical modes substantially undisturbed. Such a fiber may be manufactured with an absorbing and/or scattering core, or hollow-core optical fiber may be employed, and the hollow core filled with absorbing and/or scattering material of any suitable type.

Figure 27A:
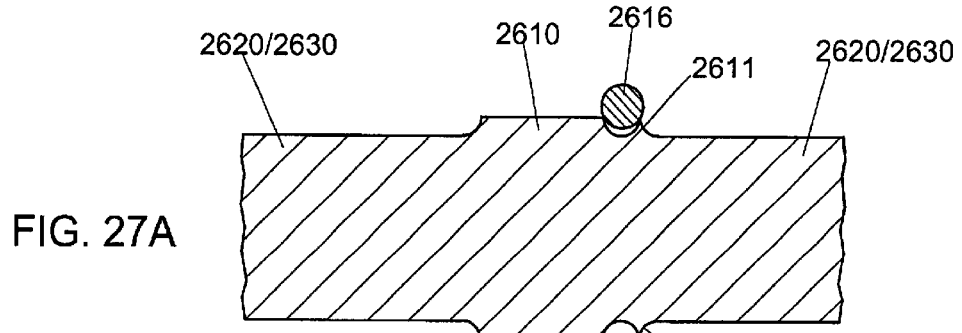
FIGS. 27A and 27B are side sectional views of a circumferential-mode optical resonator including fiber-taper alignment-an-support structures.
Figure 27B:
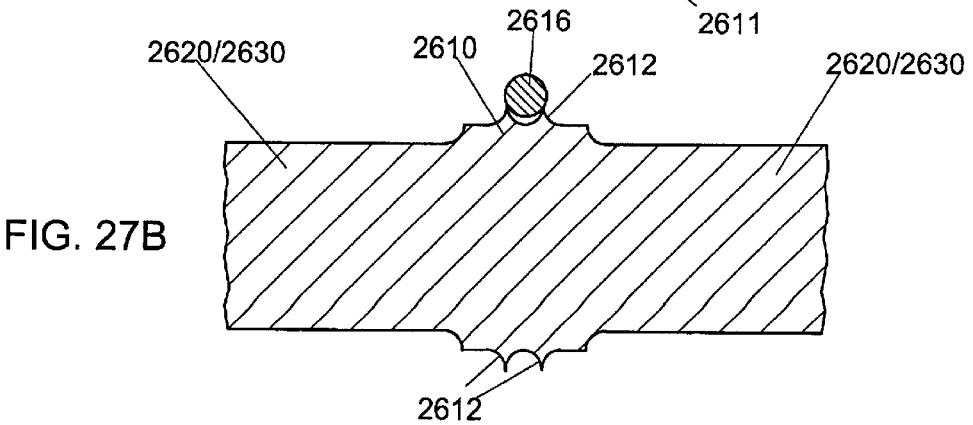

FIGS. 27A and 27B show additional alignment members provided on or near a fiber-ring resonator segment 2610. In a resonant optical filter according to the present invention, a is transmission fiber-optic waveguide is typically provided with a fiber-optic-taper segment 2616 to serve as a transverse-coupling segment. To reproducibly establish and stably maintain transverse-coupling between the fiber-optic-taper segment and the fiber-ring resonator, a taper-positioner may be provided on the resonator fiber. In FIG. 27A, a radially-extending radially-tapered transverse flange 2611 is provided on the resonator fiber adjacent to the fiber segment 2610. This taper positioner may be fabricated using any of the cylindrical processing methods disclosed in earlier-cited application A5–A6 and A15–A18. A preferred method may include a modification of the process illustrated in FIG. 25 for surface-masked etching of the resonator fiber. In addition to the two unmasked rings shown in FIG. 25, a very narrow line is machined through the resonator segment mask ring at a distance from the edge about equal to twice the desired etch depth (i.e., radius differential between the resonator segment and the etched adjacent portions), thereby dividing the masked resonator segment ring into a main masked ring and a secondary masked ring. The etch process is permitted to proceed (both longitudinally as well as radially) until two of the etched portions just meet (i.e., when the secondary masked ring just disappears), yielding the radially-extending radially-tapered transverse flange 2611 shown in FIG. 27A. The taper-positioner serves to provide reproducible and stable positioning of the fiber-optic-taper segment 2616 against the flange 2611 and the resonator segment 2610. A portion of the secondary masked ring may be machined away prior to etching, so that the flange 2611 extends only partly around the circumference of the resonator fiber, thereby suppressing the ability of flange 2611 to support undesirable optical modes.

An alternative taper positioner is illustrated in FIG. 27B, comprising a pair of longitudinally-juxtaposed radially-extending radially-tapered transverse flanges 2612 positioned on outer circumference of the resonator segment 2610 so that the fiber-optic-taper segment may rest on paired flanges. Any of the cylindrical processing methods disclosed in earlier-cited applications A5–A6 and A15–A18 may be employed to produce the paired flanges 2612. A preferred method may comprise a two-step implementation of the surface-masked etching process of FIG. 25. After surface-masked etching to produce the fiber-ring resonator segment 2610, a narrow line is machined in the mask material around the longitudinal midline of the masked fiber ring. Upon etching, the concave groove is formed between two circumferential ridges. The etch process is permitted to continue until the flat tops of the ridges just disappear. A fiber-optic-taper segment 2616 may then rest securely against the paired flanges 2612 for reproducibly established and stably maintained evanescent optical coupling between the fiber-optic-taper segment 2616 and resonator segment 2610.

In addition to stable mechanical engagement of the fiber-optic-taper segment and the resonator segment, flanges 2611 and 2612 provide other beneficial effects. It has been observed that when a fiber-optic-taper segment is brought into direct mechanical contact with the outer circumference of a fiber-ring resonator, the proximity of the fiber-optic-taper segment seems to induce coupling between undesirable, delocalized optical modes of the fiber-ring resonator and/or resonator fiber and/or higher order modes of the fiber optic taper. This manifests itself as an unacceptably large optical loss of the fiber-ring resonator (over and above the desired resonator optical losses due to transverse-coupling to the fiber-optic taper, modulator optical component, and/or other component of the resonant optical modulator). By displacing the fiber-optic-taper segment from the midline of the fiber ring resonator outer circumference (either longitudinally or radially), the undesirable coupling to these delocalized optical modes can be substantially reduced or eliminated, albeit the expense of reduced coupling strength between the fiber-optic-taper segment and the fiber-ring resonator. Flange 2611 serves to position the fiber-optic taper segment 2616 in a longitudinally-displaced position relative to fiber-ring resonator segment 2610, while flanges 2612 serve to position fiber-optic-taper segment 2616 in a radially-displaced position relative to fiber-ring resonator segment 2610.

The mechanical stability of fiber-optic-taper segment 2616 transverse-coupled to fiber-ring resonator segment 2610 with taper positioner 2611 or 2612 may be further enhanced by tacking or welding the taper segment to the fiber ring resonator and/or taper positioner. A preferred method for doing so comprises "spot welding" the taper to the positioner or fiber-ring with a short burst from a $CO_2$ laser. The mechanical stability of the optical system is enhanced while typically introducing only minimal additional insertion loss into the fiber-optic-tapered waveguide.

Referring again to FIG. 1, a modulator optical component 130 is positioned relative to circumferential-mode optical resonator 120 so as to transverse-coupled thereto. Modulator optical component 130 serves to enable controlled adjustment of the round trip optical loss of resonator 120 between over-, critical-, and/or under-coupled conditions in one of several of ways: i) modulator optical component 130 may provide a controlled level of direct optical loss of the circumferential optical mode (collectively referred to herein as "loss-modulated" or more specifically "absorption-modulated" devices); ii) a level of transverse-coupling between circumferential-mode optical resonator 120 and modulator optical component 130 may be controlled, with optical signal power transferred from resonator 120 into modulator optical component 130 absorbed within, transmitted away from, and/or otherwise dissipated from the modulator optical component 130 (collectively referred to herein as "coupling-modulated" or more specifically "index-modulated" devices); iii) a resonant frequency of a resonant modulator optical component 130 may be controlled, so that modulator optical component only provides loss for the circumferential optical mode when a modulator resonance frequency substantially coincides with the circumferential-mode frequency (collectively referred to herein as "resonance-modulated" devices); and iv) a modulator optical component 130 may be transverse-coupled to resonator 120 at two separate points and the modulator modal index may be controlled, enabling interferometric control of the round-trip loss of resonator 120 (collectively referred to herein as "interference-modulated" devices). Modulator control component(s) 170 is/are operatively coupled to the modulator optical component 130 for enabling control of the round trip loss of the circumferential-mode resonator 120 by application of a control signal, in turn enabling controlled modulation of transmission of the optical signal through the transmission waveguide 110.

In a first group of embodiments of the present invention, a level of direct optical loss of the circumferential optical mode induced by the modulator optical component is controlled to enable controlled modulation of transmission of the optical signal through the transmission waveguide. The modulator optical component in these so-called "loss-modulated" or "absorption-modulated" embodiments may comprise an open optical waveguide structure (in which an optical mode of the waveguide does not follow a closed path and re-circulate and/or resonate within the waveguide;

referred to hereinafter as a "modulator waveguide"), or may comprise an ring, resonator (including a second circumferential-mode optical resonator), or other closed optical waveguide structure (in which an optical mode of the waveguide may re-circulate and/or resonate; referred to collectively hereinafter as a "modulator resonator"). In either case, the modulator optical component is positioned so that an evanescent portion of the circumferential optical mode at least partially spatially overlaps an optical mode of the modulator optical component. A modulator optical component incorporating material whose optical loss, at the wavelength of the circumferential optical mode, can be controlled thereby enables control of the round trip optical loss experienced by the circumferential optical mode in the circumferential-mode resonator, in turn achieving the desired goal of controlled modulation of transmission of the optical signal through the transmission waveguide as described above.

Figure 2A:
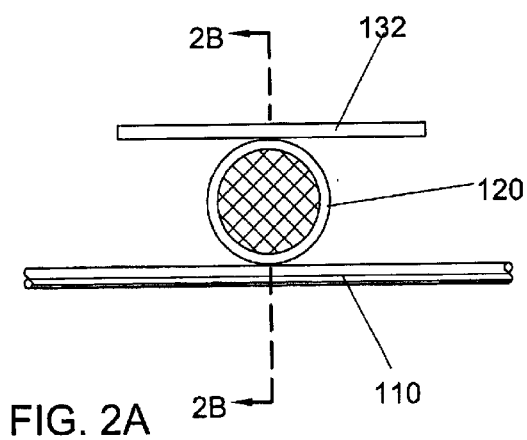
FIGS. 2A and 2B show side and partial sectional views, respectively, of a resonant optical filter according to the present invention.
Figure 2B:
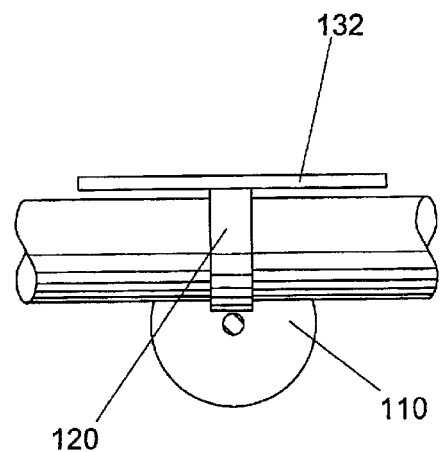

Absorption-modulated embodiments of an optical power control device according to the present invention are shown in FIGS. 2A, 2B, 3A, and 3B in which the modulator optical component comprises an open modulator optical waveguide positioned tangentially with respect to the circumferential-mode optical resonator. Transmission waveguide 110 is shown as a fiber-optic taper. A fiber-optic waveguide having a transverse-coupling portion of the cladding layer surface as described in detail in earlier-cited application A6, or other fiber-optic waveguide having a transverse-coupling portion could be equivalently employed. Circumferential-mode optical resonator 120 is shown in FIGS. 2A, 2B, 3A, and 3B as a fiber-ring resonator as described in detail in earlier-cited applications A5 and A15–A18. Other circumferential-mode resonator structures could be equivalently employed, including but not limited to a rings, spheres or near-spheres, disks, microspheres, microdisks, or other resonator geometry as recited hereinabove. In FIGS. 2A and 2B, the modulator optical component is a slab waveguide 132 in substantial tangential engagement with circumferential-mode resonator 120, either in direct mechanical contact, or positioned at a specific distance from the circumferential-mode resonator to yield a desired level of transverse-coupling.

An evanescent portion of the circumferential optical mode supported by circumferential-mode resonator 120 may extend radially beyond the circumference thereof, and may therefore spatially overlap a portion of an optical mode of the slab waveguide 132. Absorption-modulated slab waveguide 132 may preferably be fabricated incorporating a material having an optical loss (typically optical absorption), at the wavelength of the circumferential optical mode, which may be controlled by a modulator control component. The optical absorption per unit length in the interaction region is preferably sufficiently large to enable the circumferential-mode resonator round trip optical loss to reach a level comparable to the optical coupling between the transmission waveguide 110 and the resonator 120 (i.e., to achieve critical coupling; typically loss on the order of about 0.5% to about 5% per round trip is needed to yield linewidths consistent with typical WDM, TDM, or other optical data transmission systems; typically on the order of 1–40 GHz), or alternatively to enable the circumferential-mode resonator round trip loss to exceed critical coupling. This may be difficult to achieve, since the interaction region (i.e., the volume of overlap between the evanescent portion of the circumferential optical mode and the slab waveguide) is typically limited in spatial extent by the size and curvature of the circumferential-mode resonator. The slab waveguide should be kept thin (comparable to the radial extent of the evanescent portion of the circumferential optical mode beyond the circumference of resonator 120) and the index of refraction of any substantially homogeneous medium in contact with the face of the slab opposite the circumferential-mode resonator (i.e., a substrate or cladding layer) must be less than the refractive index of the slab waveguide and no greater than the refractive index of the circumferential-mode resonator. In this way, optical power not absorbed by slab waveguide 132 is confined within waveguide 132 near resonator 110, thereby substantially eliminating undesired optical loss. Otherwise optical power coupled from the circumferential-mode resonator 120 into slab waveguide 132 could propagate away from resonator 110 and be lost.

Modal index mismatch (i.e., phase mismatch) between the circumferential optical mode and the slab waveguide must be carefully controlled so that, by switching the slab waveguide absorption between two operational levels, the round trip optical loss of the circumferential-mode optical resonator may be switched between under- and critically-coupled conditions at the fiber-optic waveguide/resonator junction, or between critically- and over-coupled conditions at the fiber-optic waveguide/resonator junction. For example, the slab waveguide material might be chosen to yield a relatively large phase mismatch, thereby limiting the transfer of optical power to the slab (characteristic spatial period short compared to interaction length) and resulting in an over-coupled condition at the fiber-optic waveguide/resonator junction, while the optical absorption of the slab may be switched to a sufficiently high level to result in critical-coupling at the fiber-optic waveguide/resonator junction in spite of the phase mismatch (the significance of phase mismatch tends to decrease with increasing absorption in the modulator waveguide, since there is less optical power available to "back-couple" into the resonator). In a second example, the slab and circumferential-mode resonator might be well phase-matched and the optical loss of the slab chosen to produce a critical-coupling condition at the fiber-optic waveguide/resonator junction, while the optical absorption of the slab may be switched to a higher level to yield an under-coupled condition at the fiber-optic waveguide/resonator junction. Many other schemes and combinations of modal-index match/mismatch and operative levels of optical absorption of the slab waveguide may be employed while remaining within the scope of inventive concepts disclosed and/or claimed herein. For a given circumferential-mode optical resonator geometry, slab waveguide material, and so forth, some experimentation is typically required to determine the level of transverse-coupling, and the appropriate levels of slab waveguide optical loss to produce the desired modulation of the circumferential-mode resonator round trip loss.

Figure 3A:
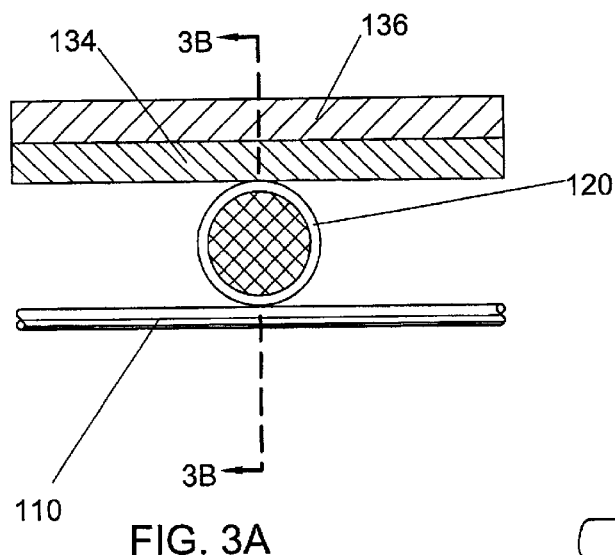
FIGS. 3A and 3B show partial sectional views of a resonant optical filter according to the present invention.
Figure 3B:
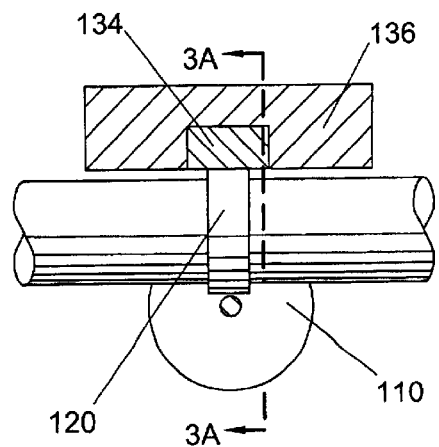

In FIGS. 3A and 3B, the modulator optical component is a loss- or absorption-modulated laterally-confined waveguide 134 (referred to as a "2D waveguide" in earlier-cited applications) on a substrate 136 and positioned tangentially with respect to circumferential-mode optical resonator 120. Many of the same considerations applicable to the absorption-modulated slab waveguide embodiment of FIGS. 2A and 2B apply to the absorption-controlled laterally-confined waveguide embodiment of FIGS. 3A and 3B. The laterally-confined waveguide 134 may preferably be fabricated incorporating a material having an optical absorption at the wavelength of the circumferential optical mode that may be controlled by a modulator control component, and which may produce circumferential-mode resonator round trip loss sufficient to achieve critical coupling. Modal index mismatch between the laterally-confined waveguide and the circumferential-mode optical resonator must be controlled in the manner described hereinabove for the absorption-controlled slab waveguide. In addition to the laterally-confined waveguide material and the substrate material, the transverse geometry of the laterally-confined waveguide must also be chosen to yield the desired spatial overlap and modal-index match/mismatch properties.

The optical absorption of absorption-modulated slab waveguide 132 or laterally-confined waveguide 134 may be controlled by electronic, optical, and/or other means. For example, a quantum well, multi-quantum well (MQW), other semi-conductor, or other functionally equivalent material may be incorporated into the modulator waveguide as an electro-absorptive material, wherein the optical absorption of the modulator waveguide may be altered by application of a control electric field. A modulator control component may comprise control electrodes suitably positioned to apply the control electric field. Alternatively, the optical absorption by such materials may be controlled by injection of current into the material. The presence of additional charge carriers (electrons and/or holes, as the case may be) may serve to increase or decrease the optical absorption of the waveguide material, depending on the bandgap, band structure, and/or doping of the electro-absorptive material and the wavelength of the optical mode to be modulated. Control electrodes or other electrical contacts may serve to inject a control electrical current. Optical excitation of such materials may also serve to generate charge carriers, thereby enabling control of the waveguide optical absorption by application of an optical control signal. Other classes of materials exhibiting photo-bleaching, excited state absorption, saturable absorption, non-linear optical absorption, and/or resonant non-linear-optical properties may be equivalently incorporated into the modulator waveguide to enable control of the waveguide optical absorption by application of an optical control signal.

A preferred material for fabricating slab waveguide 132 and/or laterally-confined waveguide 134 comprises a multi-quantum well (MQW) material comprising alternating layers of i) quantum well layers of a material having a bulk bandgap close to or only slightly larger (within about 10 meV to 30 meV, for example) than the photon energy of the circumferential optical mode, and ii) barrier layers having a bandgap substantially larger than the photon energy of the optical signal. The bandgaps referred to here are not the bulk bandgaps for the various materials, but the bandgaps of the materials as incorporated as individual layers of a multi-layer structures described. The MQW material may be surrounded by a pair of contact layers (doped or otherwise) for facilitating electrical contact to the control electrodes. Delta-doping of the contact layers may be preferred, to minimize unwanted diffusion of dopant(s) into the MQW material. The control signal may comprise a control voltage applied across the electrodes, thereby applying a control electric field substantially normal to the layers of the MQW material. This electric field may red-shift resonance(s) of the MQW material with respect to the frequency of the circumferential optical mode through a quantum-confined Stark effect (QCSE), a Franz-Keldysh effect (FKE), a quantum-confined Franz-Keldysh effect (QCFKE), or other similar mechanism. Typically, the electro-absorptive MQW material would be chosen having a resonance i) slightly above the photon energy of the circumferential optical mode in the absence of a control electric field, and ii) slightly below the photon energy of the circumferential optical mode when red-shifted by application of the control electric field. In this way application of the control signal alters the optical loss experienced by the circumferential optical mode, in turn altering the transmission level of the optical signal through the transmission waveguide.

In an exemplary embodiment for controlling wavelengths typically used for long-haul fiber-optic telecommunications (between about 1.2 μm and about 1.7 μm), the quantum well layers, barrier layers, and doped contact layers may comprise InGaAsP, the quantum well layers may be between about 7 nm thick and about 15 nm thick with a bulk bandgap between about 1.3 μm and about 1.6 μm, the barrier layers may be between about 20 μm thick and about 50 nm thick with a bulk bandgap between about 1.0 μm and about 1.4 μm, and the doped contact layers may be between about 20 nm thick and about 100 nm thick. In a preferred embodiment, the quantum well layers may be about 10 nm thick with a bulk bandgap of about 1.6 μm, the barrier layers may be about 20 nm thick with a bandgap of about 1.2 μm, and the delta-doped contact layers may be about 50 nm thick. Many such MQW materials are readily available commercially, and may be specified by layer thickness, layer bandgap, and layer composition. The bulk bandgap of a particular layer material may be generally well-known and determined by the precise composition/stoichiometry of the material, while the layer bandgap may often be determined in a well-known manner from a combination of layer composition/stoichiometry, layer thickness, and/or structural strain induced by adjacent layers. Many material combinations (extant or hereafter developed), layer thicknesses, and bandgaps may be employed for modulating many other optical wavelengths without departing from inventive concepts disclosed and/or claimed herein. Several alternative material combinations are disclosed in earlier-cited application A12 and A20.

Figure 4B:
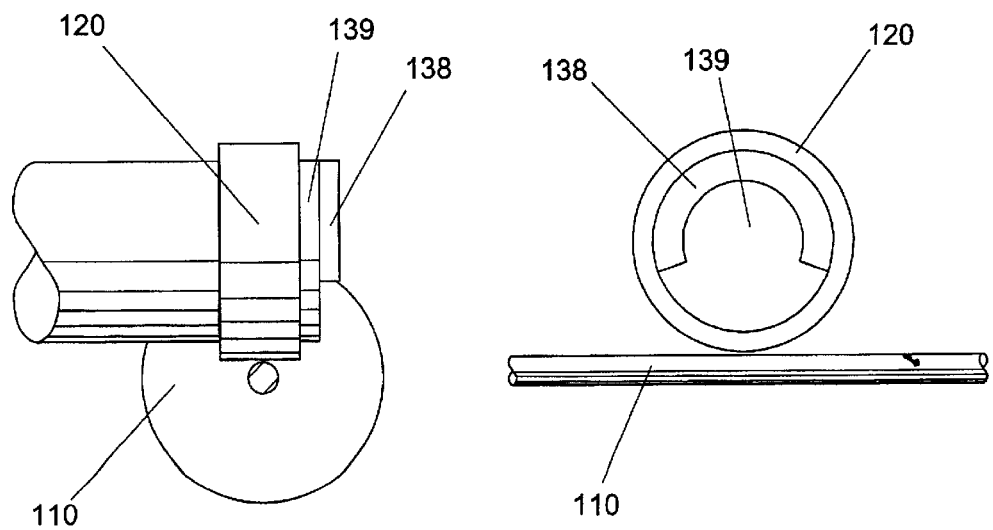

An absorption-modulated embodiment of an optical power control device according to the present invention is shown in FIGS. 4A and 4B in which the modulator optical component comprises an open arcuate modulator optical waveguide 138 positioned axially with respect to the circumferential-mode optical resonator. Transmission waveguide 110 is shown as a fiber-optic taper. A fiber-optic waveguide having a saddle-shaped transverse-coupling portion, as described in detail in earlier-cited application A6, or other fiber-optic waveguide could be equivalently employed. Circumferential-mode optical resonator 120 is shown as a fiber-ring resonator as described in detail in earlier-cited application A5 and A15–A18. Other optical resonator structures could be equivalently employed. In FIG. 4A spacer 139 is shown for positioning arcuate waveguide 138 at the proper distance from circumferential-mode resonator 120. In this particular embodiment the spacer 139 comprises a portion of an adjacent fiber segment connected to the fiber-ring resonator with arcuate waveguide 138 deposited thereon, bonded thereto, or otherwise held in contact therewith. Some experimentation will typically be required to determine the spacing between circumferential-mode resonator 120 and arcuate waveguide 138 that produces the desired level of round-trip optical loss for circumferential-mode resonator 120 and the appropriate modal-index-matching conditions between circumferential-mode resonator 120 and arcuate waveguide 138. Once the proper thickness of spacer 139 has been determined, it may be reproducibly fabricated by cleaving, etching, machining, lithography, cylindrical lithography, or other suitable processing of the adjacent fiber segment. A functionally equivalent spacer may be employed for other types of optical resonator as well. The same types of materials used for the absorption-modulated slab and laterally-confined waveguides described hereinabove may be employed for fabricating absorption-modulated arcuate waveguide 138. In particular, arcuate waveguide 138 may comprise the InGaAsP multi-quantum well material described hereinabove, with the alternating quantum well and barrier layers and surrounding contact layers substantially parallel to circumferential-mode resonator 120 and with the control electric field applied substantially perpendicular to circumferential-mode resonator 120. An advantage of this embodiment is increased interaction length between the circumferential optical mode and the arcuate waveguide relative to the tangentially positioned waveguides of FIGS. 2A, 2B, 3A, and 3B, therefore requiring smaller optical loss per unit distance to achieve the same round trip optical loss in the circumferential-mode resonator.

A significant property of both tangentially- and axially-positioned absorption-modulated open modulator optical waveguide structures is that since no re-circulation of any waveguide optical mode occurs, the presence of the modulator optical waveguide has a substantially negligible effect on the wavelength-dependent properties and/or resonant behavior of the adjacent circumferential-mode optical resonator. Such wavelength/frequency shifting behavior can adversely affect the performance of an optical power control device according to the present invention, or alternatively may be exploited to enhance said performance, depending on the design, construction, and use of a particular device.

Various absorption-modulated embodiments of an optical power control device according to the present invention are shown schematically in FIGS. 5A through 5E in which the modulator optical component comprises a closed optical waveguide (i.e., a modulator optical resonator 140) positioned tangentially (FIGS. 5A and 5B) or axially (FIGS. 5C, 5D, and 5E) with respect to the circumferential-mode resonator 120, and oriented substantially parallel to (FIGS. 5A, 5C, and 5D) or substantially perpendicular to (FIGS. 5B and 5E) the circumferential-mode resonator 120. Transmission waveguide 110 is shown (in cross-section) as a tapered fiber-optic waveguide. A fiber-optic waveguide having a saddle-shaped transverse-coupling portion, as described in detail in earlier-cited application A6, or other fiber-optic waveguide could be equivalently employed. Circumferential-mode optical resonator is shown generically as a micro-disk or micro-ring resonator. Other optical resonator structures, such as the fiber-rings of earlier-cited application A5 and A15 –A18, could be equivalently employed. Absorption-modulated modulator optical resonator 140 may comprise any of the resonator structures recited earlier for circumferential-mode resonator 120, including but not limited to spheres, near-spheres, oblate and/or prolate spheroids, ellipsoids, ovals, ovoids, racetracks, polygons, polyhedra, cylinders, disks, rings, micro-spheres, micro-disks, micro-rings, fiber-rings, disks and/or rings on substrates (including structures disclosed in earlier-cited application A12 and A20), ring or other closed waveguides, and/or functional equivalents thereof, and are shown generically as micro-disks or micro-rings in FIGS. 5A through 5E. Absorption-modulated modulator optical resonator 140 is shown in FIGS. 5A and 5B in substantial tangential engagement with circumferential-mode optical resonator 120, either in direct mechanical contact, or positioned at a specific distance from the circumferential-mode resonator (by a spacer or other suitable alignment structure) to yield a desired level of transverse-coupling. An evanescent portion of the circumferential optical mode extending radially beyond circumferential-mode resonator 120 may overlap a portion of an optical mode of modulator optical resonator 140, either a radially-extending portion thereof when substantially parallel to circumferential-mode resonator 120 (FIG. 5A), or an axially-extending portion thereof when substantially perpendicular to circumferential-mode resonator 120 (FIG. 5B). Absorption-modulated modulator optical resonator 140 is shown in FIGS. 5C, 5D, and 5E positioned axially with respect to circumferential-mode optical resonator 120, either in direct mechanical contact, or positioned at a specific distance from the circumferential-mode resonator (by a spacer or other suitable alignment structure) to yield a desired level of transverse-coupling. An evanescent portion of the circumferential optical mode extending axially beyond circumferential-mode resonator 120 may overlap a portion of modulator optical resonator 140, either an axially-extending portion thereof when substantially parallel to circumferential-mode resonator 120 (FIGS. 5C and 5D), or a radially-extending portion thereof when substantially perpendicular to circumferential-mode resonator 120 (FIG. 5E).

Absorption-modulated modulator optical resonator 140 may preferably be fabricated incorporating material having an optical loss (typically optical absorption), at the wavelength of the circumferential optical mode, that may be controlled by a modulator control component. The modulator optical resonator 140 should preferably have a resonant optical mode having substantially the same wavelength as the circumferential optical mode of circumferential-mode resonator 120 (and hence the optical signal to be controlled). This enables transfer of optical power from the circumferential-mode resonator and build-up of optical power within the modulator optical resonator, in turn enabling a relatively small optical loss per unit length in the modulator optical resonator to produce sufficiently large round trip optical loss for the circumferential-mode resonator coupled thereto. If the modulator optical resonator and circumferential-mode optical resonator are not resonant with each other, in contrast, the situation becomes analogous to that described hereinabove for the open modulator waveguide embodiments, with relatively large optical loss per unit length required in the modulator optical resonator to generate sufficient round trip optical loss for the circumferential-mode resonator. A complication encountered when implementing an embodiment that includes an absorption-modulated modulator resonator arises from the unavoidable wavelength shift of the resonant optical mode of the modulator resonator that occurs with a change in the optical loss thereof. The circumferential-mode resonator and modulator optical resonator must be treated as a coupled-cavity system, and shifts in the modulator resonance wavelength may perturb the resonances of the coupled system. This effect must be properly accounted for in designing an optical power control device incorporating a modulator optical resonator, or alternatively, the effect may be exploited for designing optical power control devices with specific wavelength dependent performance characteristics. This effect may be somewhat mitigated for an absorption-modulated resonator modulator component, since the optical loss of such a modulator resonator tends to reduce the finesse of the modulator resonator and increase the bandwidth of its resonances, in turn decreasing the effect of the modulator resonances on the circumferential-mode resonances in the coupled-cavity system. In short, loss- or absorption-modulated resonator or "closed waveguide" modulator optical components having relatively low finesse (less than about 10) may behave substantially less "resonator-like" than the relatively high-finesse circumferential-mode resonator.

The optical absorption of modulator optical resonator 140 may be controlled by electronic, optical, and/or other means in ways completely analogous to those recited for the modulator waveguides hereinabove, and utilizing the same and/or functionally equivalent materials for fabrication and the same and/or functionally equivalent modulator control components. For example, a quantum well, multi-quantum well (MQW), or other semi-conductor material may be incorporated into the modulator optical resonator as an electro-absorptive material, wherein the optical absorption may be altered by application of a control electric field. A modulator control component may comprise control electrodes suitably positioned to apply the control electric field. Materials described hereinabove (for modulator waveguides), such as an InGaAsP MQW material controlled by a QCSE, FKE, QCFKE, or similar mechanism, are also suitable for incorporation into modulator resonator 140. The optical absorption by such quantum well, MQW, and other semi-conductor materials may alternatively be controlled by injection of current into the material. The presence of additional charge carriers (electrons and/or holes, as the case may be) may serve to increase or decrease the optical absorption of the waveguide material, depending on the bandgap, band structure, and/or doping of the semiconductor and the wavelength of the optical mode to be modulated. Control electrodes or other electrical contact may serve to inject a control electrical current. Optical excitation of such materials may also serve to generate carriers, thereby allowing control of the waveguide optical absorption to be controlled by application of an optical control signal. Other classes of materials exhibiting photo-bleaching, excited state absorption, saturable absorption, non-linear optical absorption, and/or resonant non-linear-optical properties may be equivalently incorporated into the modulator resonator to enable control of the waveguide optical absorption by application of an optical control signal.

The interaction region (i.e., the volume of overlap between the evanescent portion of the circumferential optical mode and the modulator optical resonator) is typically limited in spatial extent by the geometries of the embodiments of FIGS. 5A, 5B, 5D, and 5E, limiting the distance over which modal-index-matching must be controlled. Significantly more stringent modal-index-matching constraints may arise for the embodiment of FIG. 5C, in which circumferential-mode resonator 120 and modulator resonator 140 are substantially coaxial, since the interaction region extends entirely around the circumferential-mode resonator 120. The entire modulator 140 need not have controlled optical loss. It may be desirable to leave the interaction region without absorption-controlled material, so that altering the absorption of the modulator resonator does not affect the modal-index-matching condition in the interaction region.

For the embodiments of FIGS. 5A through 5E, the relative positioning of circumferential-mode resonator 120 and modulator resonator 140 must be reliable, accurate, and stable. For a given combination of circumferential-mode resonator (material(s) and/or geometry) and modulator (material(s) and/or geometry), some experimentation will be necessary to determine the relative position resulting in the desired degree of transverse-coupling therebetween (based on the degree of spatial overlap and relative modal-index-matching). Once the proper relative positioning has been determined, a mechanical spacer or other suitable alignment aid may be employed to enable reliable, accurate, and stable relative positioning of the circumferential-mode resonator and the modulator optical resonator in an optical power control device according to the present invention. Such spacers may comprise a member integrally formed with the circumferential-mode resonator, a member integrally formed with the modulator optical resonator, or an independent member fabricated independently of either resonator. Economies of fabrication and/or assembly of the optical control device may be realized when the spacer is integrally formed with one or the other of these resonators.

Figure 6A:
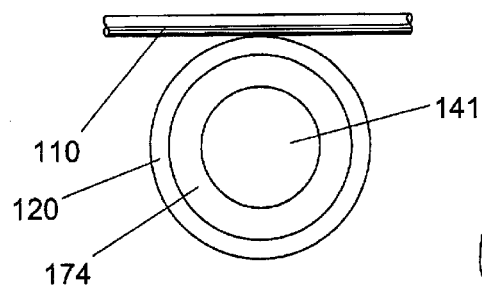
FIGS. 6A, 6B, and 6C show end, side, and cross-sectional views, respectively, of a resonant optical filter according to the present invention.
Figure 6B:
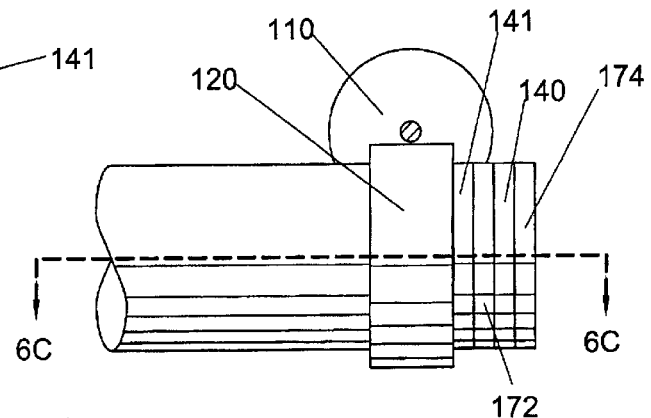
Figure 6C:
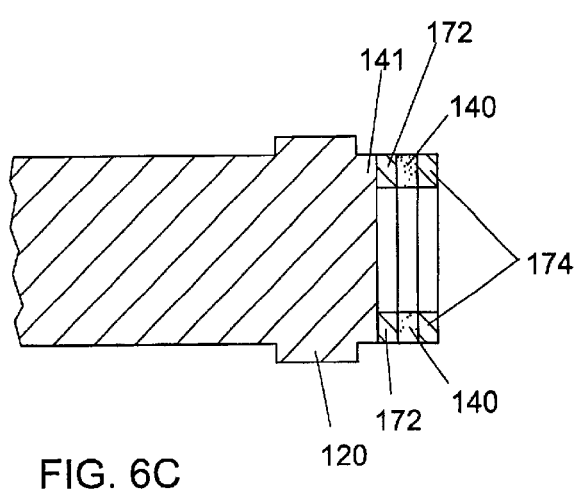
Figure 7:
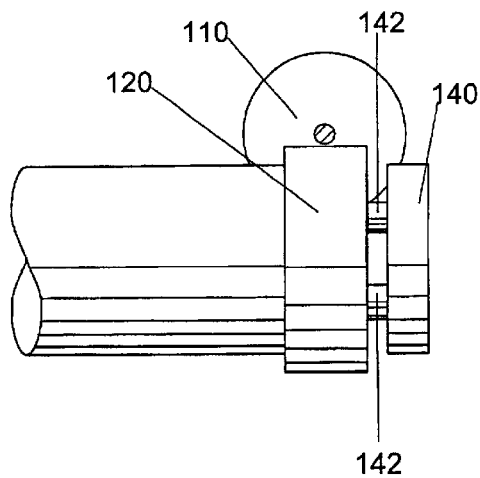
FIG. 7 shows a side view of a resonant optical filter according to the present invention.

FIGS. 6A, 6B, and 6C show a resonant optical modulator wherein: transmission optical waveguide 110 comprises a fiber-optic taper (another type of fiber-optic waveguide, including a fiber-optic waveguide having a saddle-shaped coupling surface, could be equivalently employed); circumferential-mode optical resonator 120 comprises a fiber-ring resonator; and modulator resonator 140 comprises a ring of MQW material (as described above or otherwise) deposited on, bonded to, or otherwise held in contact with an adjacent fiber segment 141 connected to the fiber-ring. This embodiment corresponds to the arrangement shown schematically in FIG. 5C. The adjacent fiber segment 141 serves as a mechanical spacer for reliable, accurate, and stable positioning of modulator resonator 140 relative to the fiber-ring. Once the proper thickness of the spacer (i.e., adjacent fiber segment 141) has been determined, it may be reproducibly fabricated by cleaving, etching, machining, lithography, cylindrical lithography, and/or other suitable processing of the adjacent fiber segment. Layers 172 and 174 may comprise contact layers and/or electrodes for applying a control electric field to a modulator resonator 140 comprising an electro-absorptive material as enumerated and disclosed hereinabove. FIG. 7 shows a similar embodiment in which the fiber-ring is fabricated from PANDA-type polarization preserving optical fiber. One or more internal structural elements 142 of the PANDA fiber, protruding axially from fiber-ring circumferential-mode resonator 120, serve as the spacer for maintaining reliable, reproducible, and stable relative positioning of the fiber-ring circumferential-mode resonator and modulator resonator 140 (a micro-disk in this example, which may include contact/electrode layers not shown). Modulator resonator 140 may be bonded to or otherwise held in contact with structural elements 142. Structural elements 142 may preferably be left protruding from the fiber-ring by differential etching of the fiber-ring and the structural elements, or may result from any suitable machining, lithographic, or other processing technique for producing such structures.

Figure 8A:
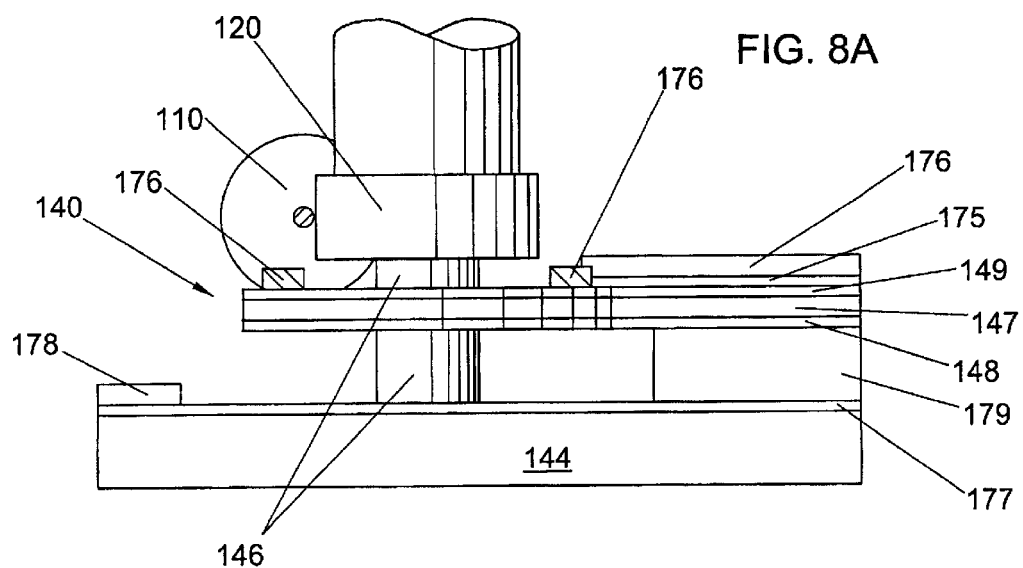
FIGS. 8A and 8B show side and top views, respectively, of a resonant optical filter according to the present invention.
Figure 8B:
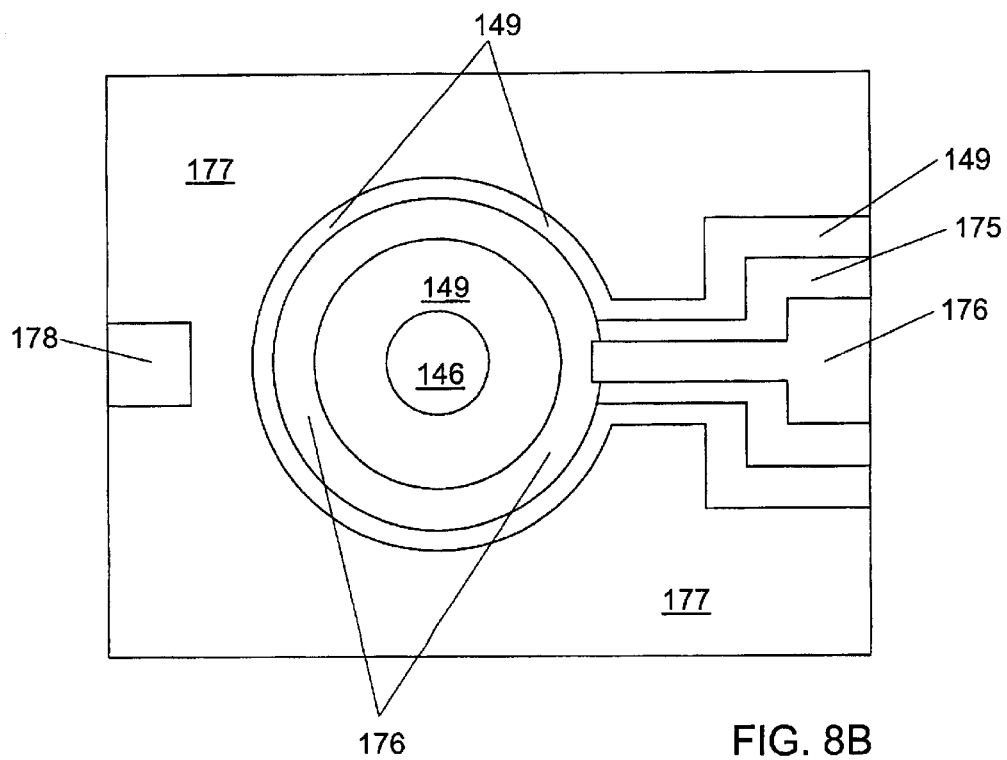
Figure 9:
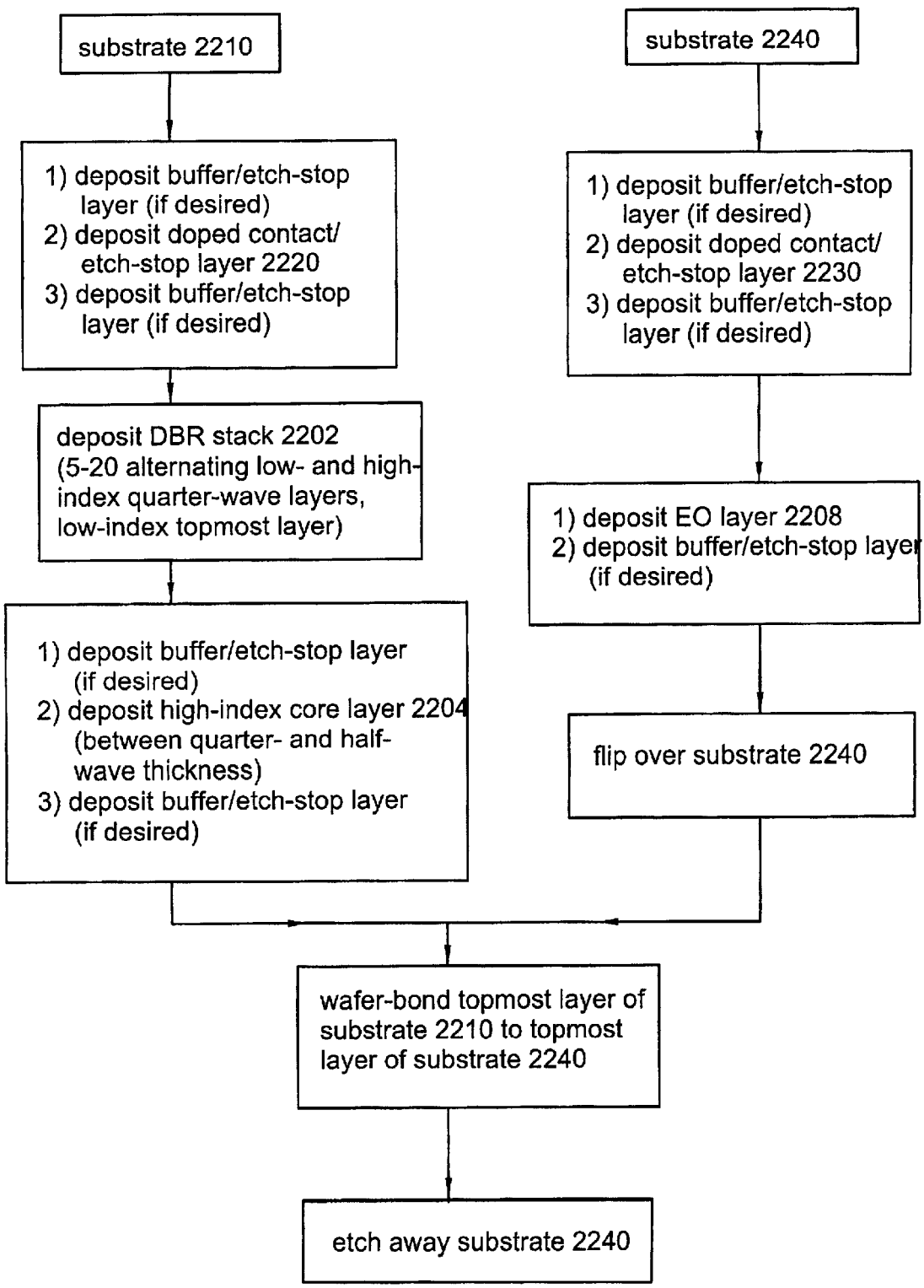
FIG. 9 is a flow diagram for fabricating a modulator optical component according to the present invention.

A more elaborate embodiment of an optical power control device according to the present invention is shown in FIGS. 8A and 8B. Fiber-optic waveguide 110 comprises a fiber-optic taper (another type of fiber-optic waveguide, including a fiber-optic waveguide having a saddle-shaped coupling surface, could be equivalently employed). Circumferential-mode optical resonator 120 comprises a fiber-ring resonator. Modulator optical component 140 is fabricated on a semiconductor substrate and comprises a disk incorporating MQW material, and in this case may have a relatively low Q-factor (i.e., less resonator-like). Modulator optical component 140 nevertheless may provide a controlled level of optical loss for fiber-ring resonator around substantially the entire circumference of the fiber-ring resonator, enabling substantially full modulation of optical power transmitted through fiber taper 110 through relatively small changes in the absorption per unit length of modulator optical component 140. For wavelengths in the 1.2 µm to 1.7 µm range, a preferred substrate material is InP, while a preferred MQW material is an InGaAsP MQW layer 147 surrounded by delta-doped InGaAs contact layers 148 and 149, which enable application of control voltages via bottom electrode 178 (via delta-doped InGaAs layer 177 and doped InP spacer 179) and top ring electrode 176. An insulating layer 175 may also be provided. These materials have been described in detail hereinabove, and other suitable substrate and resonator materials may be equivalently employed. By depositing an appropriate sequence of epitaxial layers and suitably processing, modulator optical resonator 140 and associated control electrodes 176 and 178 may be fabricated on substrate 144, which may also include a central spacer 144. The height of spacer 146 may be controlled to nanometer precision through standard epitaxial growth techniques, and the fiber-ring resonator may be bonded to or otherwise held in contact with spacer 146 to achieve reliable, accurate, and stable relative positioning of modulator optical resonator 140 and circumferential-mode fiber-ring resonator 120.

In a second group of embodiments of the present invention, a level of optical power transfer from the circumferential optical mode to the modulator optical component 130 (through transverse-coupling) is controlled by modulating the relative modal-index-matching of the circumferential optical mode and a modulator optical mode in the interaction region thereof. The modulator optical component 130 in these so-called "index-modulated" embodiments may comprise an open optical waveguide structure (in which an optical mode of the waveguide does not follow a closed path, re-circulate, or resonate within the waveguide; referred to hereinafter as a "modulator waveguide"), or may comprise a ring, resonator, or other closed optical waveguide structure (in which an optical mode of the waveguide may re-circulate and/or resonate; referred to collectively hereinafter as a "modulator resonator"). These modulator components may be either low-finesse (less than about 10; less "resonator-like") or high-finesse (greater than about 10; more "resonator-like"), depending on the particular device configuration employed. In either case, the modulator optical component 130 is positioned so that an evanescent portion of the circumferential optical mode at least partially spatially overlaps a modulator optical mode whose modal index may be controlled, thereby enabling control of optical power transfer via transverse-coupling (by control of modal-index-matching) between the circumferential-mode resonator 120 and the modulator waveguide 130. This in turn controls the round trip optical loss experienced by the circumferential optical mode in the circumferential-mode resonator 120, thereby enabling the desired goal of controlled modulation of transmission of the optical signal through the transmission waveguide 110.

In a third group of embodiments of the present invention, a modulator optical component 130 may comprise a modulator optical resonator for supporting a modulator optical mode whose modal index may be controlled, thereby also shifting a resonance wavelength thereof. In such "resonance-modulated" embodiments, optical power transfer (through transverse-coupling) from the circumferential optical mode to a modulator optical mode is controlled by shifting the modulator optical mode into and/or out of resonance with the circumferential optical mode. This in turn controls the round trip optical loss experienced by the circumferential optical mode in the circumferential-mode resonator 120, thereby enabling the desired goal of controlled modulation of transmission of the optical signal through the transmission waveguide 110.

In a fourth group of embodiments of the present invention, a modulator optical component 130 may comprise a modulator optical waveguide or resonator, transverse-coupled to the circumferential-mode optical resonator 120 at two separate points, for supporting a modulator optical mode whose modal index between the two points may be controlled. In such "interference-modulated" embodiments, net optical power transfer (through transverse-coupling) from the circumferential optical mode to a modulator optical mode is controlled by controlling the relative phase of the modulator optical mode and the circumferential optical mode at the second coupling region. This in turn controls the round trip optical loss experienced by the circumferential optical mode in the circumferential-mode resonator 120, thereby enabling the desired goal of controlled modulation of transmission of the optical signal through the transmission waveguide 110.

A property common to each of the second, third, and fourth groups of embodiments is control of the modal index of a modulator optical mode in response to an applied control signal. This may be preferably achieved by use of a modulator waveguide or resonator fabricated incorporating an electro-refractive material, an electro-optic material and/or a non-linear optical material, thereby enabling control of the modal index through application of an electronic and/or optical control signal.

Examples of suitable electro-optic materials (typically non-centrosymmetric) include, but are not limited to: semiconductor materials, including zincblende semiconductors; quantum well materials; multi-quantum well (MQW) materials, including materials exhibiting the quantum confined Stark effect (QCSE), Franz-Keldysh effect (FKE), quantum-confined Franz Keldysh effect (QCFKE), or similar mechanism; crystalline oxide electro-optic materials such as lithium niobate (LNB), potassium niobate (KNB), potassium dihydrogen phosphate (KDP), and so forth; organic and/or polymeric electro-optic materials, including poled chromophore-containing polymers; liquid crystals; hybrid multi-layer materials including an electro-optic and/or non-linear-optic layer in contact with or incorporated within a multi-layer reflector stack for supporting surface-guided optical modes (SGOMs) such as surface-guided Bloch modes (SGBMs), for example; hybrid multi-layer materials including an electro-optic and/or non-linear-optic layer in contact with, incorporated within, or positioned between a pair of multi-layer reflector stacks; combinations thereof; and/or functional equivalents thereof. A modulator control component may comprise control electrodes operatively coupled to the modulator optical component for enabling control of the modal index of the modulator optical mode in the modulator optical component by application of an electronic control voltage and/or current to the electro-optic or electro-refractive material. Optical excitation of some of these materials may also serve to generate charge carriers, thereby enabling control of the modal index by application of an optical control signal. Materials exhibiting non-linear optical polarizability, saturable optical polarizability, non-linear Kerr effect, and/or other non-linear optical responses may be incorporated into the modulator optical component to enable control of the modal index thereof by application of an optical control signal.

Index-modulated embodiments of an optical power control device according to the present invention are shown in FIGS. 2A, 2B, 3A, and 3B in which the modulator optical component comprises an open modulator optical waveguide positioned tangentially with respect to the circumferential-mode optical resonator. Transmission waveguide 110 is shown as a fiber-optic taper. A fiber-optic waveguide having a saddle-shaped transverse-coupling portion, as described in detail in earlier-cited application A6, or other fiber-optic waveguide could be equivalently employed. Circumferential-mode optical resonator 120 is shown as a fiber-ring resonator as described in detail in earlier-cited application A5 and A15–A18. Other circumferential-mode resonator structures could be equivalently employed. In FIGS. 2A and 2B, the modulator optical component is a slab waveguide 132 in substantial tangential engagement with circumferential-mode resonator 120, either in direct mechanical contact, or positioned at a specific distance from the circumferential-mode resonator to yield a desired level of transverse-coupling.

An evanescent portion of the circumferential optical mode supported by circumferential-mode resonator 120 may extend radially beyond the circumference thereof, and may therefore spatially overlap a portion of the slab waveguide 132. Index-modulated slab waveguide 132 may preferably be fabricated incorporating an electro-optic or electro-refractive material, so that the modal index of a modulator optical mode may be controlled by a modulator control component. Alternatively, a nonlinear-optic material may be employed for controlling the modulator modal index using an optical control signal. The electro-optic or non-linear-optic material need only be present in the interaction region (i.e., the volume of overlap between the evanescent portion of the circumferential optical mode and the slab waveguide) which is typically limited in spatial extent by the size and curvature of circumferential-mode resonator 120, although these materials may also be present elsewhere in the waveguide. The modal index shift in response to a control signal may preferably be sufficiently large to enable the circumferential-mode resonator round trip optical loss (due to transverse-coupling into the modulator waveguide) to reach a level comparable to the optical coupling between the transmission waveguide 110 and the resonator 120 (i.e., to achieve critical coupling; typically loss on the order of about 0.5% to about 5% per round trip is needed to yield linewidths consistent with typical WDM, TDM, or other optical data transmission systems; typically on the order of 1–40 GHz), or alternatively, to enable the circumferential-mode resonator round trip loss to exceed critical coupling. The slab waveguide should be kept thin (comparable to the radial extent of the evanescent portion of the circumferential optical mode beyond the circumference of resonator 120) and the index of refraction of any substantially homogeneous medium in contact with the face of the slab opposite the circumferential-mode resonator (i.e., a substrate or cladding layer) must be less than the refractive index of the slab waveguide and no greater than the refractive index of the circumferential-mode resonator. In this way optical power is confined within waveguide 132 near resonator 110, thereby substantially eliminating undesired optical loss. Otherwise optical power coupled from the circumferential-mode resonator 120 into slab waveguide 132 could propagate away from resonator 110 and be lost.

Modal index mismatch (i.e., phase mismatch) between the circumferential optical mode and the slab waveguide must be carefully controlled so that, by switching the slab waveguide modal index between two operational levels, the round trip optical loss of the circumferential-mode optical resonator (due to coupling of optical power into the modulator waveguide and dissipation therefrom) may be switched between under- and critically-coupled conditions, or between critically- and over-coupled conditions. For example, the slab waveguide material might be chosen to yield a relatively large modal-index-mismatch, thereby limiting the transfer of optical power to the slab (beat length short compared to interacting propagation distance) and resulting in over-coupling, while the application of a control signal may change the modal index so as to reduce the modal-index-mismatch (thereby lengthening the beat length) and thereby increase transfer of optical power to the slab to a sufficiently high level to result in critical-coupling and near-zero transmission of the optical signal through the transmission optical waveguide. In a second example, the slab and circumferential-mode resonator might be well modal-index-matched and the coupling chosen to yield a critical-coupling condition (interaction length about one-half the beat length), while the modal index of the slab may be switched to a level that results in modal-index-mismatch (interaction length roughly equal to the beat length) and an over-coupled condition. Many other schemes and combinations of modal index operational levels and modal-index-match/mismatch between the circumferential-mode resonator and the slab waveguide may be employed while remaining within the scope of inventive concepts disclosed and/or claimed herein. For a given circumferential-mode optical resonator geometry, slab waveguide material, and so forth, some experimentation is typically required to determine the level of transverse-coupling, and the appropriate operational levels of slab waveguide modal index to produce the desired modulation of the circumferential-mode resonator round trip loss.

Dissipation of optical power from the modulator waveguide may be achieved in a variety of ways. The optical power may be allowed to simply propagate in the modulator waveguide away from the interaction region to radiate into the environment, without an opportunity to couple back into the circumferential-mode resonator. Alternatively, the modulator waveguide may be provided with a region of high optical loss (which need not be modulated). The high-loss region may encompass all or a portion of the modulator waveguide, and may or may not be spatially separate from the interaction region. The optical loss may be provided in myriad functionally equivalent ways, including but not limited to optical absorption and optical scattering, and optical power coupled into the modulator waveguide from the circumferential-mode resonator may propagate in the region of high optical loss and be absorbed or otherwise dissipated. Any functionally equivalent means for dissipating optical power transferred into the modulator waveguide from the circumferential-mode optical resonator may be employed without departing from inventive concepts disclosed and/or claimed herein.

In FIGS. 3A and 3B, the modulator optical component is an index-modulated laterally-confined waveguide 134 on a substrate 136 and positioned tangentially with respect to circumferential-mode optical resonator 120 (in this example a fiber-ring circumferential-mode resonator as described in earlier cited application A5 and A15 –A18; other circumferential-mode structures may be equivalently employed). Most of the same considerations applicable to the index-modulated slab waveguide embodiment of FIGS. 2A and 2B apply to the laterally-confined waveguide embodiment of FIGS. 3A and 3B. The laterally-confined waveguide 134 may preferably be fabricated incorporating an electro-optic, electro-refractive material, and/or non-linear-optical material so that the modal index of a modulator optical mode may be controlled by a modulator control component (by applying an electronic and/or optical control signal), and which may produce circumferential-mode resonator round trip loss sufficient to achieve critical coupling. Modal index mismatch between the laterally-confined waveguide and the circumferential-mode optical resonator must be controlled in the manner described hereinabove for the index-modulated slab waveguide. In addition to the laterally-confined waveguide material and the substrate material, the transverse geometry of the laterally-confined waveguide must also be chosen to yield the desired spatial overlap and modal-index-match/mismatch properties.

The modal index of index-modulated slab waveguide 132 or laterally-confined waveguide 134 may be controlled by electronic, optical, and/or other means. For example, a quantum well, multi-quantum well (MQW), other semiconductor, or any other suitable electro-optic material may be incorporated into the modulator waveguide as an electro-optic material, so that the modal index of the modulator waveguide may be altered by application of a control electric field. For wavelengths between about 1.2 μm and 1.7 μm, the InGaAsP MQW material described in detail hereinabove may be used as a suitable electro-optic material, with the modal index shifted by application of a control electric field through QCSE, FKE, QCFKE, or other similar mechanism. The properties of the MQW material must differ slightly depending on whether the material is to be used as an electro-absorptive material or an electro-refractive/electro-optic material. In both cases the bandgap of the barrier layers should preferably be substantially greater than the photon energy of the light to be modulated. For an electro-optic material, however, the quantum well bandgap should be between about 30 meV and about 60 meV above the photon energy (in contrast to 10–30 meV for an electro-absorptive material), so that the modulator waveguide does not introduce unwanted optical loss. A modulator control component may comprise control electrodes suitably positioned to apply the control electric field. Alternatively, the modal index of such materials may be controlled by injection of current into the material. The presence of additional charge carriers (electrons or holes, as the case may be) may serve to increase or decrease the modal index of the waveguide material, depending on the bandgap, band structure, and/or doping of the semiconductor and the wavelength of the optical mode to be modulated. Control electrodes or other electrical contact may serve to inject a control electrical current. Optical excitation of such materials may also serve to generate charge carriers, thereby allowing control of the waveguide modal index to be controlled by application of an optical control signal. Other classes of materials exhibiting non-linear optical polarizability, saturable optical polarizability, non-linear Kerr effect, and/or other non-resonant non-linear-optical responses may be equivalently incorporated into the modulator waveguide to enable control of the waveguide modal index by application of an optical control signal. As with the loss-modulated embodiments, many other electro-optic materials, non-linear-optical materials, and/or material combinations may be employed to implement an index-modulated embodiment operable at other wavelengths. Several suitable material combinations are disclosed in earlier-cited applications A12 and A20.

An index-modulated embodiment of an optical power control device according to the present invention is shown in FIGS. 4A and 4B in which the modulator optical component comprises an open arcuate modulator optical waveguide 138 positioned axially with respect to the circumferential-mode optical resonator. Transmission waveguide 110 is shown as a fiber-optic taper. A fiber-optic waveguide having a saddle-shaped transverse-coupling portion, as described in detail in earlier-cited application A6, or other fiber-optic waveguide could be equivalently employed. Circumferential-mode optical resonator 120 is shown as a fiber-ring resonator as described in detail in earlier-cited application A5 and A15–A18. Other circumferential-mode resonator structures could be equivalently employed. In FIG. 4A spacer 139 is shown for positioning arcuate waveguide 138 at the proper distance from circumferential-mode resonator 120. In this particular embodiment the spacer 139 comprises a portion of an adjacent fiber segment connected to the fiber-ring resonator with arcuate waveguide 138 deposited thereon, bonded thereto, or otherwise held in contact therewith. Some experimentation will typically be required to determine the spacing between circumferential-mode resonator 120 and arcuate waveguide 138 that produces the desired level of round-trip optical loss for circumferential-mode resonator 120 and the appropriate modal-index-matching conditions between circumferential-mode resonator 120 and arcuate waveguide 138. Once the proper thickness of spacer 139 has been determined, it may be reproducibly fabricated by cleaving, etching, machining, lithography, cylindrical lithography, or other suitable processing of the adjacent fiber segment. A similar spacer may be employed for other types of circumferential-mode resonator as well. The same types of materials used for the index-modulated slab and 2D waveguides described hereinabove may be employed for fabricating index-modulated arcuate waveguide 138. In particular, arcuate waveguide 138 may comprise the InGaAsP multi-quantum well material described hereinabove, with the alternating quantum well and barrier layers substantially parallel to circumferential-mode resonator 120 and with the control electric field applied substantially perpendicular to circumferential-mode resonator 120. An advantage of this embodiment is increased interaction length between the circumferential optical mode and the arcuate waveguide relative to the tangentially positioned waveguides, therefore requiring smaller modal index shifts to achieve the same changes in power transfer through transverse-coupling to and round trip optical loss from the circumferential-mode resonator.

A significant property of both tangentially- and axially-positioned index-modulated open modulator optical waveguide structures is that since no re-circulation of any waveguide optical mode occurs, the presence of the modulator optical waveguide has a substantially negligible effect on the wavelength-dependent properties and/or resonant behavior of the adjacent circumferential-mode optical resonator. Such wavelength/frequency shifting behavior can adversely affect the performance of an optical power control device according to the present invention, or alternatively may be exploited to enhance said performance, depending on the design, construction, and use of a particular device.

Various index-modulated embodiments of an optical power control device according to the present invention are shown schematically in FIGS. 5A through 5E in which the modulator optical component comprises a closed optical waveguide (i.e., a modulator optical resonator 140) positioned tangentially (FIGS. 5A and 5B) or axially (FIGS. 5C, 5D, and 5E) with respect to the circumferential-mode resonator 120, and oriented substantially parallel to (FIGS. 5A, 5C, and 5D) or substantially perpendicular to (FIGS. 5B and 5E) the circumferential-mode resonator 120. Transmission waveguide 110 is shown as a tapered fiber-optic waveguide. A fiber-optic waveguide having a saddle-shaped transverse-coupling portion, as described in detail in earlier-cited application A6, or other fiber-optic waveguide could be equivalently employed. Circumferential-mode optical resonator is shown as a micro-disk or micro-ring resonator. Other circumferential-mode resonator structures could be equivalently employed. Index-modulated modulator optical resonator 140 may comprise any of the resonator structures recited earlier for circumferential-mode resonator 120, including but not limited to spheres, near-spheres, oblate and/or prolate spheroids, ovals, ovoids, racetracks, ellipsoids, polygons, polyhedra, cylinders, disks, rings, micro-spheres, micro-disks, micro-rings, fiber-rings, disks and/or rings on substrates (including structures disclosed in earlier-cited application A12 and A20), ring or other closed waveguides, and/or functional equivalents thereof, and are shown generically as micro-disks or micro-rings in FIGS. 5A through 5E. Index-modulated modulator optical resonator 140 is shown in FIGS. 5A and 5B in substantial tangential engagement with circumferential-mode optical resonator 120, either in direct mechanical contact, or positioned at a specific distance from the circumferential-mode resonator (by a spacer or other suitable alignment structure) to yield a desired level of transverse-coupling. An evanescent portion of the circumferential optical mode extending radially beyond circumferential-mode resonator 120 may overlap a portion of modulator optical resonator 140, either a radially-extending portion thereof when substantially parallel to circumferential-mode resonator 120 (FIG. 5A), or an axially-extending portion thereof when substantially perpendicular to circumferential-mode resonator 120 (FIG. 5B). Index-modulated modulator optical resonator 140 is shown in FIGS. 5C, 5D, and 5E positioned axially with respect to circumferential-mode optical resonator 120, either in direct mechanical contact, or positioned at a specific distance from the circumferential-mode resonator (by a spacer or other suitable alignment structure) to yield a desired level of transverse-coupling. An evanescent portion of the circumferential optical mode extending axially beyond circumferential-mode resonator 120 may overlap a portion of modulator optical resonator 140, either an axially-extending portion thereof when substantially parallel to circumferential-mode resonator 120 (FIGS. 5C and 5D), or a radially-extending portion thereof when substantially perpendicular to circumferential-mode resonator 120 (FIG. 5E).

Index-modulated modulator optical resonator 140 may preferably be fabricated incorporating a material enabling control of the modal index of a modulator resonator optical mode by applying a control signal via a modulator control component. The modulator optical resonator 140 should preferably have a resonant optical mode having substantially the same wavelength as the circumferential optical mode of circumferential-mode resonator 120 (and hence the optical signal to be controlled). This enables transfer of optical power from the circumferential-mode resonator and build-up of optical power within the modulator optical resonator, in turn enabling dissipation of optical power from modulator resonator 140 to produce sufficiently large round trip optical loss for the circumferential-mode resonator 120 coupled thereto. If the modulator optical resonator and circumferential-mode optical resonator are not resonant with each other, in contrast, the modulator resonator would have a negligible effect on the round-trip loss of the circumferential-mode resonator. Index-modulated modulator optical resonator 140 may preferably be fabricated incorporating an electro-optic or non-linear-optical material, so that the modal index of a modulator resonator optical mode may be controlled by a modulator control component. A complication encountered when implementing an embodiment that includes an index-modulated modulator resonator arises from the unavoidable wavelength shift of the resonant optical mode of the modulator resonator that occurs with a change in the modal index thereof. The circumferential-mode resonator and modulator optical resonator must be treated as a coupled-cavity system, and shifts in the modulator resonance wavelength may perturb the resonances of the coupled system. This effect must be properly accounted for in designing an optical power control device incorporating a modulator optical resonator, or alternatively, the effect may be exploited for designing optical power control devices with specific wavelength dependent performance characteristics. One approach might involve providing the modulator resonator with two index-modulated regions: one at the interaction region near the circumferential-mode resonator and another far from the circumferential-mode resonator. Application of a control signal may serve to change the modal index in the interaction region to change the level of optical power transfer by transverse-coupling, while the modal index in the second region may change by an appropriate amount to leave the resonance frequency of the modulator resonator substantially unchanged. The effects of shifting resonances in the coupled-cavity system may be somewhat mitigated for a low-Q index-modulated resonator modulator component, since the dissipation of optical power from the modulator resonator tends increase the bandwidth of its resonances, in turn decreasing the effect of the modulator resonances on the circumferential-mode resonances in the coupled-cavity system. In short, index- or coupling-modulated resonators or "closed waveguide" modulator optical components having relatively low finesse (less than about 10) may behave substantially less "resonator-like" than the relatively high-finesse circumferential-mode resonator.

Alternatively, the modulator optical resonator 140 may be a relatively high-Q resonator and should preferably have a resonant optical mode having substantially the same wavelength as the circumferential optical mode of circumferential-mode resonator 120 (and hence the optical signal to be controlled). Transfer of optical power from the circumferential optical mode of circumferential-mode resonator 120 into modulator optical resonator 140, and subsequent dissipation of optical power therefrom, may be modulated (to a degree sufficient to switch the optical power control device between conditions of under- and critical-coupling, or between conditions of critical- and over-coupling) by modulation of the modal index of the modulator resonator 140 to shift the resonance wavelength thereof from a condition of resonance with the circumferential optical mode (yielding greater optical power transfer to the modulator optical mode) to a condition of non-resonance with the circumferential optical mode (yielding little or no optical power transfer to the modulator optical mode). Dissipation of optical power from the modulator resonator 140 in such a "resonance-modulated" device may be achieved in a variety of ways. The dissipated optical power may be allowed to simply propagate in the modulator resonator away from the interaction region to radiate into the environment, without an opportunity to couple back into the circumferential-mode resonator. Alternatively, the modulator resonator may be provided with a region of high optical loss (which need not be modulated). The high-loss region may encompass all or a portion of the modulator resonator, and may or may not be spatially separate from the interaction region. The optical loss may be provided in myriad functionally equivalent ways, including but not limited to optical absorption and optical scattering, and optical power coupled into the modulator resonator from the circumferential-mode resonator may propagate in the region of high optical loss and be absorbed or otherwise dissipated. Any functionally equivalent means for dissipating optical power transferred into the modulator resonator from the circumferential-mode optical resonator may be employed without departing from inventive concepts disclosed and/or claimed herein.

Any of the electro-optic or non-linear-optical materials recited hereinabove for an index-modulated modulator waveguide, or functional equivalents thereof, may be incorporated into a modulator resonator according to the present invention, with suitable adjustment to yield electro-refractive behavior instead of electro-absorptive behavior. An index- or resonance-modulated modulator optical resonator may be positioned relative to a circumferential-mode fiber-ring resonator by a spacer as shown in FIGS. 6A–6C, FIG. 7, and FIGS. 8A–8B.

A preferred material for any of the index-modulated modulator optical waveguides and/or resonators of FIGS. 3A–3B, 4A–4B, 5B–5D, 6A–6B, and/or FIG. 7 may be a multi-layer reflector stack (for example, a distributed Bragg reflector, or DBR, stack). Such multi-layer reflector stacks may be employed to support and/or guide propagation of so-called surface guided optical modes (SGOMs) such as surface-guided Bloch modes (SGBMs), for example. A SGOM supported by any of the index-modulated modulator waveguides and/or modulator resonators of FIGS. 3A–3B, 4A–4B, 5B–5D, 6A–6B, and/or FIG. 7 (fabricated as a multi-layer-reflector stack) may serve as the modulator optical mode. The surface-guided modulator optical mode may be transverse-coupled to the circumferential optical mode from the top of the stack (referred to as "surface-coupled"), or from the side of the stack (referred to a "side-coupled"). The multi-layer-reflector stack is preferably fabricated (typically using epitaxial, evaporative, effusive, and/or chemical vapor deposition/growth techniques, wafer-bonding techniques, lithography, spatially-selective processing, and/or other related techniques) incorporating one or more electro-optic layers and control electrodes for applying a control electric field to control the material index of the electro-optic layer. Alternatively, the multi-layer reflector may include one or more non-linear-optical layers controlled by an optical signal. The strongly dispersive optical properties of a multi-layer-reflector-guided SGOM (a substantially flat dispersion relation in the operating wavelength range, so that a narrow range of wavelengths cover a wide range of propagation constants or modal indices) serve to produce a substantially larger modal index shift of the SGOM for a given applied control voltage level than previous electro-optic devices. This in turn enables optical power control devices incorporating electro-optic or non-linear-optical multi-layer-reflector waveguides or resonators according to the present invention to be operated with substantially smaller control voltages (and lower electrical drive power consumption) or lower-intensity optical signals than their counterparts incorporating simpler materials and/or geometries. A wide variety of material combinations, layer sequences, and/or fabrication/processing techniques may be employed to implement an electro-optic/DBR stack embodiment of the present invention. Many examples of such surface-guiding multi-layer reflector stack waveguides and/or resonators are disclosed in earlier-cited applications A12 and A20, and any of those examples may be employed in an index-modulated modulator, and/or a resonance-modulated modulator resonator, without departing from inventive concepts disclosed and/or claimed herein.

In an alternative embodiment of any of the index-modulated modulator optical waveguides and/or resonators of FIGS. 3A–3B, 5A, and/or 5E, a pair of multi-layer reflector stacks may be employed surrounding a core layer; the multi-layer-reflector stacks may be similar to or may differ from one another. In such structures the modulator optical mode may be supported and substantially confined by the multi-layer-reflector stacks in a region near the core layer. The confined modulator optical mode may be transverse-coupled to the circumferential optical mode from the top or side of the multi-layer stack (surface-coupled or side-coupled). The stack is preferably fabricated (typically using epitaxial, evaporative, effusive, and/or chemical vapor deposition/growth techniques, wafer-bonding techniques, lithography, spatially-selective processing, and/or other related techniques) incorporating one or more electro-optic layers with control electrodes for applying a control electric field to control the material index of the electro-optic layer. Alternatively, the stack may incorporate one or more non-linear-optical layers controlled by an optical signal. The strongly dispersive optical properties of a dual-refelctor-guided confined optical mode enable operation of devices with substantially smaller control voltages (and lower electrical drive power consumption) or lower-intensity optical signals than their counterparts incorporating simpler materials and/or geometries, in a manner analogous to that described hereinabove for SGOMs. Many examples of such dual-multi-layer-reflector stack waveguides and/or resonators are disclosed in earlier-cited application A12 and A20, and any of those examples may be employed in an index-modulated modulator, and/or a resonance-modulated modulator resonator, without departing from inventive concepts disclosed and/or claimed herein.

Figure 10:
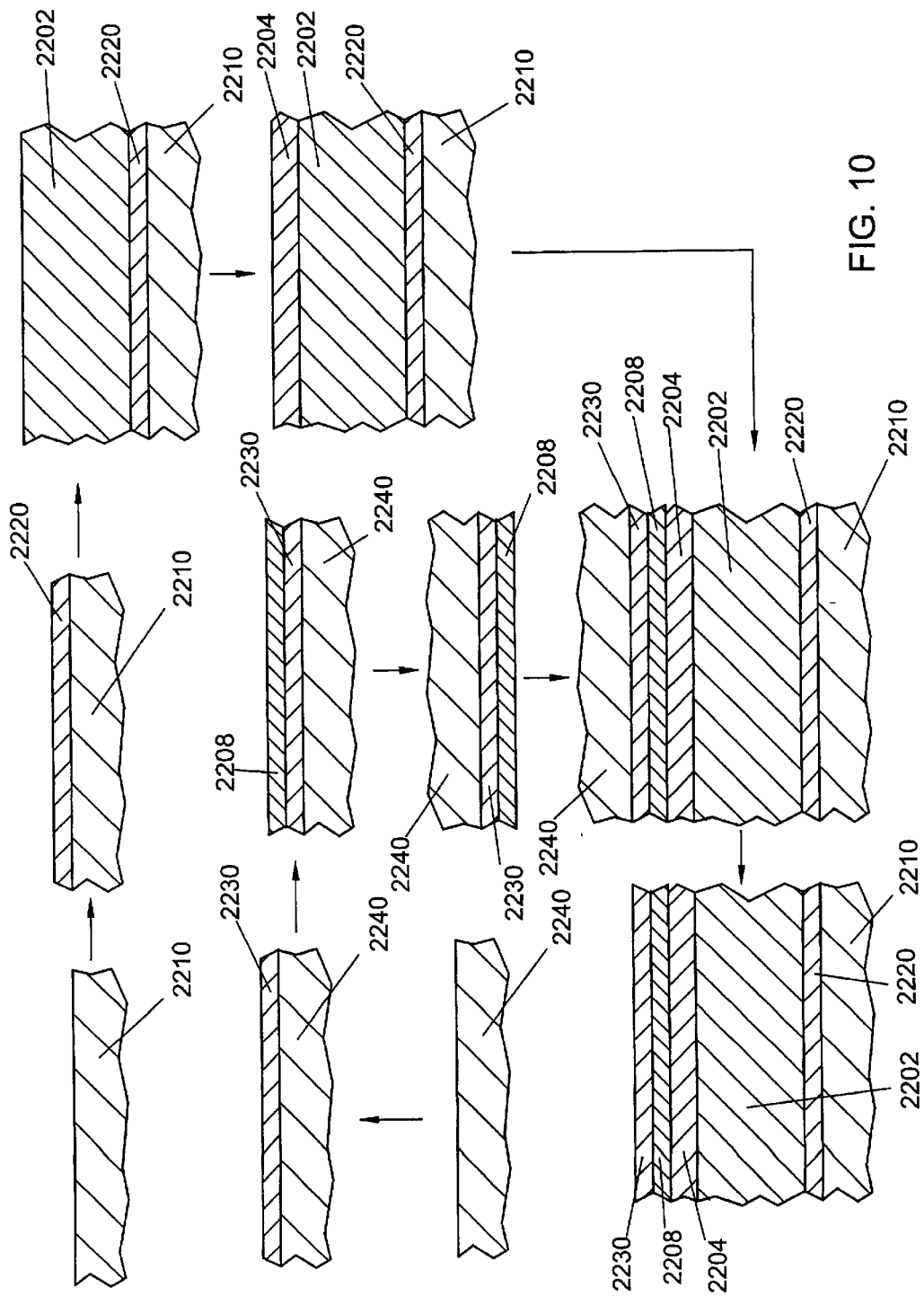
FIG. 10 is a process diagram for fabricating a modulator optical component according to the present invention.

Exemplary fabrication procedures and cross-sectional structures of index-modulated electro-optic/Bragg stack waveguides or resonators are depicted in FIGS. 9 through 16. The flowchart of FIG. 9 and process diagram of FIG. 10 illustrate fabrication (by epitaxial techniques and/or other functionally equivalent deposition/growth/processing techniques) of a multi-layer reflector stack 2202 and a high-index core layer 2204 on a first substrate 2210, the reflector stack comprising alternating $\gamma/4$ (quarter-wave) layers of materials differing in material refractive index (i.e., a distributed Bragg reflector in this example). A preferred reflector stack may comprise alternating $\gamma 4$ layers of GaAs (index about 3.5) and high-aluminum-fraction AlGaAs (between about 0.90 and about 0.97 aluminum; index about 3.2) on a GaAs substrate. In general the appropriate quarter-wave thickness is determined based on the index of the material ultimately present in a given layer; this may not be the same material initially deposited if subsequent processing (oxidation, for example) brings about a chemical conversion of the layer to a new material. A doped layer 2220 of InGaAs may be provided between the substrate 2210 and the reflector stack 2202 to enable subsequent electrical contact for applying the control voltage, and a GaAs or AlGaAs cladding layer may be provided on top of the Bragg stack if desired.

On a second substrate 2240, a MQW material electro-optic layer 2208 may be fabricated (for example, the InGaAsP MQW material as described hereinabove for use as an electro-absorptive or electro-optic material for wavelengths from about 1.2 µm to about 1.7 µm; other functionally equivalent electro-optic materials may be used, or a non-linear optical material may be employed) and may include cladding layers above and below the MQW layers (if desired) and a doped layer 2230 between the MQW layer 2208 and the substrate 2240 to enable subsequent electrical contact for applying the control voltage. The top of the MQW material 2208 (or the top cladding layer, if present) is then wafer-bonded or equivalently secured to the high-index core layer 2204 (or top cladding layer, if present) on the reflector stack 2202. The MQW substrate 2240 may then be etched away or otherwise equivalently removed, leaving the MQW electro-optic layer 2208, contact layer 2230, and bottom cladding layer (if present) exposed and accessible for subsequent transverse optical surface coupling to the circumferential-mode optical resonator. Use of wafer-bonding techniques in this example is required due to the lattice mismatch between the GaAs/AlGaAs reflector stack and the InGaAsP MQW. If lattice-compatible materials are employed for the reflector stack and the electro-optic layer, then both may be deposited sequentially on a single substrate, and no wafer-bonding step is required. Numerous examples of multi-layer reflector and electro-optic/non-linear-optic material combinations, some requiring wafer-bonding and others fabricated on a single substrate, are disclosed in earlier-cited applications A12 and A20.

Figure 11:
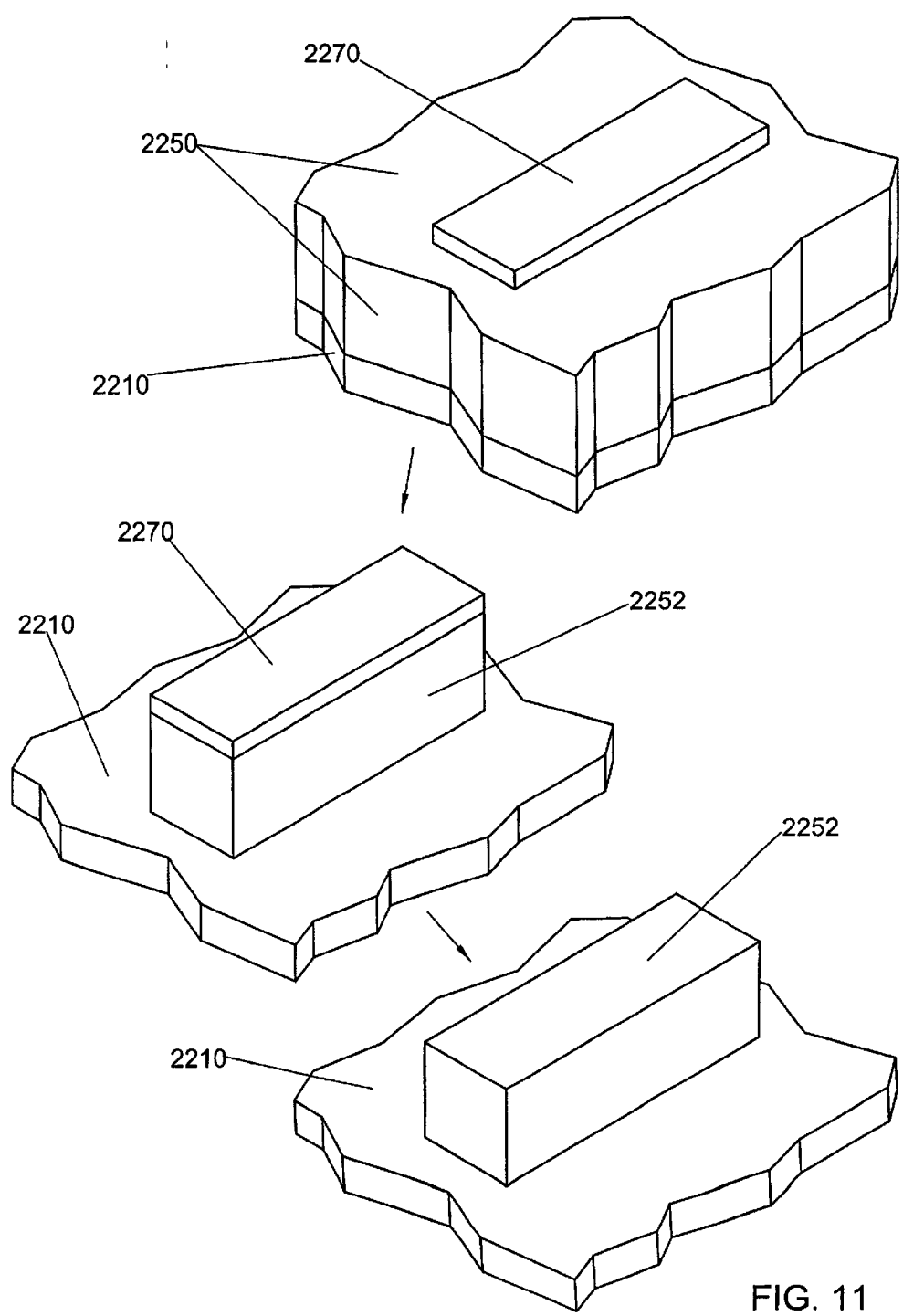
FIG. 11 is a process diagram for fabricating a modulator optical component according to the present invention.
Figure 12:
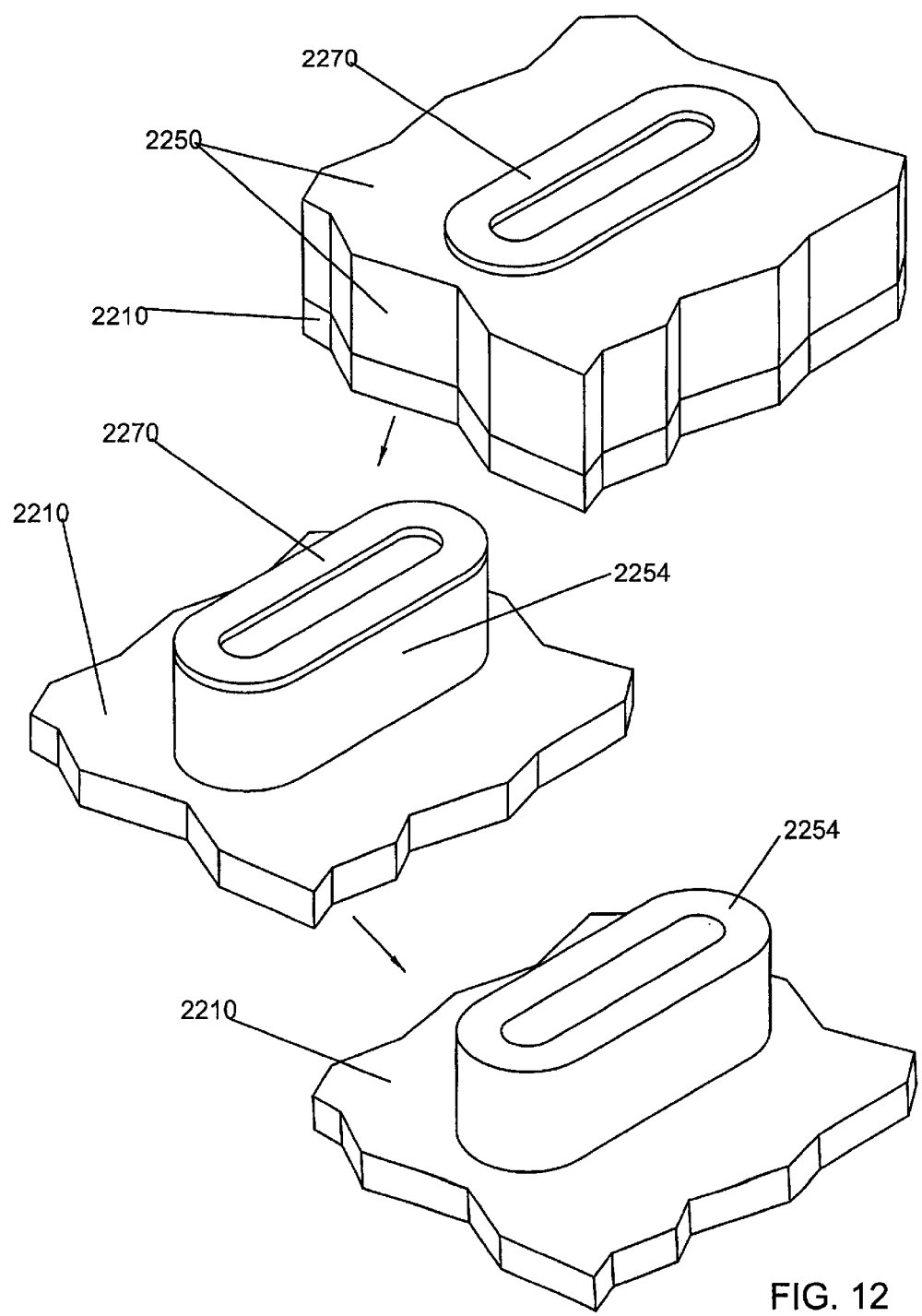
FIG. 12 is a process diagram for fabricating a modulator optical component according to the present invention.
Figure 13:
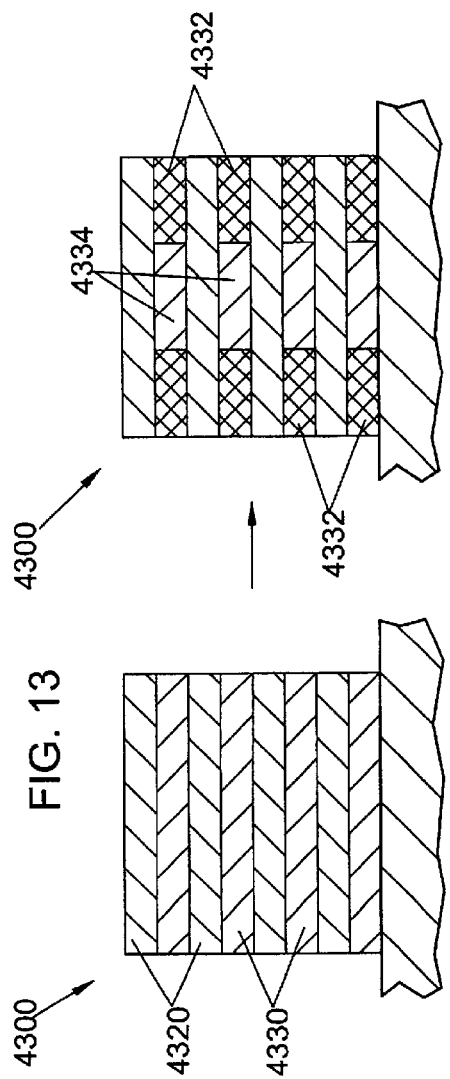
FIG. 13 is a process diagram for fabricating a modulator optical component according to the present invention.
Figure 14:
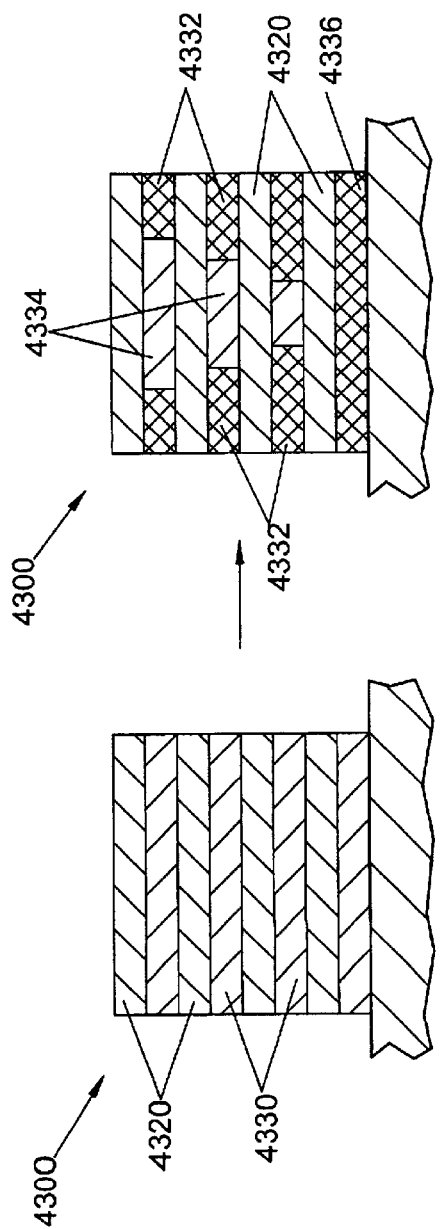
FIG. 14 is a process diagram for fabricating a modulator optical component according to the present invention.

The wafer-bonded reflector stack/MQW composite structure 2250 may then be spatially-selectively etched (using etch mask 2270, for example) and/or otherwise processed to leave a protruding ridge structure of the appropriate shape (a straight or arcuate segment 2262 for an open waveguide as in FIG. 11; a ring, racetrack, or other closed path for a closed waveguide or resonator 2254 as in FIG. 12) on substrate 2210. The protruding ridge structure provides lateral confinement for the waveguide/resonator structure. As shown in cross-section in FIGS. 13 and 14, ridge structure 4300 may be oxidized, converting lateral portions 4332 of each AlGaAs layer 4330 to aluminum oxide and leaving a central portion 4334 of AlGaAs in each of the AlGaAs layers 4330. These central AlGaAs portions 4334 together with GaAs layers 4320 form a core of the waveguide (or resonator) structure 4300, while the lateral aluminum oxide portions 4332 together form lateral cladding layers of the waveguide (or resonator) structure 4300. The aluminum fraction of each of the AlGaAs layers may be the same, yielding a waveguide (or resonator) core of substantially uniform width upon lateral oxidation (FIG. 13), or the aluminum fraction may decrease from the bottom of the reflector stack near the substrate up towards the top of the stack, yielding a waveguide (or resonator) core that is narrower at the bottom of the Bragg stack near the substrate and that becomes wider toward the top of the stack upon lateral oxidation (FIG. 14). Oxidation proceeds more rapidly with increasing Al content of a given layer. Other processing techniques may be employed to yield alternative laterally-confined waveguide/resonator structures while remaining within the scope of inventive concepts disclosed and/or claimed herein, and many of these are disclosed in earlier-cited applications A12 and A20.

The MQW material may act as an electro-optic spacer on the reflector stack waveguide (or resonator), and application of the control voltage across the doped contact layers changes the material index of the MQW. This in turn results in substantially larger changes in the modal index of the SGOM supported by the reflector stack, and therefore substantial shifts in the modal-index-matching condition (and degree of optical power transfer between under-, critical-, and/or over-coupling) between the reflector stack and the circumferential-mode resonator. Larger changes in the level of optical power transfer may be achieved for a given applied control voltage using an electro-optic/reflector stack device than by using a simple electro-optic device as described earlier herein, enabling substantial reduction of control voltage and electrical drive power to operate an optical power control device. Similar reductions in optical control signal intensity result from use of non-linear-optic/reflector stack devices. While multi-layer reflector stacks fabricated from GaAs/AlGaAs are currently preferred (since they are already well-understood and well-characterized and yield high-index-contrast reflector structures), other combinations of materials yielding functionally equivalent Bragg stacks (currently known or hereafter developed) may be employed without departing from inventive concepts disclosed and/or claimed herein. Similarly, while InGaAsP multi-quantum well materials are currently preferred (since they are already well-understood and well-characterized, and are suitable for use in the technologically important 1.2–1.7 μm wavelength range), other multi-quantum well materials yielding functionally equivalent electro-optic, electro-absorptive, and/or non-linear-optical properties (currently known or hereafter developed) may be employed without departing from inventive concepts disclosed and/or claimed herein. Alternatively, any of the electro-optic, electro-absorptive, and/or non-linear-optic materials disclosed hereinabove may be equivalently employed for fabricating a waveguide/resonator in conjunction with a multi-layer reflector stack as disclosed herein.

Figure 15:
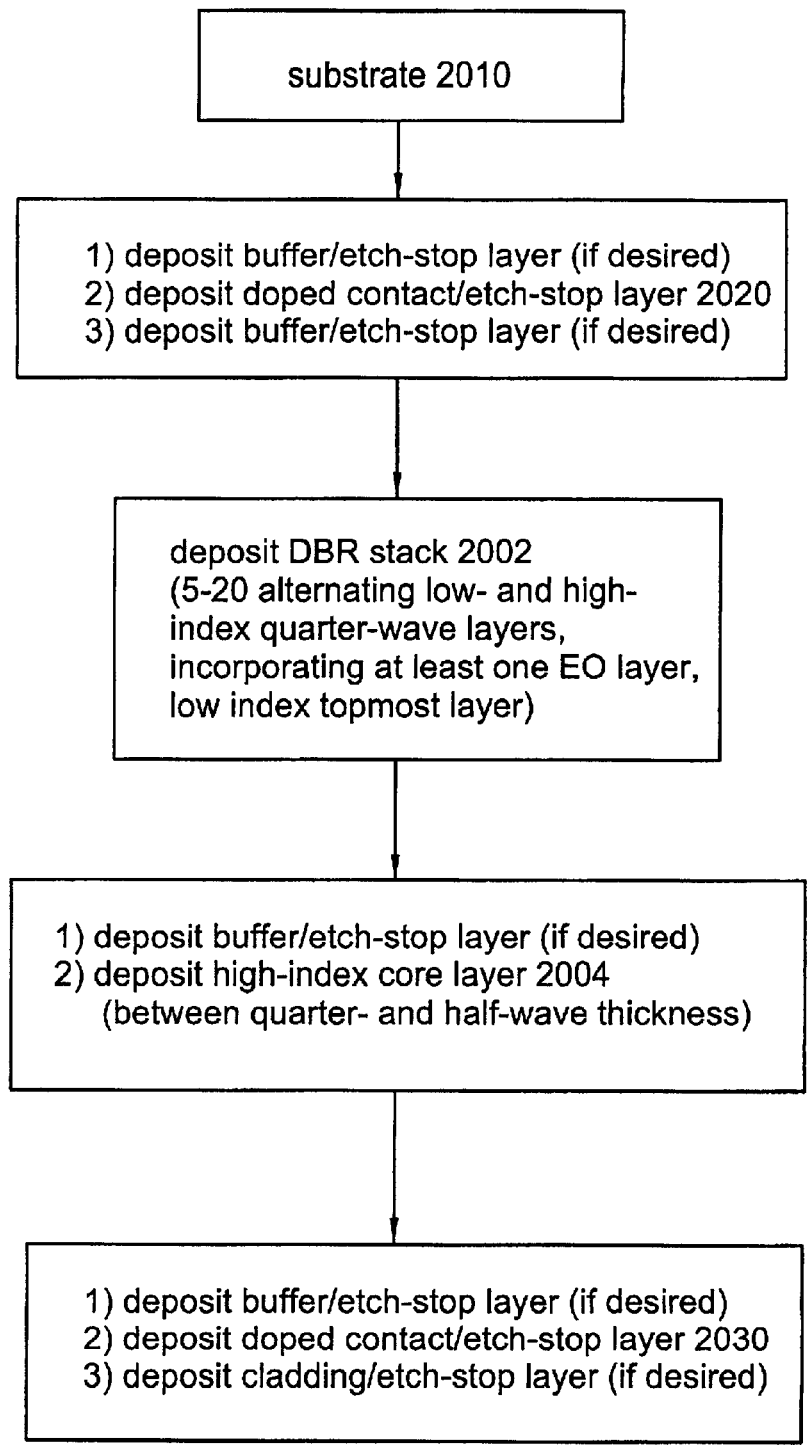
FIG. 15 is a flow diagram for fabricating a modulator optical component according to the present invention.
Figure 16:
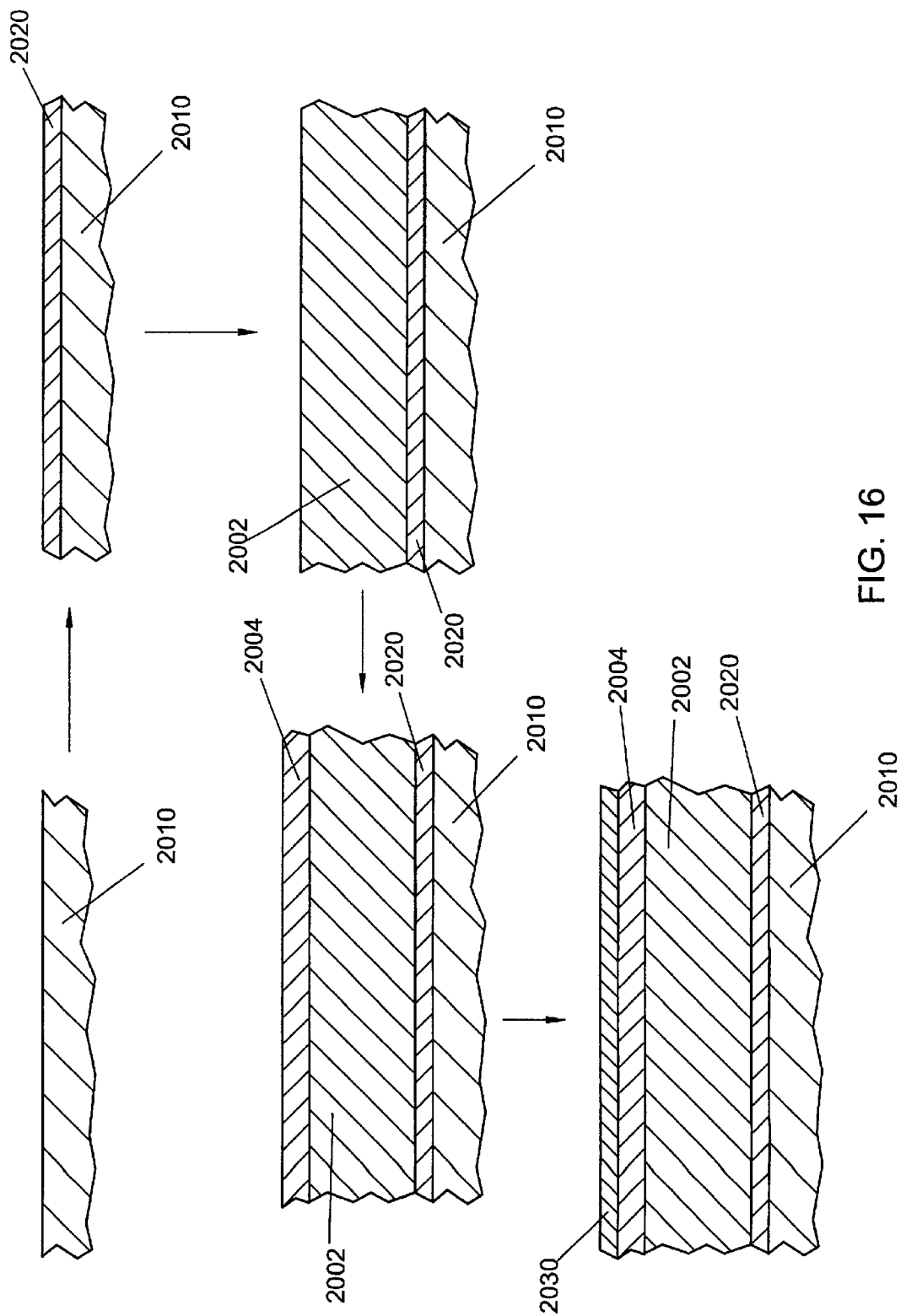
FIG. 16 is a process diagram for fabricating a modulator optical component according to the present invention.
Figure 17A:
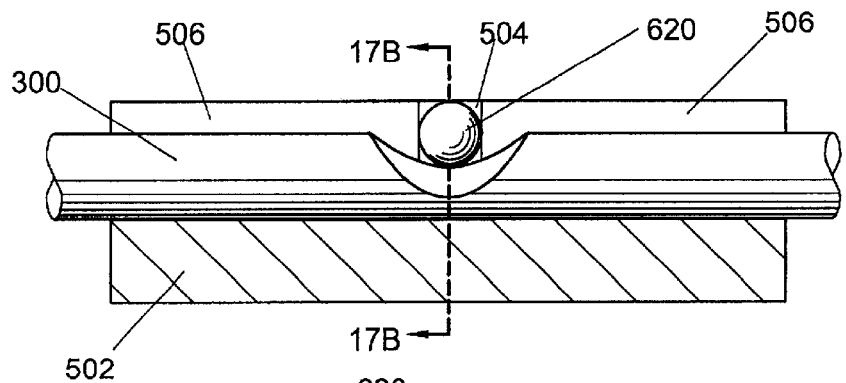
FIGS. 17A, 17B, and 17C are two partial sectional views and one top view, respectively, of a resonant optical filter according to the present invention.
Figure 17B:
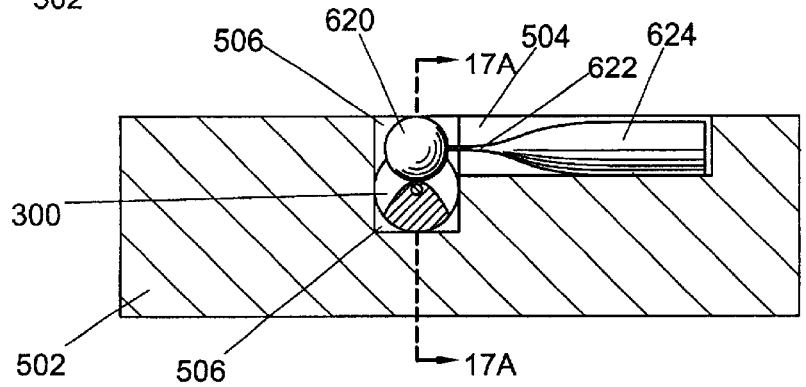
Figure 17C:
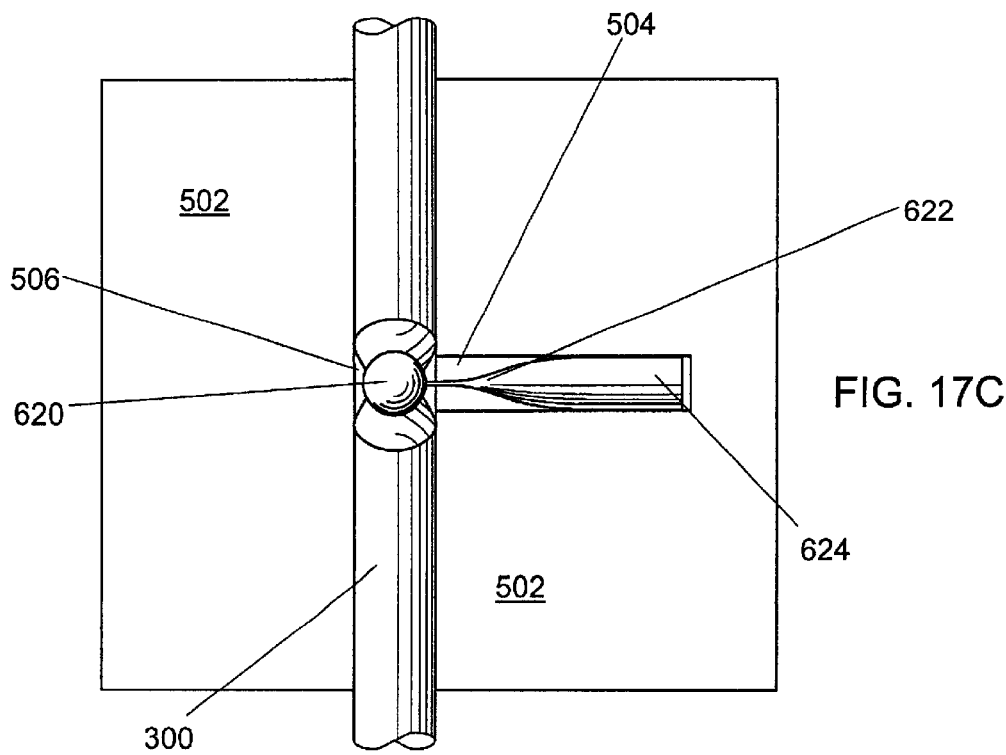
Figure 18A:
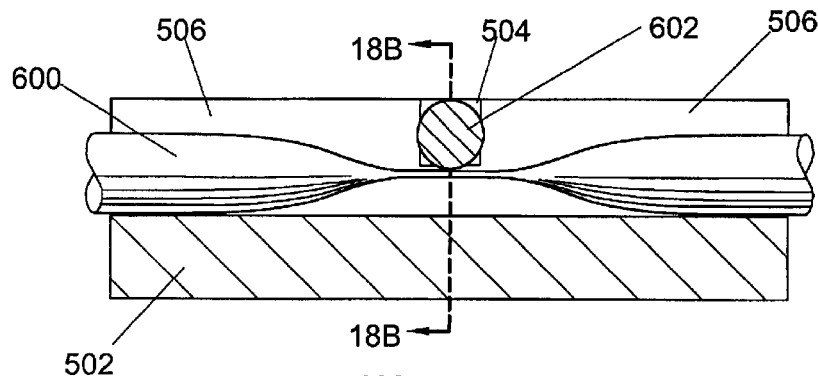
FIGS. 18A, 18B, and 18C are two partial sectional views and one top view, respectively, of a resonant optical filter according to the present invention.
Figure 18B:
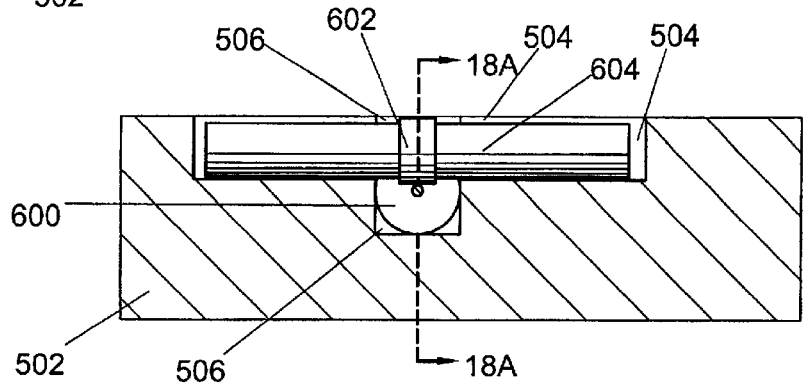
Figure 18C:
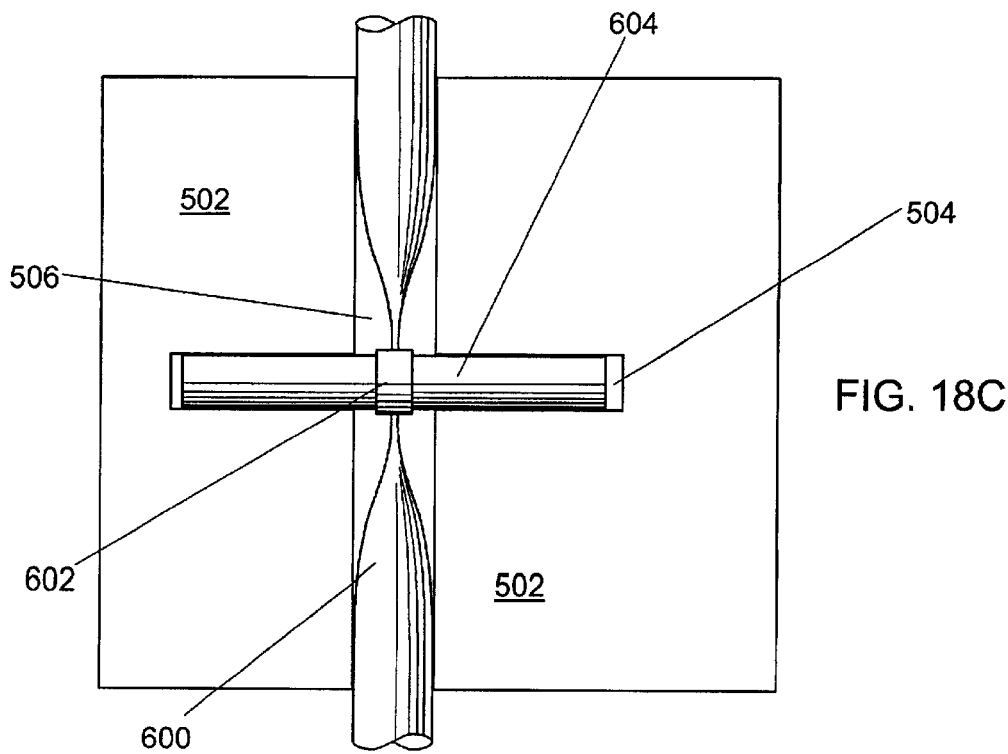
Figure 19A:
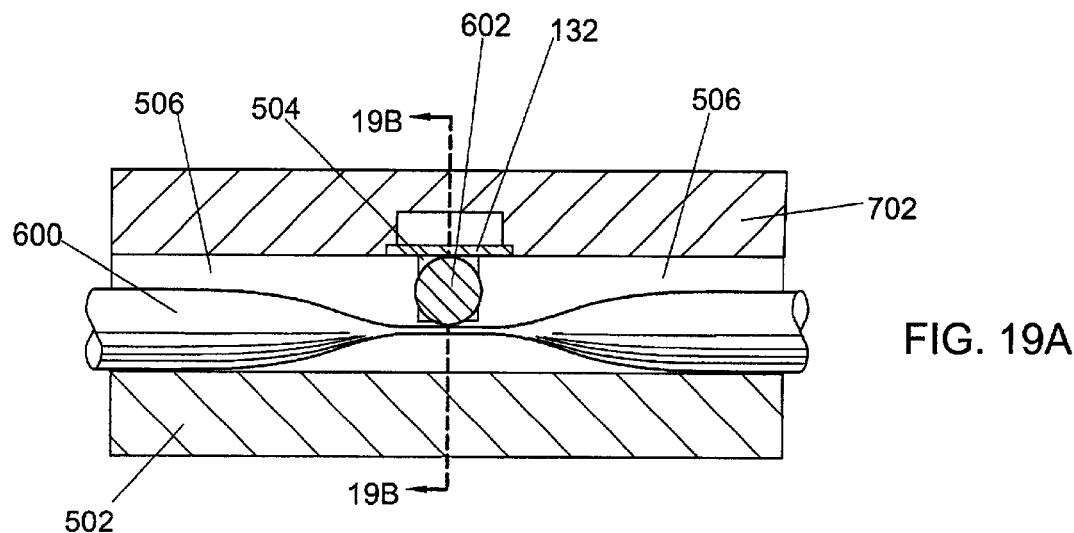
FIGS. 19A and 19B are partial sectional views of a resonant optical filter according to the present invention.
Figure 19B:
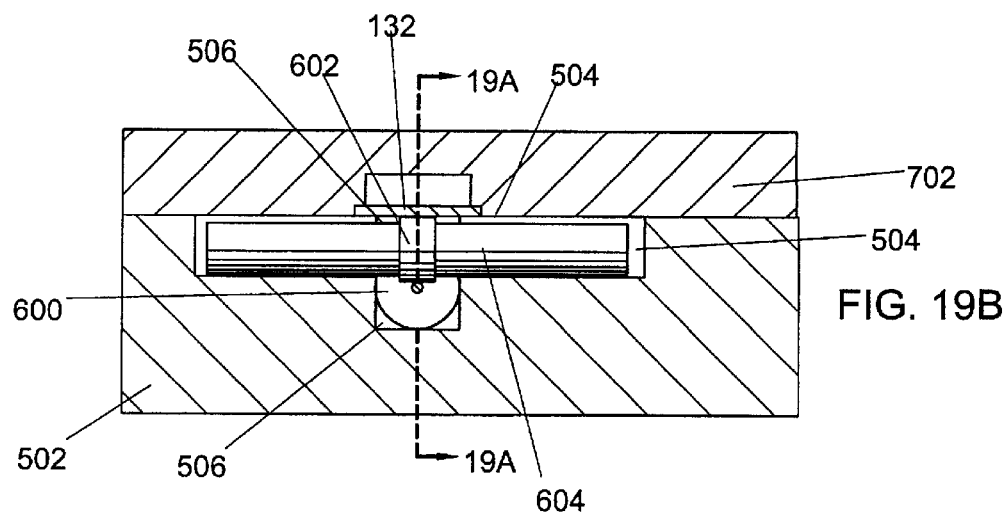
Figure 20A:
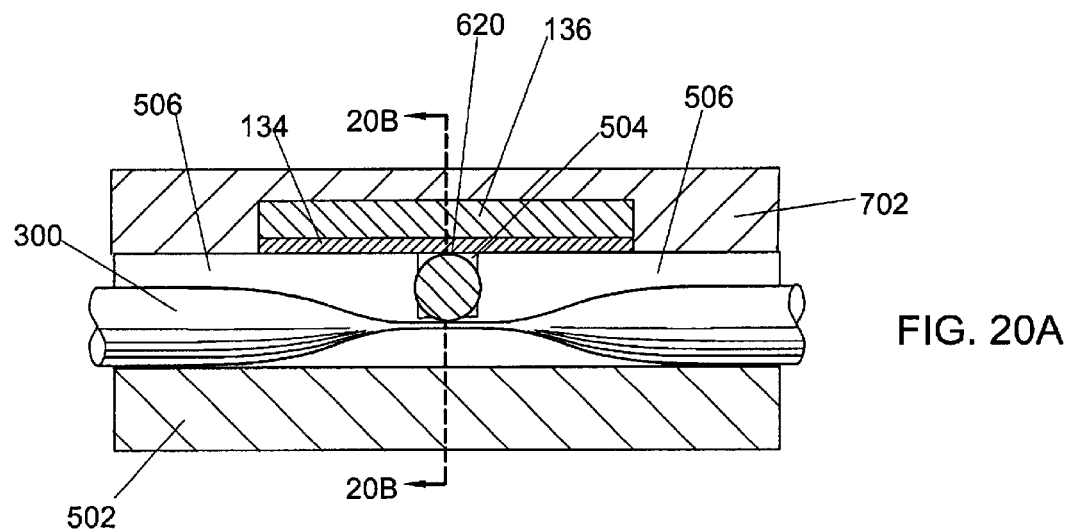
FIGS. 20A and 20B are partial sectional views of a resonant optical filter according to the present invention.
Figure 20B:
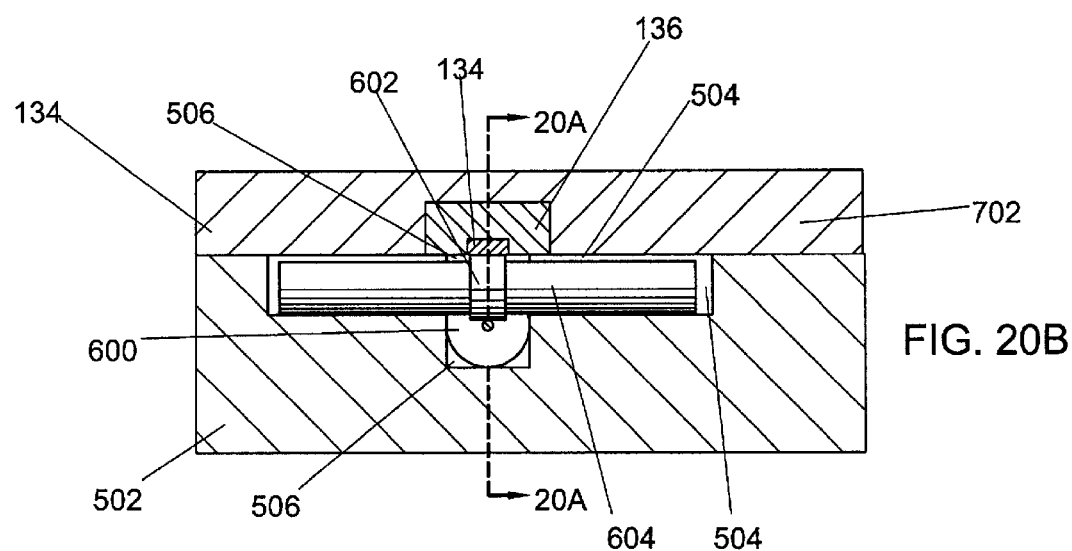
Figure 21A:
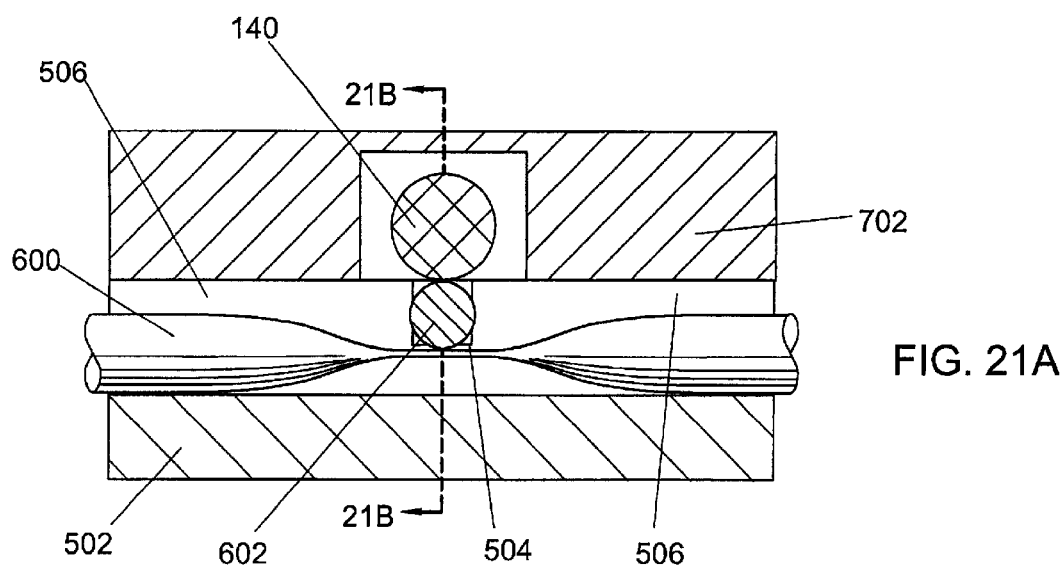
FIGS. 21A and 21B are partial sectional views of a resonant optical filter according to the present invention.
Figure 21B:
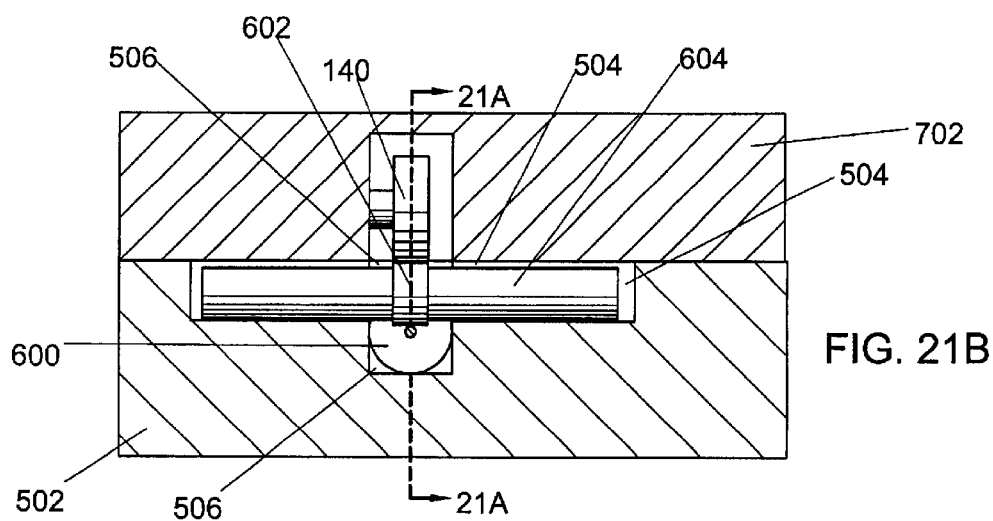
Figure 22A:
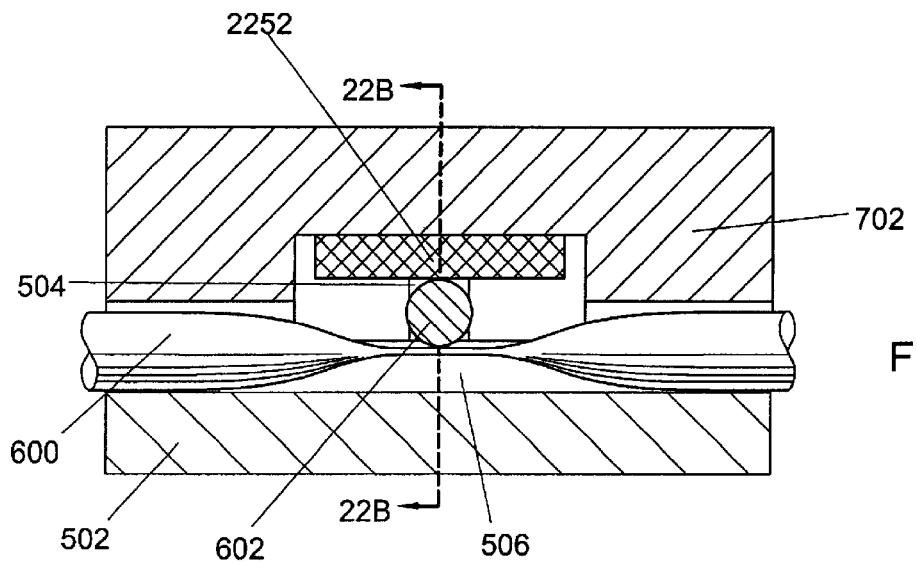
FIGS. 22A and 22B are partial sectional views of a resonant optical filter according to the present invention.
Figure 22B:
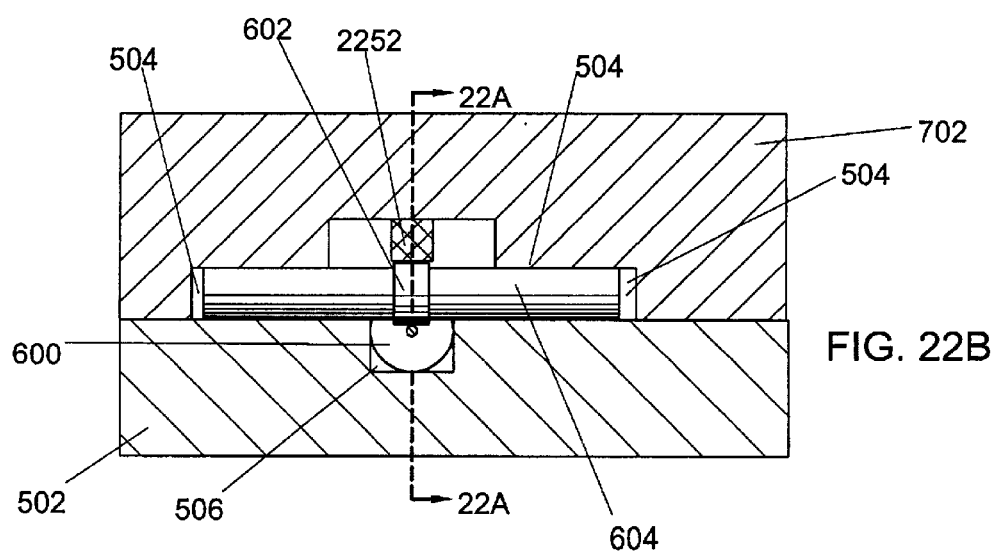
Figure 23A:
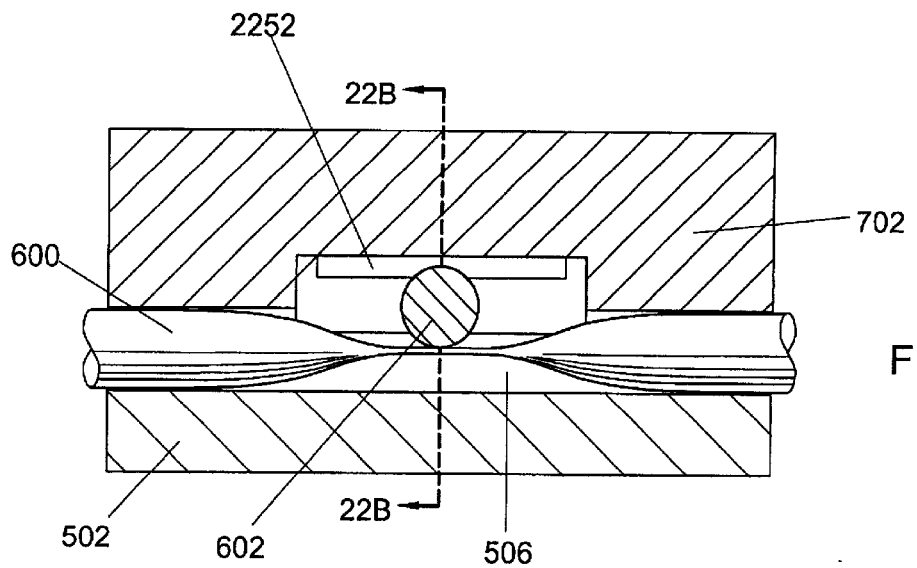
FIGS. 23A and 23B are partial sectional views of a resonant optical filter according to the present invention.
Figure 23B:
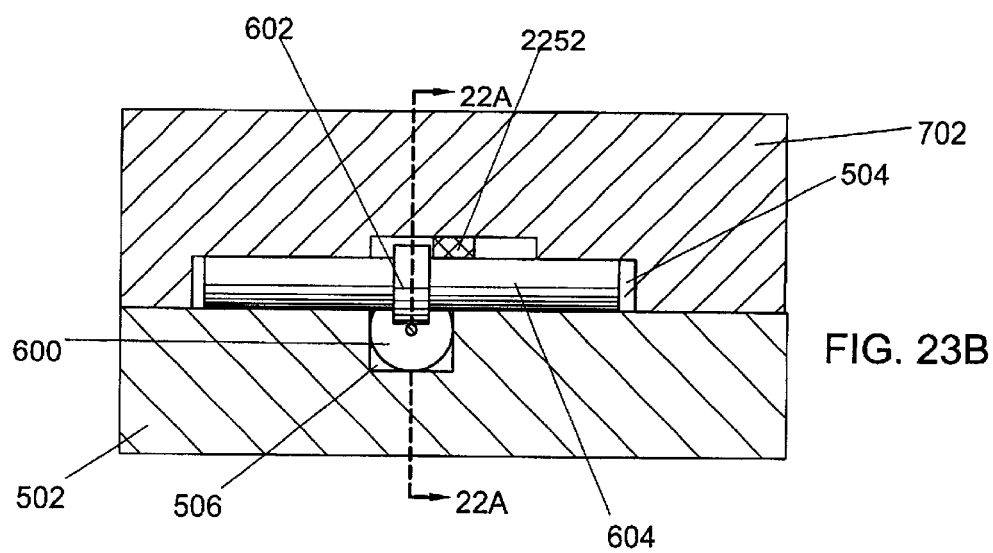
Figure 24A:
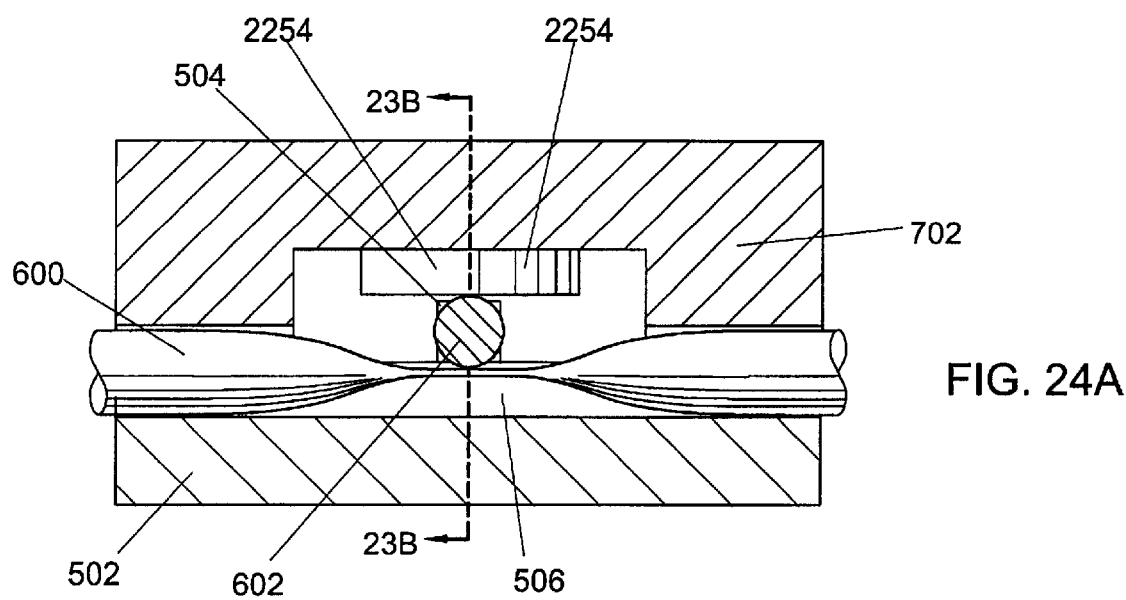
FIGS. 24A and 24B are partial sectional views of a resonant optical filter according to the present invention.
Figure 24B:
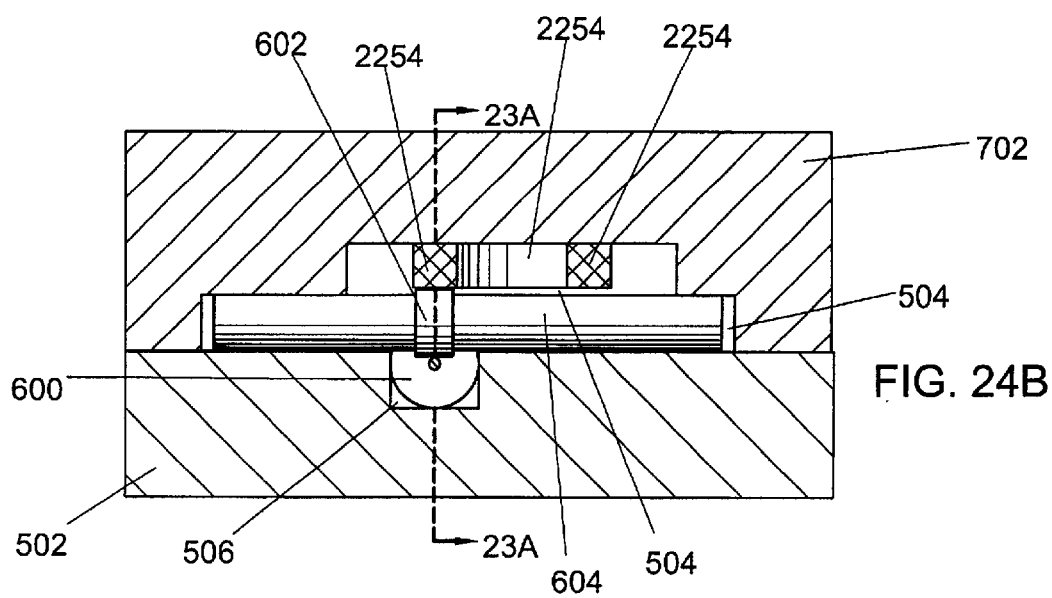

The flowchart of FIG. 15 and the fabrication process diagram of FIG. 16 illustrate fabrication (by epitaxial and/or other functionally equivalent growth/deposition/processing techniques) of a multi-layer reflector stack 2002 and high-index core layer 2004 on a substrate 2010. At least one layer of the reflector stack 2002 is an electro-optic or non-linear-optical material layer. An exemplary electro-optic Bragg stack of this type may comprise alternating γ/4 layers of high-aluminum-fraction AlGaAs and GaAs/InGaAs MQW material on a GaAs substrate, and may include top and bottom doped InGaAs contact layers 2020 and 2030 and a top GaAs cladding layer. The Bragg stack 2002 is processed (by lithography or other functionally equivalent technique) to form a ridge structure and laterally oxidized as described hereinabove, yielding a central core and lateral cladding for the waveguide (or resonator) structure, which may be surface-transverse-coupled to the circumferential-mode optical resonator. Application of a control voltage across the contact layers 2020 and 2030 results in a shift of the material index of the GaAs/InGaAs MQW material, substantially larger shifts in the modal index of the SGOM, and substantial shifts in the modal-index-matching condition (and degree of optical power transfer between under-, critical-, and/or over-coupling) between the Bragg stack waveguide and the circumferential-mode resonator. GaAs/InGaAs MQW material is not ideally suited for modulating optical wavelengths typically used in long-haul fiber-optic telecommunications (between about 1.2 mm and about 1.7 mm), but rather better suited for the 0.7–0.8 μm region (often utilized for so-called metro, or short-haul fiber-optic telecommunications networks). Bragg stacks incorporating any suitable MQW materials or other electro-optic and/or non-linear-optical materials (including InGaAsP MQW material, suitable for typical fiber-optic telecommunications wavelengths), currently known or hereafter developed, may be equivalently employed without departing from inventive concepts disclosed and/or claimed herein. Suitable combinations of materials will typically be determined by lattice-compatibility, bandgap, operating wavelength, and so on.

Any of the reflector stack structures including electro-absorptive, electro-optic, and/or non-linear-optical materials as described hereinabove and/or disclosed in earlier-cited applications A12 and A20 may be used to fabricated a resonance-modulated modulator optical resonator, wherein the modal index shift of the applied control voltage functions to shift the resonance wavelength of the modulator optical mode into and out of resonance with the circumferential optical mode. The shifting of the resonance wavelength of the modulator resonator serves to switch the level of optical power transfer from the circumferential-mode resonator between under-, critical-, and/or over-coupling, as described hereinabove.

As a further generalization of resonant optical power control devices according to the present invention, the circumferential-mode resonator may comprise a multi-layer-reflector stack structure fabricated in a manner analogous to the fabrication procedures described herein and in earlier-cited applications A12 and A20. Such a circumferential-mode optical resonator may comprise a single-reflector stack structure supporting a surface-guided resonant optical mode, and transverse-coupling between the circumferential-mode resonator and the transmission waveguide and between the circumferential-mode resonator and the modulator optical component may occur through an axially-extending or radially-extending evanescent portion of the surface-guided optical mode of the circumferential-mode resonator. Alternatively, the circumferential-mode optical resonator may comprise a dual reflector stack structure substantially confining a resonant optical mode therebetween, and transverse-coupling between the circumferential-mode resonator and the transmission waveguide and between the circumferential-mode resonator and the modulator optical component may occur through an axially-extending or radially-extending evanescent portion of the confined optical mode of the circumferential-mode resonator.

In order to achieve and maintain reliable, accurate, and stable transverse-coupling between a transmission optical waveguide, a circumferential-mode resonator, and a modulator optical component during and after manufacture of a resonant optical modulator according to the present invention, an alignment device may be employed, as illustrated by the exemplary assemblies of FIGS. 17A–17C, 18A–18C, 19A–19B, 20A–20B, 21A–21B, 22A–22B, 23A–23B, 24A–24B. Such an alignment device may comprise a first alignment substrate 502 having a transmission-waveguide-alignment groove 506 thereon, and various embodiments are described in detail in earlier-cited applications A5 and A15–A18. Alignment substrate 502 may be further provided with a circumferential-mode-resonator-alignment groove 504, or groove 504 may be provided on a second alignment substrate 702. A method for fabricating a resonant optical power control device according to the present invention comprises the steps of: 1) positioning and securing a transmission fiber-optic waveguide within the transmission-waveguide-alignment groove 506; and 2) positioning and securing the circumferential-mode optical resonator within the resonator-alignment groove 504 (as shown, for example, in FIGS. 17A–17C and 18A–18C for the case when grooves 504 and 506 are both provided on substrate 502). The transmission fiber-optic-waveguide may comprise a fiber taper 600, an optical fiber 300 with a saddle-shaped transverse-coupling segment, or any other functionally equivalent transmission optical waveguide having an transverse-coupling segment. The circumferential-mode resonator may comprise a microsphere 620 connected to a neck portion 622 of a microsphere fiber segment 624, a fiber-ring 602 connected to adjacent fiber segments 604, or any other functionally equivalent circumferential-mode resonator structure. Notwithstanding the exemplary combinations shown in the Figures, any suitable circumferential-mode resonator may be combined with any suitable transmission fiber-optic waveguide to yield a resonant optical power control device according to the present invention. The transmission-waveguide-alignment groove 506 may be positioned on the alignment substrate 502, and resonator-alignment groove 504 may be positioned on the alignment substrate 502 or 702, so that when positioned and secured therein (and substrates 502 and 702 are assembled, if groove 504 is provided on substrate 702), the transmission fiber-optic waveguide and the circumferential-mode resonator are in substantial tangential engagement (usually mechanical contact between the waveguide and the circumference of the resonator), thereby transverse-coupling the circumferential-mode resonator to the transmission fiber-optic waveguide. Optical coupling between the circumferential-mode resonator and the transmission fiber-optic waveguide may be achieved as long as at least portion of an evanescent portion of one of the circumferential optical mode of the resonator and a propagating optical mode of the transmission fiber-optic waveguide spatially overlaps at least a portion of the other optical mode. Actual mechanical contact is not required, only that the resonator and fiber be sufficiently close to permit the overlap. However, in a preferred embodiment of an optical power control device according to the present invention, optical coupling between the resonator and the fiber may be most accurately, reliably, and stably achieved by positioning and securing the circumferential-mode resonator and the transmission fiber-optic waveguide in mechanical contact with one another.

The second alignment substrate 702 of the alignment device may also have the modulator optical component secured thereto or mounted thereon. Alignment substrate 702 (and/or alignment substrate 502, if groove 504 is provided thereon) may be suitably mechanically indexed or otherwise provided with means for reliably, accurately, and stably positioning the modulator optical component for transverse-coupling to the circumferential-mode optical resonator (either in direct mechanical contact or a space therebetween). The alignment grooves 504 and 506, and any indexing or other alignment means, together serve to suitably position the modulator optical component, circumferential-mode resonator, and transmission fiber-optic waveguide relative to each other, when all are secured to the assembled alignment device.

Similar alignment structures may be employed whether the modulator optical component is a waveguide or resonator, and whether the modulator optical component is loss-modulated, index-modulated, resonance-modulated, or interference-modulated. Exemplary assemblies include: slab modulator waveguide 132 shown in FIGS. 19A–19B (with groove 504 on substrate 502); 2D modulator waveguide 134 on substrate 136 shown in FIGS. 20A–20B (with groove 504 on substrate 502); modulator resonator 140 (side-coupled, as in FIG. 5A) shown in FIGS. 21A–21B (with groove 504 on substrate 502); ridge modulator waveguide 2262 (surface-coupled) shown in FIGS. 22A–22B (with groove 504 on substrate 702); ridge modulator waveguide 2262 (side-coupled) shown in FIGS. 23A–23B (with groove 504 on substrate 702); and ridge modulator resonator 2254 (surface-coupled, as in FIG. 5B) shown in FIGS. 24A–24B (with groove 504 on substrate 702). The embodiment of FIGS. 24A–24B may be modified to provide side-coupling between modulator resonator 2254 and fiber-ring resonator 602 (as in FIG. 5E).

The present invention has been set forth in the forms of its preferred and alternative embodiments. It is nevertheless intended that modifications to the disclosed resonant optical modulators and methods of fabrication and use thereof may be made without departing from inventive concepts disclosed and/or claimed herein.

What is claimed is:

1. A resonant optical modulator, comprising:
   a) a transmission optical waveguide adapted for transmitting therethrough an optical signal, the transmission optical waveguide having a transverse coupling segment;

b) a resonant optical component including at least one circumferential-mode optical resonator, the circumferential-mode optical resonator being positioned so as to be transverse-coupled to the transmission optical waveguide at the transverse-coupling segment thereof, the resonant optical component being substantially resonant with the optical signal;

c) a modulator optical component, the modulator optical component being positioned so as to be transverse-coupled to the circumferential-mode optical resonator; and d) a modulator control component, the modulator control component being operatively coupled to the modulator optical component, the modulator optical component and the modulator control component being adapted for modulating, in response to an applied control signal, i) a level of optical signal power transfer by transverse-coupling between the circumferential-mode optical resonator and the modulator optical component, ii) a level of optical loss of the modulator optical component, or iii) a resonant frequency of the modulator optical component, the modulator control component thereby enabling controlled modulation of a coupling condition between the transmission optical waveguide and the resonant optical component, in turn enabling controlled modulation of a level of transmission of the optical signal through the transmission optical waveguide between a higher operational optical transmission level and a lower operational optical transmission level.

2. The resonant optical modulator of claim 1, the modulator optical component comprising a modulator optical waveguide.

3. The resonant optical modulator of claim 2, the modulator optical waveguide being positioned tangentially with respect to the circumferential-mode optical resonator for transverse-coupling thereto.

4. The resonant optical modulator of claim 3, the modulator optical waveguide comprising a slab waveguide.

5. The resonant optical modulator of claim 3, the modulator optical waveguide comprising a laterally-confined optical waveguide.

6. The resonant optical modulator of claim 3, the modulator optical waveguide comprising a protruding ridge optical waveguide.

7. The resonant optical modulator of claim 2, the modulator optical waveguide being positioned axially relative to the circumferential-mode optical resonator for transverse-coupling thereto.

8. The resonant optical modulator of claim 7, the circumferential-mode optical resonator comprising a fiber-ring optical resonator.

9. The resonant optical modulator of claim 7, further including a spacer positioned between the circumferential-mode optical resonator and the modulator optical waveguide.

10. The resonant optical modulator of claim 1, the modulator optical component comprising a modulator optical resonator.

11. The resonant optical modulator of claim 10, the modulator optical resonator being positioned tangentially with respect to the circumferential-mode optical resonator for transverse-coupling thereto.

12. The resonant optical modulator of claim 10, the modulator optical resonator being positioned axially relative to the circumferential-mode optical resonator for transverse-coupling thereto.

13. The resonant optical modulator of claim 12, the circumferential-mode optical resonator comprising a fiber-ring optical resonator.

14. The resonant optical modulator of claim 12, further including a spacer positioned between the circumferential-mode optical resonator and the modulator optical resonator.

15. The resonant optical modulator of claim 10, the modulator optical resonator comprising a second circumferential-mode optical resonator.

16. The resonant optical modulator of claim 10, the modulator optical resonator comprising a ring optical waveguide.

17. The resonant optical modulator of claim 10, the circumferential-mode optical resonator and the modulator optical resonator being substantially co-planar.

18. The resonant optical modulator of claim 10, the circumferential-mode optical resonator and the modulator optical resonator being substantially orthogonal.

19. The resonant optical modulator of claim 10, the circumferential-mode optical resonator and the modulator optical resonator being substantially parallel.

20. The resonant optical modulator of claim 1, the modulator optical component and the modulator control component being adapted for modulating, in response to the control signal, the level of optical loss of the modulator optical component.

21. The resonant optical modulator of claim 20, the modulator optical component including an electro-absorptive material, the modulator control component including control electrodes adapted for applying an electronic control signal to the electro-absorptive material for modulating the level of optical loss of the modulator optical component.

22. The resonant optical modulator of claim 21, the electro-absorptive material including a semi-conductor-based material.

23. The resonant optical modulator of claim 21, the electro-absorptive material including a quantum well material.

24. The resonant optical modulator of claim 21, the electro-absorptive material including an InGaAsP multi-quantum-well material.

25. The resonant optical modulator of claim 21, the electro-absorptive material including a multi-layer reflector structure.

26. The resonant optical modulator of claim 20, the modulator optical component including a non-linear optical material, the modulator control component including at least one optical component for transmitting an optical control signal to the non-linear optical material for modulating the level of optical loss of the modulator optical component.

27. The resonant optical modulator of claim 1, the modulator optical component and the modulator control component being adapted for modulating, in response to the control signal, the level of optical signal power transfer by transverse-coupling between the circumferential-mode optical resonator and the modulator optical component.

28. The resonant optical modulator of claim 27, the modulator optical component including an electro-optic material, the modulator control component including control electrodes adapted for applying an electronic control signal to the electro-optic material for modulating the level of optical signal power transfer by transverse-coupling between the circumferential-mode optical resonator and the modulator optical component.

29. The resonant optical modulator of claim 28, the electro-optic material including a semi-conductor-based material.

30. The resonant optical modulator of claim 28, the electro-optic material including a quantum well material.

31. The resonant optical modulator of claim 28, the electro-optic material including an InGaAsP multi-quantum-well material.

32. The resonant optical modulator of claim 28, the electro-optic material including a multi-layer reflector structure.

33. The resonant optical modulator of claim 28, the electro-optic material including a polymeric material.

34. The resonant optical modulator of claim 27, the modulator optical component including a non-linear optical material, the modulator control component including at least one optical component for transmitting an optical control signal to the non-linear optical material for modulating the level of optical signal power transfer by transverse-coupling between the circumferential-mode optical resonator and the modulator optical component.

35. The resonant optical modulator of claim 1, the modulator optical component comprising a modulator optical resonator, the modulator optical resonator and the modulator control component being adapted for modulating, in response to the control signal, the resonant frequency of the modulator optical resonator.

36. The resonant optical modulator of claim 35, the modulator optical resonator including an electro-optic material, the modulator control component including control electrodes adapted for applying an electronic control signal to the electro-optic material for modulating the resonant frequency of the modulator optical resonator.

37. The resonant optical modulator of claim 36, the electro-optic material including a semi-conductor-based material.

38. The resonant optical modulator of claim 36, the electro-optic material including a quantum well material.

39. The resonant optical modulator of claim 36, the electro-optic material including an InGaAsP multi-quantum-well material.

40. The resonant optical modulator of claim 36, the electro-optic material including a multi-layer reflector structure.

41. The resonant optical modulator of claim 36, the electro-optic material including a polymeric material.

42. The resonant optical modulator of claim 35, the modulator optical resonator including a non-linear optical material, the modulator control component including at least one optical component for transmitting an optical control signal to the non-linear optical material for modulating the resonant frequency of the modulator optical resonator.

43. The resonant optical modulator of claim 1, the transmission optical waveguide comprising a transmission fiber-optic waveguide.

44. The resonant optical modulator of claim 43, the transverse-coupling segment of the transmission optical waveguide including a fiber-optic-taper segment.

45. The resonant optical modulator of claim 43, the transverse-coupling segment of the transmission optical waveguide including a side-etched segment.

46. The resonant optical modulator of claim 43, the transmission fiber-optic waveguide including single-mode optical fiber.

47. The resonant optical modulator of claim 43, the transmission fiber-optic waveguide including polarization-maintaining optical fiber.

48. The resonant optical modulator of claim 47, the polarization maintaining optical fiber being elliptical-core optical fiber.

49. The resonant optical modulator of claim 47, the polarization-maintaining optical fiber being "panda" optical fiber.

50. The resonant optical modulator of claim 1, the circumferential-mode optical resonator comprising at least one fiber-ring resonator, the fiber-ring resonator including a transverse resonator segment integral with a resonator optical fiber between first and second segments of the resonator optical fiber and having a circumferential optical path length sufficiently different from a circumferential optical path length of an immediately adjacent portion of the first segment or the second segment of the resonator optical fiber so as to enable the resonator segment to support a resonant optical mode near an outer circumferential surface of the fiber-ring optical resonator.

51. The resonant optical modulator of claim 50, wherein the resonator segment is greater than about 10 μm in diameter.

52. The resonant optical modulator of claim 50, wherein the resonator segment is greater than about 20 μm in diameter.

53. The resonant optical modulator of claim 50, wherein the resonator segment is greater than about 100 μm in diameter.

54. The resonant optical modulator of claim 50, wherein the resonator segment is less than about 2000 μm in diameter.

55. The resonant optical modulator of claim 50, wherein the resonator segment is less than about 200 μm in diameter.

56. The resonant optical modulator of claim 50, wherein the resonator segment is less than about 150 μm in diameter.

57. The resonant optical modulator of claim 50, wherein a resonator segment is larger in radius than the immediately adjacent portion of the first segment or the second segment of the resonator optical fiber, and the resonator segment radius exceeds the adjacent portion radius by a resonator segment step size.

58. The resonant optical modulator of claim 57, wherein the step size is greater than about 0.1 μm.

59. The resonant optical modulator of claim 57, wherein the step size is greater than about 0.5 μm.

60. The resonant optical modulator of claim 57, wherein the step size is less than about 20 μm.

61. The resonant optical modulator of claim 57, wherein the step size is less than about 1.5 μm.

62. The resonant optical modulator of claim 50, wherein the resonator segment is greater than about 1 μm in width.

63. The resonant optical modulator of claim 50, wherein the resonator segment is greater than about 2 μm in width.

64. The resonant optical modulator of claim 50, wherein the resonator segment is less than about 10 μm in width.

65. The resonant optical modulator of claim 50, wherein the resonator segment is less than about 4 μm in width.

66. The resonant optical modulator of claim 50, the resonator optical fiber including at least one delocalized-optical-mode suppressor.

67. The resonant optical modulator of claim 50, the transmission optical waveguide comprising transmission fiber-optic waveguide, the transverse-coupling segment of the transmission optical waveguide including a fiber-optic taper segment, the resonator optical fiber including a fiber-optic-taper positioning-and-support structure for engaging the fiber-optic taper segment so as to transverse-couple the fiber-ring resonator and the fiber-optic taper segment.

68. The resonant optical modulator of claim 67, the fiber-optic-taper segment being engaged by the fiber-taper positioning-and-support structure at a location axially displaced from an axial midpoint of the fiber-ring resonator so as to substantially reduce undesirable fiber-optic-taper-induced optical loss of the fiber-ring resonator.

69. The resonant optical modulator of claim 67, the fiber-optic-taper segment being engaged by the fiber-taper positioning-and-support structure at a location radially displaced from an outer circumference of the fiber-ring resonator so as to substantially reduce undesirable fiber-optic-taper-induced optical loss of the fiber-ring resonator.

70. The resonant optical modulator of claim 50, the transmission optical waveguide comprising transmission fiber-optic waveguide, the transverse-coupling segment of the transmission optical waveguide including a fiber-optic taper segment of the transmission fiber-optic waveguide, the fiber-optic-taper segment being partially wrapped around the fiber-ring resonator near a portion of an outer circumference thereof.

71. The resonant optical modulator of claim 70, wherein the spatial extent of the wrapped portion of the outer circumference of the wrapped fiber-ring resonator subtends an angle less than about 180°.

72. The resonant optical modulator of claim 70, wherein the spatial extent of the wrapped portion of the outer circumference of the wrapped fiber-ring resonator subtends an angle greater than about 45°.

73. The resonant optical modulator of claim 70, wherein the spatial extent of the wrapped portion of the outer circumference of the wrapped fiber-ring resonator is greater than about 10 µm.

74. The resonant optical modulator of claim 70, wherein the spatial extent of the wrapped portion of the outer circumference of the wrapped fiber-ring resonator is greater than about 50 µm.

75. The resonant optical modulator of claim 70, wherein the spatial extent of the wrapped portion of the outer circumference of the wrapped fiber-ring resonator is less than about 500 µm.

76. The resonant optical modulator of claim 70, wherein the spatial extent of the wrapped portion of the outer circumference of the wrapped fiber-ring resonator is less than about 200 µm.

77. The resonant optical modulator of claim 70, wherein the spatial extent of the wrapped portion of the outer circumference of the wrapped fiber-ring resonator yields about 90% transmission of a substantially resonant optical signal through the transmission fiber-optic waveguide in the absence of another optical element transverse-coupled to the fiber-ring resonator.

78. The resonant optical modulator of claim 1, an over-coupled condition between the transmission optical waveguide and the circumferential-mode optical resonator corresponding to the higher operational optical transmission level, a substantially critically-coupled condition between the transmission optical waveguide and the circumferential-mode optical resonator corresponding to the lower operational optical transmission level.

79. The resonant optical modulator of claim 1, a substantially critically-coupled condition between the transmission optical waveguide and the circumferential-mode optical resonator corresponding to the lower operational optical transmission level, an under-coupled condition between the transmission optical waveguide and the circumferential-mode optical resonator corresponding to the higher operational optical transmission level.

80. A method for controlling transmission of an optical signal through a transmission optical waveguide, the method comprising the step of applying a control signal to a modulator control component, the modulator control component being operatively coupled to a modulator optical component, the modulator optical component being positioned so as to be transverse-coupled to a resonant optical component, the resonant optical component including at least one circumferential-mode optical resonator, the resonant optical component being substantially resonant with the optical signal, the resonant optical component being transverse-coupled to the transmission optical waveguide, the modulator optical component and the modulator control component being adapted for modulating, in response to the applied control signal, i) a level of optical signal power transfer by transverse-coupling between the circumferential-mode optical resonator and the modulator optical component, ii) a level of optical loss of the modulator optical component, or iii) a resonant frequency of the modulator optical component, the modulator control component, thereby enabling controlled modulation of a coupling condition between the transmission optical waveguide and the circumferential optical resonator, in turn enabling controlled modulation of a level of transmission of the optical signal through the transmission optical waveguide between a higher operational optical transmission level and a lower operational optical transmission level.

81. The method of claim 80, the circumferential-mode optical resonator comprising a fiber-ring optical resonator.

82. The method of claim 80, the transmission optical waveguide comprising an optical fiber having a fiber-optic taper segment adapted for transverse-coupling.

83. The method of claim 80, the circumferential-mode optical resonator comprising a fiber-ring optical resonator, the transmission optical waveguide comprising an optical fiber having a fiber-optic taper segment adapted for transverse-coupling, the transmission optical waveguide being positioned so as to be transverse-coupled to the fiber-ring optical resonator at the fiber-optic taper segment.

* * * * *

UNITED STATES PATENT AND TRADEMARK OFFICE
CERTIFICATE OF CORRECTION

PATENT NO.        : 7,106,917 B2
APPLICATION NO.   : 10/037146
DATED             : September 12, 2006
INVENTOR(S)       : Painter et al.

It is certified that error appears in the above-identified patent and that said Letters Patent is hereby corrected as shown below:

On the Title Page

(56) References Cited
Other Publications

Insert --U.S. App. No. 09/788,303, filed Feb. 16, 2001, in the name of Sercel et al.--

(56) References Cited
Other Publications
Carl Arft, Diego R. Yankelovich, Andre Knoesen. . . .

Delete "electroptic",
Insert --electrooptic--

(56) References Cited
U.S. Patent Documents
Pg. 2, Col. 1
5,281,247. . .

Delete "Haruiko et al.",
Insert --Aikawa et al.--

(56) References Cited
Other Publications
pg. 2, Col. 1, 2nd Ref.

Delete "A. Fuji",
Insert --A. Fujii--

(56) References Cited
Other Publications
pg. 2, Col. 1, 4th Ref.

Delete "microrong",
Insert --microring--

(56) References Cited
Other Publications
pg. 2, Col. 2, 1st Ref.

Delete "S.T. Chu H.A. Haus",
Insert --S.T. Chu, H.A. Haus--

(56) References Cited
Other Publications
pg. 2, Col. 2, 7th Ref.

Delete "2422",
Insert --2442--

(56) Reference Cited
Other Publications
pg. 2, Col. 2, 10th Ref.

After "D. Zhang",
Insert --G. Zhang--

(56) References Cited
Other Publications
pg. 2, Col. 2, 11th Ref.

Delete "Dijik",
Insert --Dijk--

UNITED STATES PATENT AND TRADEMARK OFFICE
CERTIFICATE OF CORRECTION

PATENT NO. : 7,106,917 B2
APPLICATION NO. : 10/037146
DATED : September 12, 2006
INVENTOR(S) : Painter et al.

It is certified that error appears in the above-identified patent and that said Letters Patent is hereby corrected as shown below:

| | |
|---|---|
| (56) References Cited<br>Other Publications<br>pg. 2, Col. 2, 12th Ref. | Delete "Fores, J.S.",<br>Insert --Foresi, J.S.-- |
| (56) References Cited<br>Other Publications<br>pg. 2, Col. 2, 12th Ref | Delete "Wavelenght",<br>Insert --Wavelength-- |
| (56) References Cited<br>Other Publications<br>pg. 2, Col. 2, 13th Ref. | Delete "Fiber-optics",<br>Insert --Fiber-optic-- |
| (56) References Cited<br>Other Publications<br>pg. 2, Col. 2, 16th Ref. | Delete "Allemand.",<br>Insert --Allemand,-- |
| (56) References Cited<br>Other Publications<br>pg. 2, Col. 2, 17th Ref. | Delete "heterstructures",<br>Insert --heterostructures-- |
| (56) References Cited<br>Other Publications<br>pg. 2, Col. 2, 18th Ref. | Delete "Selectives",<br>Insert --Selective-- |
| (56) References Cited<br>Other Publications<br>pg. 2, Col. 2, 18th Ref. | Delete "dielctric",<br>Insert --dielectric-- |

UNITED STATES PATENT AND TRADEMARK OFFICE
CERTIFICATE OF CORRECTION

PATENT NO. : 7,106,917 B2
APPLICATION NO. : 10/037146
DATED : September 12, 2006
INVENTOR(S) : Painter et al.

It is certified that error appears in the above-identified patent and that said Letters Patent is hereby corrected as shown below:

In the Claims

| | |
|---|---|
| Column 44, line 58, Claim 67 | After "waveguide comprising", Insert --a-- |
| Column 45, line 11, Claim 70 | After "waveguide comprising", Insert --a-- |

Signed and Sealed this

Tenth Day of July, 2007

JON W. DUDAS
*Director of the United States Patent and Trademark Office*